(12) United States Patent
Hashiguchi et al.

(10) Patent No.: US 8,068,732 B2
(45) Date of Patent: Nov. 29, 2011

(54) NETWORK DESIGN APPARATUS AND NETWORK DESIGN METHOD

(75) Inventors: Tomohiro Hashiguchi, Kawasaki (JP);
 Toru Katagiri, Kawasaki (JP);
 Kazuyuki Tajima, Kawasaki (JP);
 Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 400 days.

(21) Appl. No.: 12/479,206

(22) Filed: Jun. 5, 2009

(65) Prior Publication Data

US 2010/0061722 A1    Mar. 11, 2010

(30) Foreign Application Priority Data

Sep. 8, 2008   (JP) .................................. 2008-230122

(51) Int. Cl.
 *H04B 10/00* (2006.01)
(52) U.S. Cl. ............................................. 398/66; 703/6
(58) Field of Classification Search .................... 398/66; 703/1, 6
 See application file for complete search history.

(56) References Cited

U.S. PATENT DOCUMENTS

2005/0220136 A1* 10/2005 Shinomiya et al. ........... 370/437
2010/0040364 A1*  2/2010 Jenkins et al. ................. 398/26

FOREIGN PATENT DOCUMENTS

JP   2002-374283       12/2002
JP   2006-67067 A       3/2006

* cited by examiner

*Primary Examiner* — Leslie Pascal
(74) *Attorney, Agent, or Firm* — Fujitsu Patent Center

(57) ABSTRACT

A network design apparatus includes an information acquiring unit acquiring optical network information, a section dividing unit dividing an optical network into linear sections, a combination candidate determining unit determining candidates for combinations of various kinds of optical transmission equipment to be placed in each station in each of the linear sections, a noise amount upper limit determining unit determining an upper limit to the amount of noise allowed for each wavelength path, and an equipment placement unit solving an integer programming problem having an objective function that minimizes the cost of the optical transmission equipment and OEO regenerators, subject to the constraints that one optical transmission equipment combination is selected for each linear section and that the number of OEO regenerators necessary for each wavelength path is determined by the cumulative amount of noise of the wavelength path and the noise upper limit determined for the wavelength path.

18 Claims, 23 Drawing Sheets

| OPTICAL TRANSMISSION EQUIPMENT \ FUNCTION | 3R | 1R | LEVEL EQUALIZATION |
|---|---|---|---|
| OADM | ✓ | ✓ | ✓ |
| ILA |  | ✓ |  |
| BYPASS |  |  |  |

NETWORK DESIGN APPARATUS AND NETWORK DESIGN METHOD

CROSS-REFERENCE TO RELATED APPLICATIONS

This application is based upon and claims the benefit of priority of the prior Japanese Patent Application No. 2008-230122, filed on Sep. 8, 2008, the entire contents of which are incorporated herein by reference.

FIELD

The embodiments discussed herein are related to a network design apparatus, a computer program product, and a network design method for arranging optical transmission equipment constituting an optical network system which is placed at stations.

BACKGROUND

In recent years, in the field of WDM (Wavelength Division Multiplexing) networks, OADMs have been implemented (Optical Add Drop Multiplexers) and optical hubs, such as WXCs (Wavelength Cross Connects), that can split and insert traffic and can switch paths on a wavelength-by-wavelength basis without converting optical signals into electrical form.

The implementation of such equipment has made it possible to construct complicated networks, such as interconnected ring networks and mesh networks.

When designing a WDM network, optical network information, including information concerning stations where equipment constituting the WDM system can be placed and information concerning the optical fibers interconnecting the stations, is applied along with wavelength path information concerning wavelength paths propagating in the WDM network. Hereinafter, optical transmission equipment constituting such a WDM system may sometimes be referred to as "WDM equipment." The WDM equipment includes, for example, equipment such as OADMs and ILAs (In-Line Amplifiers) or bypasses which are described later.

OADMs are placed at both end stations serving as the start and end points of a wavelength path, while on the other hand, at other stations serving as relay stations, ILAs or OADMs as repeaters can be placed. By using an OADM as a repeater, it is possible at each relay station to regenerate and relay any desired wavelength path and to compensate for a tilt of a WDM signal.

Rather than placing OADMs or ILAs, optical fibers may be simply connected at relay stations to relay optical signals. In the following description, any relay station where optical fibers are simply connected in this manner may sometimes be referred to as a "bypass station," and the relay means constructed by simply connecting optical fibers may sometimes be referred to as a "bypass."

An optical network design method is proposed which designs an optical network by using integer programming so that traffic flowing along a failed path is switched to another working optical path, thus eliminating the need to provide a dedicated protection optical path.

An optical network design method is also proposed which determines, by using integer programming, the placement of working and protection optical paths that minimizes the network cost in an optical network in which a plurality of optical transmission links share the same optical transmission equipment.

SUMMARY

According to an embodiment, there is provided a network design apparatus includes an information acquiring unit that acquires topology information concerning an optical network, equipment information concerning the kind of optical transmission equipment that can be placed at each station in the optical network, span information indicating transmission path conditions occurring between stations adjacent to each other on the topology information, and wavelength path information concerning each wavelength path propagating in the optical network, a section dividing unit that divides the optical network, defined by the topology information into linear sections, a combination candidate determining unit that determines candidates for combinations of various kinds of optical transmission equipment to be placed at each station in each of the linear sections, a noise amount upper limit value determining unit that determines a noise amount upper limit value in accordance with a prescribed condition specified by the wavelength path information and corresponding to an upper limit to the amount of noise allowed for each wavelength path, and an equipment placement unit that determines the optical transmission equipment to be placed along each of the linear sections, by solving an integer programming problem having an objective function that minimizes the sum of the cost of the optical transmission equipment to be placed in the optical network and the cost needed to place a necessary number of OEO regenerators for each wavelength path, subject to constraints that combinations of the various kinds of optical transmission equipment are selected, one for each linear section, from among the combination candidates and that the number of OEO regenerators necessary for each wavelength path is determined by a cumulative amount of the noise occurring along the wavelength path, determined in accordance with the transmission path conditions specified by the span information, and the noise amount upper limit value determined for the wavelength path.

The object and advantages of the invention will be realized and attained by means of the elements and combinations particularly pointed out in the claims. It is to be understood that the foregoing general description and detailed description are exemplary and explanatory and are not restrictive of the invention, as claimed.

BRIEF DESCRIPTION OF DRAWING(S)

DESCRIPTION OF EMBODIMENT(S)

Figure 1:
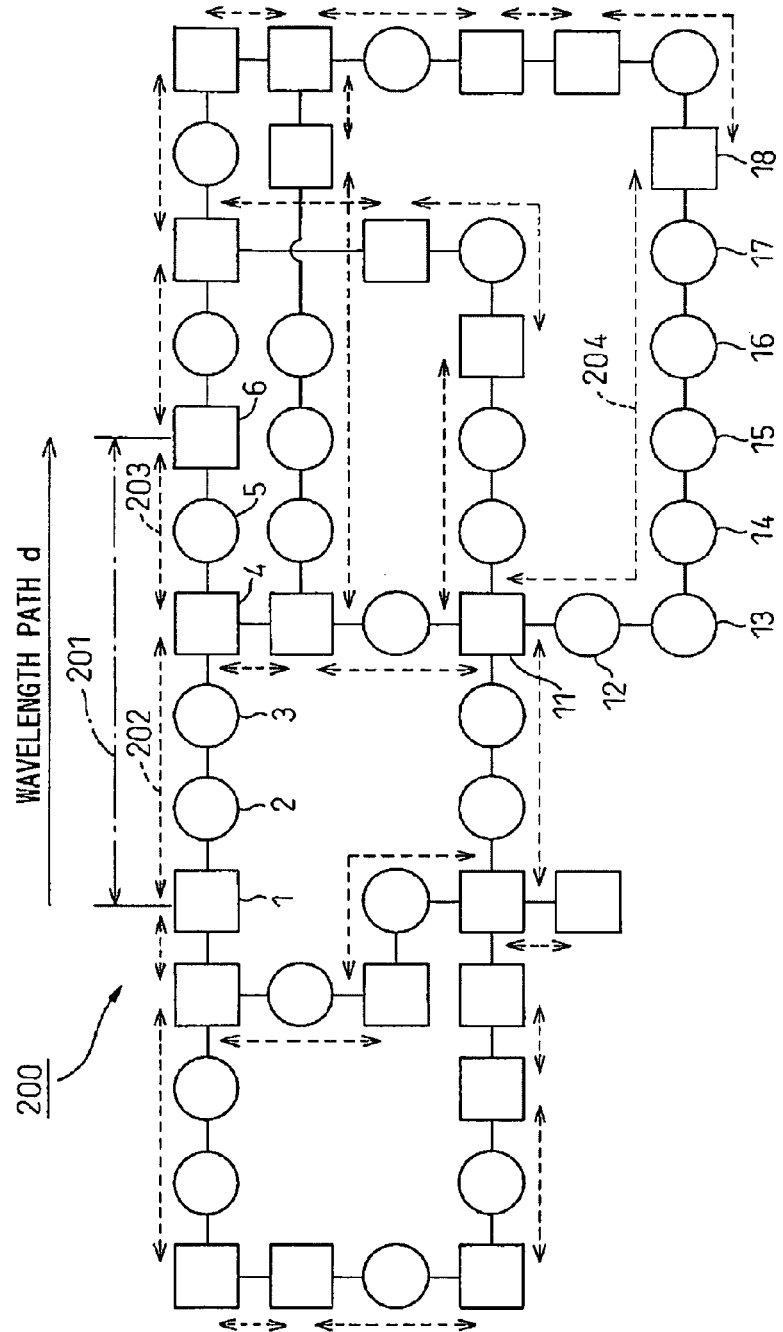
FIG. 1 is a diagram illustrating an optical network to be designed.

Generally, there is a tradeoff between the cost of WDM equipment placed at a station and the transmission quality of the WDM signal transmitted via the station. That is, as the cost of the WDM equipment increases, the transmission quality of the WDM signal increases. This serves to reduce the number of OEO regenerators necessary for each wavelength path propagating in the optical network. On the other hand, as the number of pieces of low-cost WDM equipment increases, the number of OEO regenerators has to be increases.

Accordingly, a network design may be performed preferably so as to minimize the total cost of the WDM equipment and OEO regenerators, i.e., the cost required to construct a network.

A specific procedure employed in WDM equipment placement may be as follows:

(1) The network is divided into a plurality of sub-networks having a linear or ring topology.

(2) The placement that minimizes the cost of the WDM equipment is determined for each sub-network.

In the thus designed WDM network, the total cost of the WDM equipment is minimized.

However, with the WDM equipment placement method described above, if there is a wavelength path extending across a plurality of sub-networks, the placement of the WDM equipment is not always optimized for such a wavelength path, and there may arise a need to increase the number of OEO regenerators to compensate for the degradation of transmission quality of the WDM signal. That is, depending on the design of the wavelength path, the placement determined by the above-mentioned WDM equipment placement method may not always minimize the total cost of the entire network.

In order to determine the combination of the various kinds of WDM equipment to be placed at the stations so as to minimize the total cost of the entire network, the number of OEO regenerators necessary for each wavelength path is estimated properly for each combination. However, to properly estimate the number, it may become necessary to consider not only OSNR (Optical Signal-to-Noise Ratio) but also impairments due to PMD (Polarization Mode Dispersion), crosstalk, etc. Since the OSNR and impairment values also depend on the combination of the various kinds of WDM equipment, it is difficult to estimate the number of OEO regenerators.

Hereinafter, the combination of the various kinds of WDM equipment to be placed at the respective stations in the network, i.e., the relative disposition of the various kinds of WDM equipment placed at the respective stations, may sometimes be referred to as the "WDM equipment configuration."

When, for the optical signal received at any particular station, the received OSNR given by the following equation is not lower than the OSNR tolerance determined according to the kind of the optical signal, the optical signal can be transmitted to or received at that station.

$$\text{Received OSNR} = \text{OSNR} - \text{Impairments}$$

On the other hand, when the received OSNR is lower than the OSNR tolerance, since the optical signal becomes unable to be transmitted or received, the optical signal needs to be regenerated by an OEO regenerator before transmission. The amount of noise, NOISE, per unit optical power, which is the reciprocal of OSNR, is a linear value, and when an OSNR value [dB] is given, NOISE is expressed as $$\text{NOISE} = 10^{-(OSNR/10)}$$

When not considering impairments, the required number of OEO regenerators can be estimated from the amount of noise relatively easily, but it is difficult to estimate the required number of OEO regenerators with high accuracy by considering the impairments.

The embodiments will be described with reference to the accompanying drawings. FIG. 1 is a diagram illustrating an optical network to be designed. The optical network 200 depicted in FIG. 1 is a mesh network constituting a WDM system. Each box represents a station where an optical add-drop multiplexer is placed. The station where an optical add-drop multiplexer is placed is, for example, a station where a wavelength path terminates. Each circle represents a station, located along a path between stations indicated by boxes, for relaying a WDM optical signal between them. Each double-headed dashed arrow indicates a linear section in the optical network 200.

The network design apparatus according to an embodiment takes each linear section in the network 200 as a unit design section, and determines the combination of the various kinds of optical transmission equipment to be placed at the respective stations in the linear network defined by the unit design section.

Hereinafter, the combination of the various kinds of optical transmission equipment to be placed at the respective stations in the network, i.e., the way the various kinds of optical transmission equipment are placed or to be placed at the respective stations, may sometimes be referred to as the "optical transmission equipment configuration."

As depicted by dashed arrows, the linear sections are each formed by connecting two or more stations in cascade, and the stations need not necessarily be connected in a physically straight line but may be connected in a curved line fashion. For example, the linear section 202 is formed by connecting the stations 1 to 4 in cascade, the linear section 203 is formed by connecting the stations 4 to 6 in cascade, and the linear section 204 is formed by connecting the stations 11 to 18 in cascade.

The stations 1 and 4 as the start and end points of the linear section 202, the stations 4 and 6 as the start and end points of the linear section 203, and the stations 11 and 18 as the start and end points of the linear section 204 are each provided with optical transmission equipment capable of accommodating an OEO regenerator.

The section indicated by a semi-dashed arrow 201 represents a section through which a wavelength path d propagating in the network 200 passes. The start and end points of the wavelength path d are the stations 1 and 6, respectively, and the path extends across a plurality of sections, i.e., two sections 202 and 203.

Figures 2, 3:
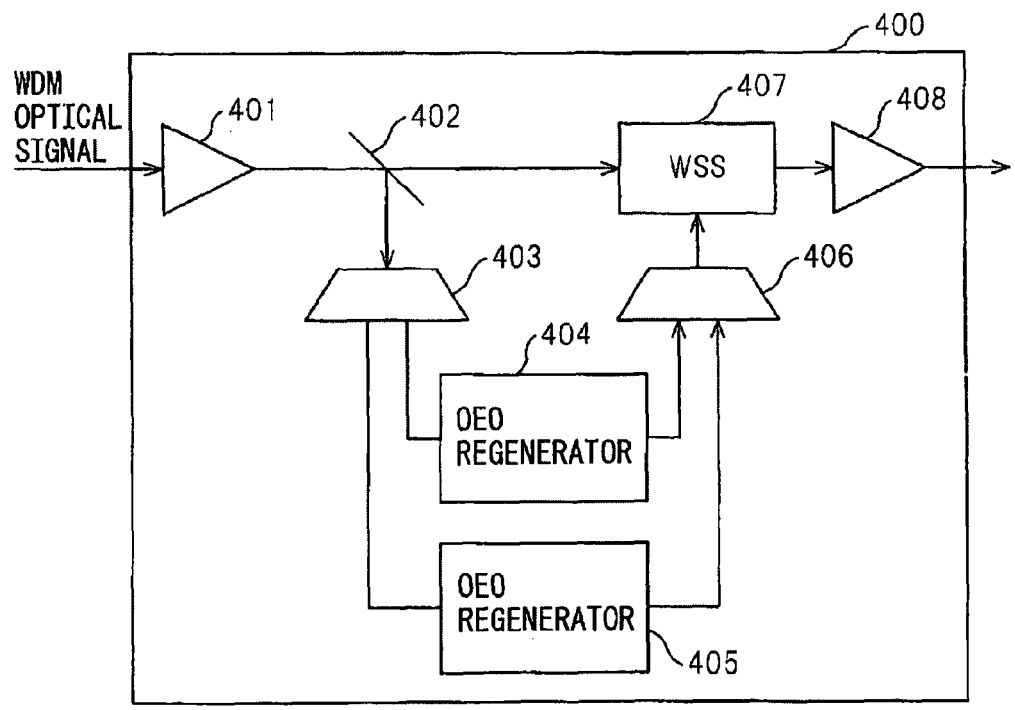
FIG. 2 is a diagram illustrating examples of the kinds of optical transmission equipment that can be placed at stations.
FIG. 3 is a diagram illustrating one example of an OADM depicted in FIG. 2.

FIG. 2 is a diagram illustrating examples of the kinds of optical transmission equipment that can be placed at the respective stations. The kinds of optical transmission equipment that can be placed at the stations include, for example, OADM 310, ILA 320, and bypass 330. OADM 310 is the kind of optical transmission equipment that is capable of accommodating an OEO regenerator for a designated wavelength signal. The OEO regenerator can perform 3Rs which stands for Re-amplification, Re-shaping, and Re-timing.

ILA 320 and bypass 330 are optical transmission equipment not capable of accommodating an OEO regenerator. ILA 320 can only perform 1R which stands for Re-amplification for amplifying an optical signal. Bypass 330 is a device that only passes an optical signal therethrough. Of these kinds of optical transmission equipment, the installation cost of OADM 310 is the highest, and the installation cost of bypass 330 is the lowest; the installation cost of ILA 320 is intermediate between the above two.

On the other hand, the transmission quality is the lowest when bypass 330 is installed and the highest when OADM 310 is installed; the transmission quality when ILA 320 is installed is intermediate between the above two. Therefore, the transmission quality is a tradeoff with the cost needed for the placement of the optical transmission equipment.

FIG. 3 is a block diagram illustrating one example of the OADM depicted in FIG. 2. The OADM 400 includes an amplifier 401, a splitter 402, a demultiplexer 403, OEO regenerators 404 and 405, a multiplexer 406, a WSS 407, and an amplifier 408. The amplifier 401 amplifies a WDM optical signal arriving from outside the OADM 400, and provides the output signal to the splitter 402. The OEO regenerator 404 is provided as required for a wavelength path that needs regenerating for further transmission from among the wavelength paths contained in the input WDM optical signal.

The splitter 402 splits the WDM optical signal output from the amplifier 401 and directs the thus split WDM optical signals to the demultiplexer 403 and the WSS 407, respectively. The demultiplexer 403 wavelength-demultiplexes the WDM optical signal reflected by the splitter 402, and supplies the wavelength-demultiplexed signals to the OEO regenerators 404 and 405.

The OEO regenerators 404 and 405 regenerate the optical signals output from the demultiplexer 403, and supply the regenerated signals to the multiplexer 406. The multiplexer 406 wavelength-multiplexes the optical signals output from the OEO regenerators 404 and 405, and supplies the wavelength-multiplexed WDM signal to the WSS 407.

The WSS (Wavelength Selective Switch) 407 selects and combines the optical signals contained in the WDM optical signal transmitted through the splitter 402 and the optical signals contained in the WDM optical signal supplied from the multiplexer 406, and provides the resulting WDM optical signal to the amplifier 408. The WSS 407 has the further function of equalizing the level of the WDM optical signal to be output to the amplifier 408. The amplifier 408 amplifies the WDM optical signal output from the WSS 407, and the amplified signal is output from the OADM 400.

Figure 4:
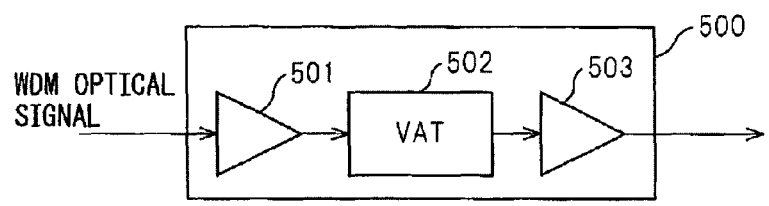
FIG. 4 is a diagram illustrating one example of an ILA depicted in FIG. 2.

FIG. 4 is a block diagram illustrating one example of the ILA depicted in FIG. 2. The ILA 500 includes an amplifier 501, a VAT 502, and an amplifier 503. The ILA 500 jointly amplifiers all the optical signals contained in the input WDM optical signal. The WDM optical signal is input to the amplifier 501 from outside the ILA 500. The amplifier 501 amplifies the externally input WDM optical signal, and supplies the amplified signal to the VAT 502.

The VAT (Variable Attenuator) 502 controls the power of the WDM optical signal output from the amplifier 501 by applying a variable amount of attenuation to the WDM optical signal output from the amplifier 501. The VAT 502 supplies the thus controlled WDM optical signal to the amplifier 503. The amplifier 503 amplifies the WDM optical signal output from the VAT 502, and the amplified signal is output from the ILA 500.

Figure 5:
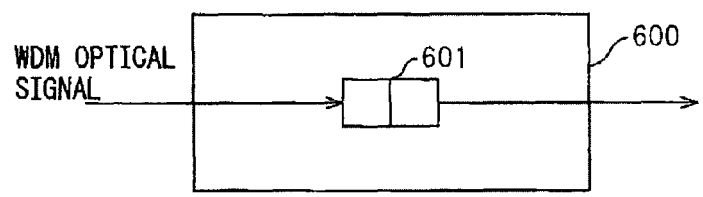
FIG. 5 is a diagram illustrating one example of a bypass depicted in FIG. 2.

FIG. 5 is a block diagram illustrating one example of the bypass depicted in FIG. 2. The WDM optical signal is externally input to the bypass 600. The bypass 600 includes a connector 601 for connecting the output end of the optical fiber carrying the incoming WDM optical signal to the input end of an outgoing optical fiber. The WDM optical signal input into the bypass 600 passes through the connector portion 601 and is output from the bypass 600 without any processing.

In each of FIGS. 3 to 5, only one path is depicted that is directed from left to right in the figure, but actually, there is one more path having the same configuration but directed in the opposite direction through the equipment.

Figure 6:
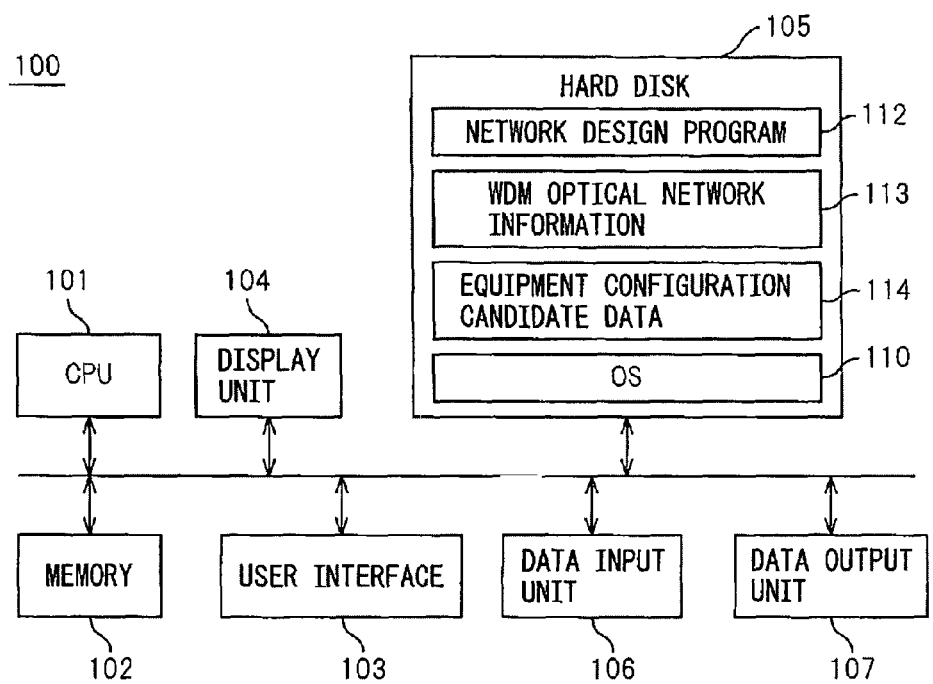
FIG. 6 is a diagram illustrating the hardware configuration of a network design apparatus of an embodiment implemented using a CPU.

FIG. 6 is a diagram illustrating the hardware configuration of the network design apparatus of an embodiment implemented using a CPU. The network design apparatus 100 includes, in addition to the CPU 101, a memory 102, a user interface 103 as a keyboard, mouse, etc. for accepting user operations and data inputs, a display unit 104, a hard disk 105, a data input unit 106, and a data output unit 107.

The data input unit 106 may be, for example, a CD-ROM drive unit or a DVD-ROM drive unit. Further, the data input unit 106 and the data output unit 107 may each be implemented by a flexible disk drive unit, a removable disk drive unit such as a CD-R drive unit, a DVD-R drive unit, or an MO drive unit, an access unit for accessing a flash memory device, or a network interface unit.

The data input unit 106 is used to supply the network design apparatus 100 with WDM optical network information necessary for the network design apparatus 100 to design the optical network, as will be described later.

The data output unit 107 is used to output the design data generated in the optical network design process by the network design apparatus 100.

The hard disk 105 stores an operating system (OS) 110, a network design program 112 installed via the data input unit 106, WDM optical network information 113 input via the data input unit 106, and equipment configuration candidate data 114 indicating optical transmission equipment configuration candidates generated as will be described later for each unit design section.

Figure 7:
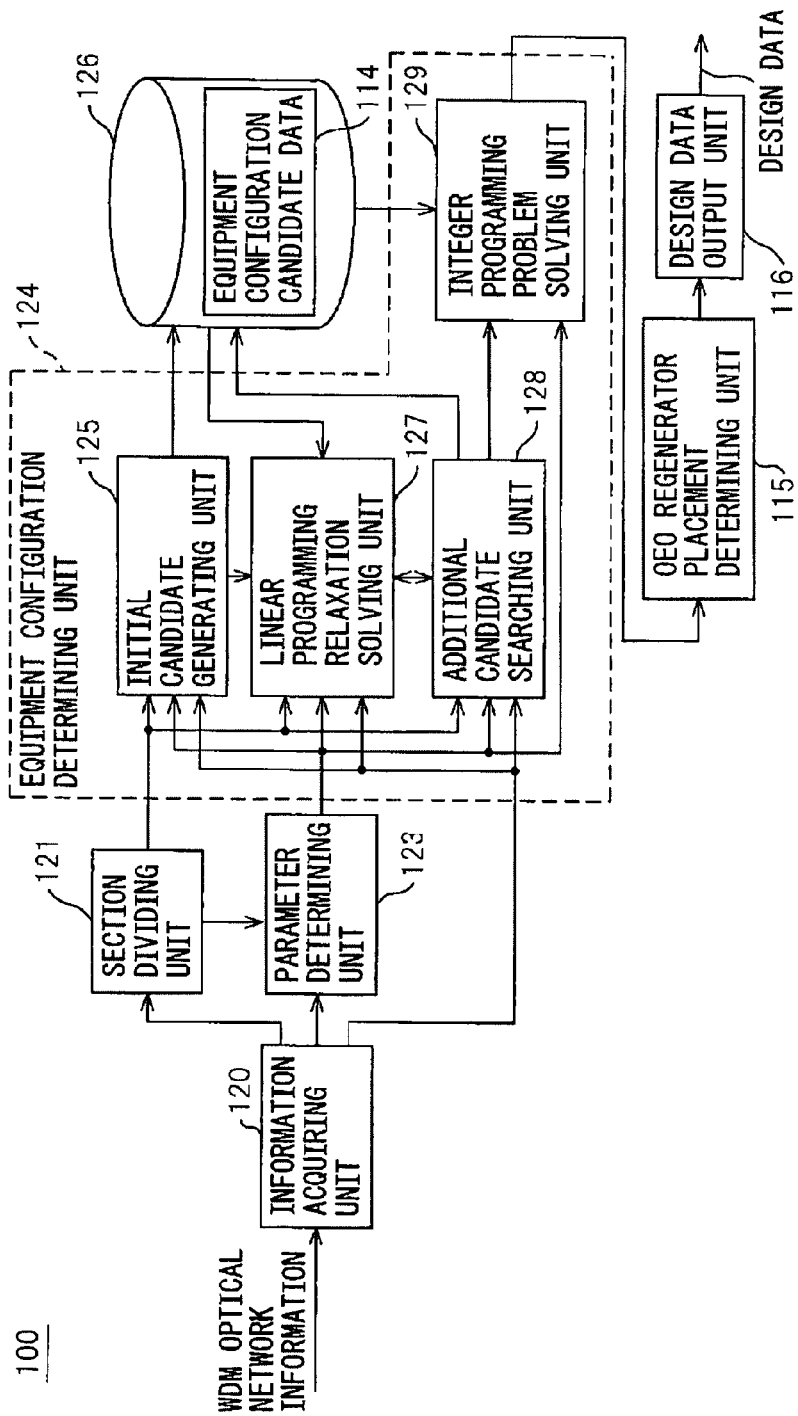
FIG. 7 is a block diagram of the network design apparatus implemented by causing the CPU depicted in FIG. 6 to execute a network design program.

FIG. 7 is a block diagram of the network design apparatus 100 implemented by causing the CPU 101 depicted in FIG. 6 to execute the network design program 112.

As depicted, the network design apparatus 100 includes an information acquiring unit 120, a section dividing unit 121, a parameter determining unit 123, an equipment configuration determining unit 124, a storage unit 126, an OEO regenerator placement determining unit 115, and a design data output unit 116.

In the present embodiment, the network design apparatus 100 is implemented through software processing by the CPU 101. However, the network design apparatus 100 may be implemented using dedicated hardware circuits. That is, some or all of the information acquiring unit 120, section dividing unit 121, parameter determining unit 123, equipment configuration determining unit 124, OEO regenerator placement determining unit 115, and design data output unit 116 may be implemented using dedicated hardware circuits.

The information acquiring unit 120 acquires the WDM optical network information. The WDM optical network information includes network topology information, optical transmission equipment information, span information, and wavelength path information.

The network topology information includes information concerning the stations constituting the optical network to be designed and information concerning the presence or absence of a connection between each station. The following description is a case in which the network design apparatus 100 designs the optical network 200 depicted in FIG. 1.

The optical transmission equipment information includes information concerning the type or kind of optical transmission equipment that can be placed at each particular station, information concerning the transmission path conditions of the optical transmission equipment, information concerning the type of OEO regenerator used in each particular wavelength path, and information concerning the cost needed for the placement of such equipment.

The kinds of optical transmission equipment include, for example, OADM, ILA, and bypass. The transmission conditions include the amount of noise occurring in the optical signal passing through each particular optical transmission equipment and the impairment values associated with it. The impairment values include, for example, PMD values and crosstalk values.

The span information includes information concerning the transmission path conditions that depend on the fiber connecting between adjacent stations. The transmission path conditions include, for example, the amount of optical power loss occurring due to the fiber connecting between adjacent stations and the impairment values associated with it.

The wavelength path information is information concerning the wavelength paths passing through the optical network 200. The wavelength path information includes information defining the number of wavelength paths and the kind of signal of each wavelength path, start point information and end point information specifying the stations serving as the start point and end point, respectively, and routing information specifying the spansstation via which each path is routed. The kind of signal of each wavelength path is defined, for example, by the bit rate.

The section dividing unit 121 divides the optical network 200, defined by the network topology information, into linear sections, i.e., unit design sections.

The parameter determining unit 123 determines each parameter used by the network design method accordance with an embodiment described below. Such parameters include, for example, the upper limit to the amount of noise allowed for each wavelength path passing through the optical network 200 and the upper limit to each impairment. The method for determining these parameters will be described later.

The parameter determining unit 123 is one of examples of the noise amount upper limit value determining unit described in the appended claims.

The equipment configuration determining unit 124 determines the optical transmission equipment configuration candidate for each of the unit design sections generated by the section dividing unit 121. The equipment configuration determining unit 124 determines the optical transmission equipment configuration of the optical network 200 by selecting from among the optical transmission equipment configuration candidates one optical transmission equipment configuration for each unit design section.

The OEO regenerator placement determining unit 115 determines the placement of OEO regenerators in the optical transmission equipment configuration determined by the equipment configuration determining unit 124. The OEO regenerator placement determining unit 115 generates the design data defining the optical transmission equipment configuration of the optical network 200 and the placement of OEO regenerators, by determining the placement of an OEO regenerator as required in each corresponding optical transmission equipment in the optical transmission equipment configuration determined by the equipment configuration determining unit 124.

The design data output unit 116 outputs the design data that contains information concerning the optical transmission equipment configuration determined by the equipment configuration determining unit 124 and information concerning the placement of OEO regenerators determined by the OEO regenerator placement determining unit 115.

In a first embodiment, the equipment configuration determining unit 124 determines the optical transmission equipment configuration of the optical network 200 by solving an integer programming problem having an objective function that minimizes the sum of the cost of the optical transmission equipment to be placed in the optical network 200 and the cost needed to place the necessary number of OEO regenerators for each wavelength path in the optical network 200, subject to the constraints that candidates are selected, one for each unit design section, from among the optical transmission equipment configuration candidates and that the number of OEO regenerators necessary for each wavelength path is determined by the cumulative amount of noise occurring along the wavelength path and the noise amount upper limit value determined for the wavelength path.

That is, the equipment configuration determining unit 124 determines the optical transmission equipment configuration of the optical network 200 by solving the integer programming problem given by the following equation (1).

[MATHEMATICAL 1]

$$\begin{aligned}
&\text{Minimize: } \sum_{i=1}^{M} c(t_i) \cdot s_i + \sum_{j=1}^{N} \lambda(d_j) \cdot r(d_j) \cdot x_j \quad (1\text{-}1) \\
&\text{Constraint equations: } \sum_{i=1}^{M} T(g_h, t_i) \cdot s_i = 1 \text{ (for } \forall g_h) \quad (1\text{-}2) \\
&n(d_1, s_1, s_2, \ldots s_M) - Nth(d_1) \cdot x_1 \le Nth(d_1) \\
&n(d_2, s_1, s_2, \ldots s_M) - Nth(d_2) \cdot x_2 \le Nth(d_2) \\
&\quad \vdots \\
&n(d_N, s_1, s_2, \ldots s_M) - Nth(d_N) \cdot x_N \le Nth(d_N)
\end{aligned} \quad (1)$$

(1-3)

In the integer programming problem (1), equation (1-1) corresponds to the objective function that minimizes the sum of the cost of the optical transmission equipment to be placed in the optical network 200 and the cost needed to place the necessary number of OEO regenerators for each wavelength path in the optical network 200.

Equation (1-2) corresponds to the constraint that candidates are selected, one for each unit design section, from among the optical transmission equipment configuration candidates.

Equation (1-3) corresponds to the constraint that the number of OEO regenerators necessary for each wavelength path is determined by the cumulative amount of noise occurring along the wavelength path and the noise amount upper limit determined for the wavelength path.

The meanings of the symbols used in equation (1) are as follows:

$g_h$ (h=1 to P) denotes a number, P, of unit design sections obtained by dividing the optical network 200.

$t_i$ indicates the optical transmission equipment configuration candidate determined for any one of the unit design sections $g_h$. When there are M determined optical transmission equipment configuration candidates, the subscript i takes any of the values 1, 2, ..., and M.

$s_i$ (i=1 to M) is a binary variable that indicates whether or not the optical transmission equipment configuration $t_i$ (i=1 to M) is selected as the optical transmission equipment configuration of the optical network 200. When the optical transmission equipment configuration ti is selected as the optical transmission equipment configuration of the optical network 200, $s_i$=1, otherwise $s_i$=0.

$d_j$ (j=1 to N) indicates each wavelength path constructed on the optical network 200. Here, j takes any of the values 1, 2, ..., and N. That is, a total of N wavelength paths $d_j$ are constructed on the optical network 200.

$x_j$ (j=1 to N) is an integer variable that indicates the number of OEO regenerators necessary for each wavelength path $d_j$.

$c(t_i)$ represents the cost needed to implement the transmission equipment configuration $t_i$.

$\lambda(d_j)$ represents the number of wavelength paths $d_j$.

$r(d_j)$ represents the cost per repeater, needed to install the OEO regenerators along the wavelength path $d_j$.

$T(g_h, t_i)$ is a binary parameter such that, when the transmission equipment configuration ti is the optical transmission equipment configuration candidate determined for the unit design section $g_h$, $T(g_h, t_i)$=1, otherwise $T(g_h, t_i)$=0.

$Nth(d_j)$ is the noise amount upper limit value determined for the wavelength path $d_j$ by the parameter determining unit 123. $Nth(d_j)$ represents the noise amount corresponding to the OSNR tolerance which is determined according to the kind of signal of the wavelength path $d_j$ defined by the wavelength path information.

$n(d_j, s_1, s_2, \ldots, s_M)$ represents the cumulative amount of noise occurring along the wavelength path $d_j$ depending on the optical transmission equipment configuration selected for each unit design section specified by a binary variable vector $(s_1, s_2, \ldots, s_M)$, and is given by the following equation (2).

[MATHEMATICAL 2]

$$n(d_j, s_1, s_2, \ldots s_M) = \sum_{i=1}^{M} \left\{ \begin{array}{c} (1 - Re(d_j, t_i)) \cdot \\ nf(t_i) + \\ Re(d_j, t_i) \cdot nr(t_i) \end{array} \right\} \cdot I(d_j, t_i) \cdot s_i \quad (2)$$

The meanings of the symbols used in equation (2) are as follows:

$Re(d_j, t_i)$ is a binary parameter such that, when the wavelength path $d_j$ passes through the unit design section $g_h$ whose optical transmission equipment configuration candidate is $t_i$, and when the reference direction predetermined for the unit design section $g_h$ is the same as the transmission direction of the wavelength path $d_j$, $Re(d_j, t_i)$=0, otherwise $Re(d_j, t_i)$=1.

$I(d, t_i)$ is a binary parameter such that, when the wavelength path $d_j$ passes through the unit design section $g_h$ whose optical transmission equipment configuration candidate is $t_i$, $I(d, t_i)$=1, otherwise $I(d, t_i)$=0.

$nf(t_i)$ indicates the amount of noise that occurs on the wavelength path propagating along the unit design section $g_h$ in the same direction as the reference direction when $t_i$ is selected as the optical transmission equipment configuration for the unit design section $g_h$ whose optical transmission equipment configuration candidate is $t_i$.

$nr(t_i)$ indicates the amount of noise that occurs on the wavelength path propagating along the unit design section $g_h$ in the direction opposite to the reference direction when ti is selected as the optical transmission equipment configuration for the unit design section $g_h$ whose optical transmission equipment configuration candidate is $t_i$.

The values of $nf(t_i)$ and $nr(t_i)$ are determined by the amount of transmission loss of the optical signal intensity between adjacent stations, defined by the span information, and the amount of noise occurring in the optical signal passing through the optical transmission equipment constituting the optical transmission equipment configuration $t_i$ and defined by the optical transmission equipment information.

In a second embodiment, the equipment configuration determining unit 124 determines the optical transmission equipment configuration of the optical network 200 by solving the following integer programming problem (3) constructed by adding, to the integer programming problem given by equation (1), the constraint that the number of OEO regenerators necessary for each wavelength path is determined by the cumulative amount of the impairment occurring on the wavelength path and the impairment upper limit value determined for the wavelength path.

The noise amount upper limit value $Nth'(d_j)$ that considers the impairment is used instead of the noise amount upper limit value $Nth(d_j)$ used in the integer programming problem (1).

[MATHEMATICAL 3]

$$\text{Minimize } \sum_{i=1}^{M} c(t_i) \cdot s_i + \sum_{j=1}^{N} \lambda(d_j) \cdot r(d_j) \cdot x_j \quad (3\text{-}1)$$

$$\text{Constraint equations } \sum_{i=1}^{M} T(g_h, t_i) \cdot s_i = 1 \text{ (for } \forall g_h) \quad (3\text{-}2)$$

$$\left.\begin{array}{l} n(d_1, s_1, s_2, \ldots s_M) - Nth'(d_1) \cdot x_1 \le Nth'(d_1) \\ n(d_2, s_1, s_2, \ldots s_M) - Nth'(d_2) \cdot x_2 \le Nth'(d_2) \\ \vdots \\ n(d_N, s_1, s_2, \ldots s_M) - Nth'(d_N) \cdot x_N \le Nth'(d_N) \end{array}\right\} \quad (3\text{-}3)$$

$$\left.\begin{array}{l} p_1(d_1, s_1, s_2, \ldots s_M) - Pth_1(d_1) \cdot x_1 \le Pth_1(d_1) \\ p_1(d_2, s_1, s_2, \ldots s_M) - Pth_1(d_2) \cdot x_2 \le Pth_1(d_2) \\ \vdots \\ p_1(d_N, s_1, s_2, \ldots s_M) - Pth_1(d_N) \cdot x_N \le Pth_1(d_N) \end{array}\right\} \quad (3\text{-}41)$$

$$\left.\begin{array}{l} p_2(d_1, s_1, s_2, \ldots s_M) - Pth_2(d_1) \cdot x_1 \le Pth_2(d_1) \\ p_2(d_2, s_1, s_2, \ldots s_M) - Pth_2(d_2) \cdot x_2 \le Pth_2(d_2) \\ \vdots \\ p_2(d_N, s_1, s_2, \ldots s_M) - Pth_2(d_N) \cdot x_N \le Pth_2(d_N) \end{array}\right\} \quad (3\text{-}42)$$

$$\vdots$$

$$\left.\begin{array}{l} p_R(d_1, s_1, s_2, \ldots s_M) - Pth_R(d_1) \cdot x_1 \le Pth_R(d_1) \\ p_R(d_2, s_1, s_2, \ldots s_M) - Pth_R(d_2) \cdot x_2 \le Pth_R(d_2) \\ \vdots \\ p_R(d_N, s_1, s_2, \ldots s_M) - Pth_R(d_N) \cdot x_N \le Pth_R(d_N) \end{array}\right\} \quad (3\text{-}4R)$$

In the integer programming problem (3), equation (3-1) corresponds to the objective function that minimizes the sum of the cost of the optical transmission equipment to be placed in the optical network 200 and the cost needed to place the necessary number of OEO regenerators for each wavelength path in the optical network 200.

Equation (3-2) corresponds to the constraint that candidates are selected, one for each unit design section, from among the optical transmission equipment configuration candidates.

Equation (3-3) corresponds to the constraint that the number of OEO regenerators necessary for each wavelength path is determined by the cumulative amount of noise occurring along the wavelength path and the noise amount upper limit determined for the wavelength path.

Equations (3-41), (3-42), . . . , and (3-4R) each correspond to the constraint that the number of OEO regenerators necessary for each wavelength path is determined by the cumulative amount of the impairment occurring on the wavelength path and the impairment upper limit determined for the wavelength path.

More than one kind of impairment may be considered here. For example, two kinds of impairments, one due to PMD and the other due to crosstalk, may be considered. Of the constraint equations (3-41), (3-42), . . . , and (3-4R), the k-th constraint equation (3-4k) defines the constraint for the k-th kind of impairment out of the R kinds of impairments to be considered.

The meanings of the symbols used in equation (3) will be described below. In equation (3), the same symbols are used for the same terms as the terms appearing in equations (1) and (2). The description of the same symbols as those in equations (1) and (2) will not be repeated here.

$Pth_k(d_j)$ is the upper limit value of the k-th kind of impairment that the parameter determining unit 123 determined for the wavelength path $d_j$. $Pth_k(d_j)$ is a value uniquely determined according to the kind of signal of the wavelength path $d_j$ defined by the wavelength path information.

$p_k(d_j, s_1, s_2, \ldots, s_M)$ represents the cumulative amount of the k-th kind of impairment occurring on the wavelength path $d_j$ depending on the optical transmission equipment configuration selected for each unit design section specified by a binary variable vector $(s_1, s_2, \ldots, s_M)$, and is given by the following equation (4).

[MATHEMATICAL 4]

$$p_k(d_j, s_1, s_2, \ldots s_M) = \sum_{i=1}^{M} \left\{ \begin{array}{l} (1 - Re(d_j, t_i)) \cdot \\ pf_{kj}(t_i) + \\ Re(d_j, t_i) \cdot pr_{kj}(t_i) \end{array} \right\} \cdot I(d_j, t_i) \cdot s_i \quad (4)$$

$pf_{kj}(t_i)$ represents the amount of the k-th kind of impairment occurring on the wavelength path of the same kind of signal as that of the wavelength path $d_j$ when transmitting the signal along the unit design section $g_h$ in the same direction as the reference direction, when $t_i$ is selected as the optical transmission equipment configuration for the unit design section $g_h$ whose optical transmission equipment configuration candidate is $t_i$.

$pr_{kj}(t_i)$ represents the amount of the k-th kind of impairment occurring on the wavelength path of the same kind of signal as that of the wavelength path $d_j$ when transmitting the signal along the unit design section $g_h$ in the direction opposite to the reference direction, when $t_i$ is selected as the optical transmission equipment configuration for the unit design section $g_h$ whose optical transmission equipment configuration candidate is $t_i$.

The values of $pf_{kj}(t_i)$ and $pr_{kj}(t_i)$ are each a value that can be linearly added for each unit design section, and are determined according to the kind of signal of the wavelength path $d_j$ defined by the wavelength path information, the amount of impairment occurring between adjacent stations, defined by the span information for the kind of signal of the wavelength path $d_j$, and the amount of impairment occurring in the optical signal of the same kind as that of the wavelength path $d_j$ passing through the optical transmission equipment constituting the optical transmission equipment configuration $t_i$ and defined by the optical transmission equipment information. For example, in the case of polarization mode dispersion PMD, the square of the total PMD [ps] occurring on the path is the parameter that can be linearly added.

$Nth'(d_j)$ represents the noise amount upper limit value for the wavelength path $d_j$. The parameter determining unit 123 determines the noise amount upper limit value $Nth'(d_j)$ by one of the following three methods.

(First Example Method for Determining the Noise Amount Upper Limit Value $Nth'(d_j)$)

In this method, the parameter determining unit 123 determines the noise amount upper limit value $Nth'(d_j)$ based on the upper limit value $Pth_k(d_j)$ for each kind of impairment and the OSNR tolerance determined according to the kind of signal of each wavelength path $d_j$.

The parameter determining unit 123 determines the OSNR lower limit value given by the following equation (5) obtained by calculating the OSNR degrading component from the impairment upper limit value $Pth_k(d_j)$ and by adding the degrading component to the OSNR tolerance, and determines the noise amount corresponding to this OSNR lower limit value as the noise amount upper limit value $Nth'(d_j)$. In equation (5), $f_{kj}(Pth_k(d_j))$ is a function that calculates the OSNR degrading component due to the k-th kind of impairment from the upper limit value $Pth_k(d_j)$ of the k-th kind of impairment for the wavelength path $d_j$.

[MATHEMATICAL 5]

$$OSNR \text{ LOWER LIMIT VALUE} = \quad (5)$$
$$OSNR \text{ TOLERANCE} + \sum_{k=1}^{R} f_{kj}(Pth_k(d_j))$$

(Second Example Method for Determining the Noise Amount Upper Limit Value Nth'($d_j$))

In this method, the parameter determining unit 123 determines the noise amount upper limit value Nth'($d_j$) based on the OSNR tolerance, the upper limit value $Pth_k(d_j)$ for each kind of impairment, and the maximum value $Pmax_k(d_j)$ that the cumulative value of the impairment of each kind can take on each wavelength path $d_j$.

The parameter determining unit 123 determines the OSNR lower limit value given by the following equation (6) obtained by calculating the OSNR degrading component from the upper limit value $Pth_k(d_j)$ or the maximum value $Pmax_k(d_j)$, whichever is smaller, and by adding the degrading component to the OSNR tolerance, and determines the noise amount corresponding to this OSNR lower limit value as the noise amount upper limit value Nth'($d_j$).

[MATHEMATICAL 6]

$$OSNR \text{ LOWER LIMIT VALUE} = \quad (6)$$
$$OSNR \text{ TOLERANCE} + \sum_{k=1}^{R} k_{kj}(\min(Pth_k(d_j), Pmax_k(d_j)))$$

(Third Example Method for Determining the Noise Amount Upper Limit Value Nth'($d_j$))

In this method, the parameter determining unit 123 determines the noise amount upper limit value Nth'($d_j$) based on the OSNR tolerance, the minimum required number REGmin($d_j$) of OEO regenerators estimated for each wavelength path $d_j$, the upper limit value $Pth_k(d_j)$ for each kind of impairment, and the maximum value $Pmax_k(d_j)$ that the cumulative value of the impairment of each kind can take on each wavelength path $d_j$.

Of the largest integer values each smaller than the quotient of the minimum value $Pmin_k(d_j)$ that the cumulative value of the impairment can take on each wavelength path $d_j$ divided by the upper limit value $Pth_k(d_j)$ of the impairment

[MATHEMATICAL 7]

$$\text{int}\left\{ \frac{Pmin_k(d_j)}{Pth_k(d_j)} \right\}$$

the parameter determining unit 123 takes the largest value among the values calculated for the R kinds of impairments

[MATHEMATICAL 8]

$$REGmin(d_j) = \max_k \left[ \text{int}\left\{ \frac{Pmin_k(d_j)}{Pth_k(d_j)} \right\} \right]$$

and determines it as the minimum required number REGmin($d_j$) of OEO regenerators estimated for each wavelength path $d_j$.

The parameter determining unit 123 adds 1 to the minimum required number REGmin($d_j$) of OEO regenerators, and determines the sum (REGmin($d_j$)+1) as the number of sections into which the wavelength path $d_j$ is divided by the minimum required number of OEO regenerators.

As illustrated by the following equation (7), the parameter determining unit 123 determines the OSNR lower limit value by adding to the OSNR tolerance the OSNR degrading component calculated from the quotient of the maximum value $Pmax_k(d_j)$ that the cumulative value of the impairment can take on each wavelength path $d_j$ divided by the number of sections (REGmin($d_j$)+1) or from the upper limit value $Pth_k(d_j)$ of the impairment, whichever is smaller. The parameter determining unit 123 determines the noise amount corresponding to this OSNR lower limit value as the noise amount upper limit value Nth'($d_j$).

[MATHEMATICAL 9]

$$OSNR \text{ LOWER LIMIT VALUE} = \quad (7)$$
$$OSNR \text{ TOLERANCE} + \sum_{k=1}^{R} k_{kj}\left( \min\left\{ Pth_k(d_j), \frac{Pmax_k(d_j)}{(REGmin(d_j)+1)} \right\} \right)$$

According to the above method, since the maximum value of the impairment is estimated for each section when the path is divided into the minimum number of sections by the OEO regenerators, the noise amount upper limit value can be estimated more properly.

For example, suppose that, as the impairments, two kinds of impairments are considered, one being the impairment PMD due to polarization mode dispersion and the other being impairment XT due to crosstalk. For simplicity, it is assumed that the amount of each impairment [dB] can be linearly added and that $f_{kj}(Pth_k(d_j))=Pth_k(d_j)$.

It is also assumed that the upper limit value of PMD on a given wavelength path $d_j$ is 3 [dB] and that the maximum value of the cumulative value is 1 [dB] while the minimum value of the cumulative value is 0 [dB]. Similarly, it is assumed that the upper limit value of XT on that given wavelength path $d_j$ is 2 [dB] and that the maximum value of the cumulative value is 5 [dB] while the minimum value of the cumulative value is 4.5 [dB].

It is further assumed that the OSNR tolerance of the wavelength path $d_j$ is 16 [dB].

According to the first example method for determining the noise amount upper limit value Nth'($d_j$), the OSNR lower limit value is calculated as 16+3+2=21 [dB], and the noise amount corresponding to the OSNR lower limit value of 21 [dB] is determined as the noise amount upper limit value Nth'($d_j$).

According to the second example method for determining the noise amount upper limit value Nth'($d_j$), the OSNR lower limit value is calculated as 16+1+2=19 [dB], and the noise amount corresponding to the OSNR lower limit value of 19 [dB] is determined as the noise amount upper limit value Nth'($d_j$).

According to the third example method for determining the noise amount upper limit value Nth'($d_j$), from the minimum value 4.5 [dB] and upper limit value 2 [dB] of XT that has the larger minimum value, the minimum required number REGmin($d_j$) of OEO regenerators is calculated as int(4.5/2)=2. Accordingly, the wavelength path $d_j$ is divided into at least three sections by the OEO regenerators.

Since the values 1/3 and 5/3 obtained by dividing the maximum values of PMD and XT by 3 are both smaller than their upper limit values, the OSNR lower limit value is calculated as 16+1/3+5/3=18 [dB], and the noise amount corresponding to the OSNR lower limit value of 18 [dB] is determined as the noise amount upper limit value Nth'($d_j$).

Also in the first embodiment, the constraint equation (1-3) may be defined by replacing the noise amount upper limit value Nth($d_j$) in the constraint equation (1-3) by the noise amount upper limit value Nth'($d_j$) used in the constraint equation (3-3) of the second embodiment.

Similarly, in the second embodiment also, the constraint equation (3-3) may be defined by replacing the noise amount upper limit value Nth'($d_j$) in the constraint equation (3-3) by the noise amount upper limit value Nth($d_j$) used in the constraint equation (1-3) of the first embodiment.

The equipment configuration determining unit 124 depicted in FIG. 7 solves the integer programming problem given by equation (1) or (3), by following the procedures described below.

(Procedure 1)

By solving the linear programming relaxation with the binary variable $s_i$ (i=1 to M) and integer variable $x_j$ (j=1 to N) in equation (1) or (3) as real variables, the dual price vector associated with the constraints (1-2) and (1-3) or the constraints (3-2), (3-3), and (3-41) to (3-4R) is obtained.

The dual price vector associated with the constraints (1-2) and (3-2) is denoted as $\pi_g = (\pi_{g1}, \pi_{g2}, \ldots, \pi_{gP})$.

The dual price vector associated with the constraints (1-3) and (3-3) is denoted as $\pi n = (\pi n_1, \pi n_2, \ldots, \pi n_N)$.

The dual price vector associated with the constraint (3-4k) is denoted as $\pi P_k = (\pi p_{k1}, \pi p_{k2}, \ldots, \pi p_{kN})$.

(Procedure 2)

In accordance with the reduced-cost calculation equation determined based on the value of the dual price vector, the equipment configuration determining unit 124 searches for a new optical transmission equipment configuration candidate t' in which the value of the reduced cost is negative for each unit design section.

When solving the linear programming relaxation of the integer programming problem given by equation (1), the reduced cost RC(t') for the optical transmission equipment configuration candidate t' is given by the following equation (8).

[MATHEMATICAL 10]

$$RC(t') = c(t') - A + B \cdot nf(t') + C \cdot nr(t') \quad (8)$$

where $$\begin{cases} A = \pi_{g'} \\ B = -\sum_{j=1}^{N}(1 - Re(d_j, t')) \cdot \pi n_j \cdot I(d_j, t') \\ C = -\sum_{j=1}^{N} Re(d_j, t') \cdot \pi n_j \cdot I(d_j, t') \end{cases}$$

Symbol $\pi_{g'}$ is the component in the dual price vector $\pi_g$ that corresponds to the unit design section g' whose optical transmission equipment configuration candidate is the optical transmission equipment configuration t'. On the other hand, when solving the linear programming relaxation of the integer programming problem given by equation (3), the reduced cost RC(t') for the optical transmission equipment configuration candidate t' is given by the following equation (9).

[MATHEMATICAL 11]

(Procedure 3)

$$RC(t') = c(t') - A + B \cdot nf(t') + C \cdot nr(t') + \sum_{k=1}^{R}\sum_{j=1}^{N}\left\{\begin{array}{l} D_k \cdot pf_{kj}(t') + \\ E_k \cdot pr_{kj}(t') \end{array}\right\} \quad (9)$$

where $$\begin{cases} A = \pi_{g'} \\ B = -\sum_{j=1}^{N}(1 - Re(d_j, t')) \cdot \pi n_j \cdot I(d_j, t') \\ C = -\sum_{j=1}^{N} Re(d_j, t') \cdot \pi n_j \cdot I(d_j, t') \\ D = -(1 - Re(d_j, t_i)) \cdot \pi p_{kj} \cdot I(d_j, t') \\ E = -Re(d_j, t') \cdot \pi p_{kj} \cdot I(d_j, t') \end{cases}$$

When any new optical transmission equipment configuration candidate t' in which the value of the reduced cost is negative is no longer found, the equipment configuration determining unit 124 determines the optical transmission equipment configuration of the optical network 200 by solving the integer programming problem given by equation (1) or (3) without linear programming relaxing the integer programming problem for the so-far found optical transmission equipment configuration candidates, and by selecting one optical transmission equipment configuration for each unit design section from among the so-far found optical transmission equipment configuration candidates.

The equipment configuration determining unit 124 depicted in FIG. 7 includes an initial candidate generating unit 125, a linear programming relaxation solving unit 127, an additional candidate searching unit 128, and an integer programming problem solving unit 129.

The combination of the initial candidate generating unit 125, the linear programming relaxation solving unit 127, and the additional candidate searching unit 128 is one examples of the combination candidate determining unit described in the appended claims.

The integer programming problem solving unit 129 is one examples of the equipment placement unit described in the appended claims.

The linear programming relaxation solving unit 127 reads the equipment configuration candidate data 114 stored in the storage unit 126, and determines the dual price vector by solving the linear programming relaxation of the integer programming problem given by equation (1) or (3) for the optical transmission equipment configuration candidate indicated by the equipment configuration candidate data 114.

Prior to the processing by the linear programming relaxation solving unit 127, the initial candidate generating unit 125 generates, for each unit design section, at least one optical transmission equipment configuration candidate, and stores the candidate in the storage unit 126.

In accordance with the reduced-cost calculation equation determined based on the value of the dual price vector determined by the linear programming relaxation solving unit 127, the additional candidate searching unit 128 searches for a new optical transmission equipment configuration candidate t' in which the value of the reduced cost is negative for each unit design section. The additional candidate searching unit 128 adds the newly found candidate t' to the equipment configuration candidate data 114.

The integer programming problem solving unit 129 reads the equipment configuration candidate data 114 stored in the storage unit 126 and containing the candidates determined by the initial candidate generating unit 125 and the additional candidate searching unit 128, and determines the optical transmission equipment configuration of the optical network 200 by solving the integer programming problem given by equation (1) or (3) without relaxing the integer programming problem for the optical transmission equipment configuration candidates indicated by the equipment configuration candidate data 114.

Figure 8:
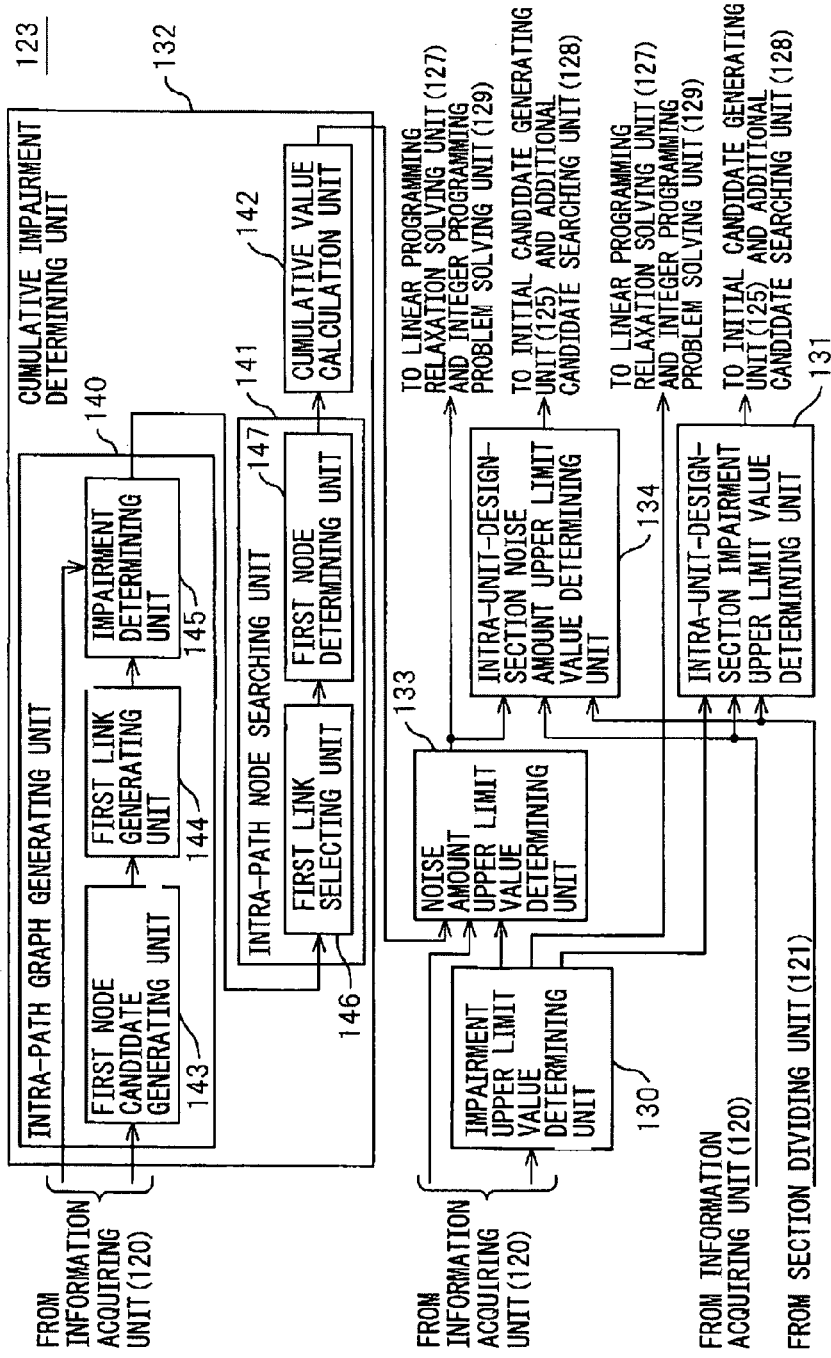
FIG. 8 is a block diagram of a parameter determining unit depicted in FIG. 7.

Next, the configuration of each unit depicted in FIG. 7 and the processing performed by each unit will be described. FIG. 8 is a block diagram of the parameter determining unit 123 depicted in FIG. 7.

The parameter determining unit 123 includes a impairment upper limit value determining unit 130, an intra-unit-design-section impairment upper limit value determining unit 131, a cumulative impairment determining unit 132, a noise amount upper limit value determining unit 133, and an intra-unit-design-section noise amount upper limit value determining unit 134.

The impairment upper limit value determining unit 130 determines the impairment upper limit value $Pth_k(d_j)$ for each wavelength path $d_j$ and for each kind k of impairment in accordance with the kind of signal of the wavelength path $d_j$ defined by the wavelength path information.

The impairment upper limit value $Pth_k(d_j)$ output from the impairment upper limit value determining unit 130 is input to the intra-unit-design-section impairment upper limit value determining unit 131. Among the impairment upper limit values $Pth_k(d_j)$ (j=1 to N) determined for the wavelength paths $d_j$ passing through the respective unit design sections, the intra-unit-design-section impairment upper limit value determining unit 131 selects the smallest value as the intra-unit-design-section impairment upper limit value for each unit design section and for each of the R kinds of impairments.

The intra-unit-design-section impairment upper limit value determining unit 131 determines the intra-unit-design-section impairment upper limit value for each path transmission direction of the unit section. That is, for the unit section leading from station A to station B, the intra-unit-design-section impairment upper limit value determining unit 131 determines the intra-unit-design-section impairment upper limit value for the transmission path directed from the station A to the station B and the intra-unit-design-section impairment upper limit value for the transmission path directed from the station B to the station A.

The intra-unit-design-section impairment upper limit values determined for the respective transmission directions of the unit design section $g_h$ for the k-th kind of impairment are denoted as $Pth1_k(g_h)$ and $Pth2_k(g_h)$ (k=1 to R, h=1 to P), respectively.

The cumulative impairment determining unit 132 determines the maximum value $Pmax_k(d_j)$ that the cumulative value of the impairment can take on each wavelength path $d_j$, or the maximum value $Pmax_k(d_j)$ and minimum value $Pmin_k(d_j)$ that the cumulative value of the impairment can take on each wavelength path $d_j$. The processing performed by the cumulative impairment determining unit 132 will be described later.

The noise amount upper limit value determining unit 133 determines the noise amount upper limit value $Nth(d_j)$ or Nth'.

When determining the noise amount upper limit value $Nth(d_j)$, the noise amount upper limit value determining unit 133 determines as the noise amount upper limit value $Nth(d_j)$ the noise amount corresponding to the OSNR tolerance which is determined according to the kind of signal of the wavelength path $d_j$ defined by the wavelength path information.

When determining the noise amount upper limit value $Nth'(d_j)$ in accordance with the earlier given equation (5), the noise amount upper limit value determining unit 133 determines the noise amount upper limit value $Nth'(d_j)$ based on the OSNR tolerance which is determined according to the kind of signal of the wavelength path $d_j$ defined by the wavelength path information and on the impairment upper limit value $Pth_k(d_j)$ determined by the impairment upper limit value determining unit 130.

When determining the noise amount upper limit value $Nth'(d_j)$ in accordance with the earlier given equation (6), the noise amount upper limit value determining unit 133 determines the noise amount upper limit value $Nth'(d_j)$ based on the OSNR tolerance which is determined according to the kind of signal of the wavelength path $d_j$ defined by the wavelength path information and on the impairment upper limit value $Pth_k(d_j)$ determined by the impairment upper limit value determining unit 130 and the maximum value $Pmax_k(d_j)$ of the cumulative impairment value determined by the cumulative impairment determining unit 132.

When determining the noise amount upper limit value $Nth'(d_j)$ in accordance with the earlier given equation (7), the noise amount upper limit value determining unit 133 determines the noise amount upper limit value $Nth'(d_j)$ based on the OSNR tolerance which is determined according to the kind of signal of the wavelength path $d_j$ defined by the wavelength path information and on the impairment upper limit value $Pth_k(d_j)$ determined by the impairment upper limit value determining unit 130 and the maximum value $Pmax_k(d_j)$ and minimum value $Pmin_k(d_j)$ of the cumulative impairment value determined by the cumulative impairment determining unit 132.

The noise amount upper limit value $Nth(d_j)$ or $Nth'(d_j)$ output from the noise amount upper limit value determining unit 133 is input to the intra-unit-design-section noise amount upper limit value determining unit 134. Among the noise amount upper limit values determined for the wavelength paths $d_j$ passing through the respective unit design sections, the intra-unit-design-section noise amount upper limit value determining unit 134 selects the smallest value as the intra-unit-design-section noise amount upper limit value for each unit design section.

The intra-unit-design-section noise amount upper limit value determining unit 134 determines the intra-unit-design-section noise amount upper limit value for each path transmission direction of the unit section. That is, for the unit section leading from station A to station B, the intra-unit-design-section noise amount upper limit value determining unit 134 determines the intra-unit-design-section noise amount upper limit value for the transmission path directed from the station A to the station B and the intra-unit-design-section noise amount upper limit value for the transmission path directed from the station B to the station A.

The intra-unit-design-section noise upper limit values determined for the respective transmission directions of the unit design section $g_h$ are denoted as $Nth1(g_h)$ and $Nth2(g_h)$ (h=1 to P), respectively.

The cumulative impairment determining unit 132 includes an intra-path graph generating unit 140, an intra-path node searching unit 141, and a cumulative value calculation unit 142. Based on the information acquired by the information acquiring unit 120, the intra-path graph generating unit 140 generates loopless directed graph information including the nodes corresponding to the candidates for the various kinds of optical transmission equipment to be placed at the respective stations through which the wavelength path $d_j$ passes and the links, each assigned an impairment value, for interconnecting the respective nodes.

The intra-path graph generating unit 140 includes a first node candidate generating unit 143, a first link generating unit 144, and an impairment determining unit 145. Based on the optical transmission equipment information, the first node candidate generating unit 143 generates, for each station, one or more nodes corresponding to the various kinds of optical transmission equipment that can be placed.

For example, suppose that stations 1 and 2 are contained in the section through which the wavelength path $d_j$ passes. If optical transmission equipment A or B, whichever is appropriate, can be placed at the station 1, the first node candidate generating unit 143 generates a node 1A, which corresponds to the case where the optical transmission equipment A is placed at the station 1, and a node 1B, which corresponds to the case where the optical transmission equipment B is placed at the station 1.

On the other hand, if only the optical transmission equipment A can be placed at the station 2, the first node candidate generating unit 143 generates a node 2A, which corresponds to the case where the optical transmission equipment A is placed at the station 2. The first node candidate generating unit 143 supplies the thus generated nodes to the first link generating unit 144. In this way, the first node candidate generating unit 143 generates one or more nodes for each station contained in the section through which the wavelength path $d_j$ passes.

For each node supplied from the first node candidate generating unit 143, the first link generating unit 144 generates an input link leading from each node corresponding to a station upstream of the station corresponding to the current node. For example, when there are two nodes 1A and 1B corresponding to the station 1 and one node 2A corresponding to station 2 downstream of the station 1, the first link generating unit 144 generates an input link leading from the node 1A to the node 2A and an input link leading from the node 1B to the node 2A.

The first link generating unit 144 supplies the thus generated input links to the impairment determining unit 145 together with the nodes generated by the first node candidate generating unit 143.

Then, based on the kind of signal of the wavelength path $d_j$ defined by the wavelength path information, the amount of impairment occurring between adjacent stations, defined by the span information for the kind of signal of the wavelength path $d_j$, and the amount of impairment occurring in the optical signal of the same kind as that of the wavelength path $d_j$ passing through the various kinds of optical transmission equipment defined by the optical transmission equipment information, the impairment determining unit 145 determines for each kind of impairment the amount of impairment that occurs on the wavelength path $d_j$ when each input link generated by the first link generating unit 144 is selected.

For example, for the input link leading from the node 1A to the node 2A, the impairment determining unit 145 calculates the amount of impairment that occurs on the wavelength path $d_j$ when this input link is selected.

Further, for the input link leading from the node 1B to the node 2A, the impairment determining unit 145 calculates the amount of impairment that occurs on the wavelength path $d_j$ when this input link is selected.

The impairment determining unit 145 supplies the thus calculated impairment amounts to the intra-path node searching unit 141 together with the nodes generated by the first node candidate generating unit 143 and the input links generated by the first link generating unit 144.

When the cumulative impairment determining unit 132 determines the maximum value $Pmax_k(d_j)$ of the cumulative value of the impairment, the intra-path node searching unit 141 searches through the graph information supplied from the intra-path graph generating unit 140 for the path corresponding to the placement that maximizes the cumulative value of the impairment for each kind of impairment.

On the other hand, when the cumulative impairment determining unit 132 determines the minimum value $Pmin_k(d_j)$ of the cumulative value of the impairment, the intra-path node searching unit 141 searches through the graph information supplied from the intra-path graph generating unit 140 for the path corresponding to the placement that minimizes the cumulative value of the impairment for each kind of impairment.

The intra-path node searching unit 141 includes a first link selecting unit 146 and a first node determining unit 147. The first link selecting unit 146 selects an input link for each node supplied from the intra-path graph generating unit 140. That is, for each node generated by the first node candidate generating unit 143, the first link selecting unit 146 selects one of the input links that the first link generating unit 144 generated for that node.

When the cumulative impairment determining unit 132 determines the maximum value $Pmax_k(d_j)$ of the cumulative value of the impairment, the first link selecting unit 146 selects an input link such that, when the input link is selected, the impairment that accumulates up to the attention node becomes maximum.

On the other hand, when the cumulative impairment determining unit 132 determines the minimum value $Pmin_k(d_j)$ of the cumulative value of the impairment, the first link selecting unit 146 selects an input link such that, when the input link is selected, the impairment that accumulates up to the attention node becomes minimum.

For example, suppose that there are two input links to the attention node 2A, one being the input link (1A, 2A) leading from the node 1A and the other the input link (1B, 2A) leading from the node 1B, and that the impairments accumulated up to the nodes 1A and 1B, respectively, are PNacc(1A) and PNacc(1B), while the impairments that occur when the input links (1A, 2A) and (1B, 2A) are respectively selected are PN(1A, 2A) and PN(1B, 2A), respectively.

In this case, the first link selecting unit 146 compares the impairment that accumulates up to the node 2A when the input link (1A, 2A) is selected for the node 2A, i.e., PNacc(1A)+PN(1A, 2A), with the impairment that accumulates up to the node 2A when the input link (1B, 2A) is selected, i.e., PNacc(1B)+PN(1B, 2A).

When the cumulative impairment determining unit 132 determines the maximum value $Pmax_k(d_j)$, the first link selecting unit 146 selects the input link (1A, 2A) if the former is larger and selects the input link (1B, 2A) if the latter is larger.

On the other hand, when the cumulative impairment determining unit 132 determines the minimum value $Pmin_k(d_j)$, the first link selecting unit 146 selects the input link (1A, 2A) if the former is smaller and selects the input link (1B, 2A) if the latter is smaller.

The first link selecting unit 146 supplies the input links selected for the respective nodes to the first node determining unit 147 together with the impairment amounts calculated by the impairment determining unit 145.

Based on the starting point nodes of the input links supplied from the first link selecting unit 146, the first node determining unit 147 determines the placement of the various kinds of optical transmission equipment for the respective stations contained in the section through which the wavelength path $d_j$ passes. For example, when the starting point nodes of the input links supplied from the first link selecting unit 146 are the node 1A, node 2B, node 3A, etc., the first node determining unit 147 takes the placement of the optical transmission equipment corresponding to the node 1A, node 2B, node 3A, etc., to determine the placement of the various kinds of optical transmission equipment for the respective stations.

The first node determining unit 147 supplies the thus determined nodes to the cumulative value calculation unit 142 together with the impairment amounts calculated by the impairment determining unit 145.

The cumulative value calculation unit 142 determines for each kind of impairment the impairment that accumulates along the path passing through each node determined by the first node determining unit 147, and supplies it to the noise amount upper limit value determining unit 133.

Figure 9:
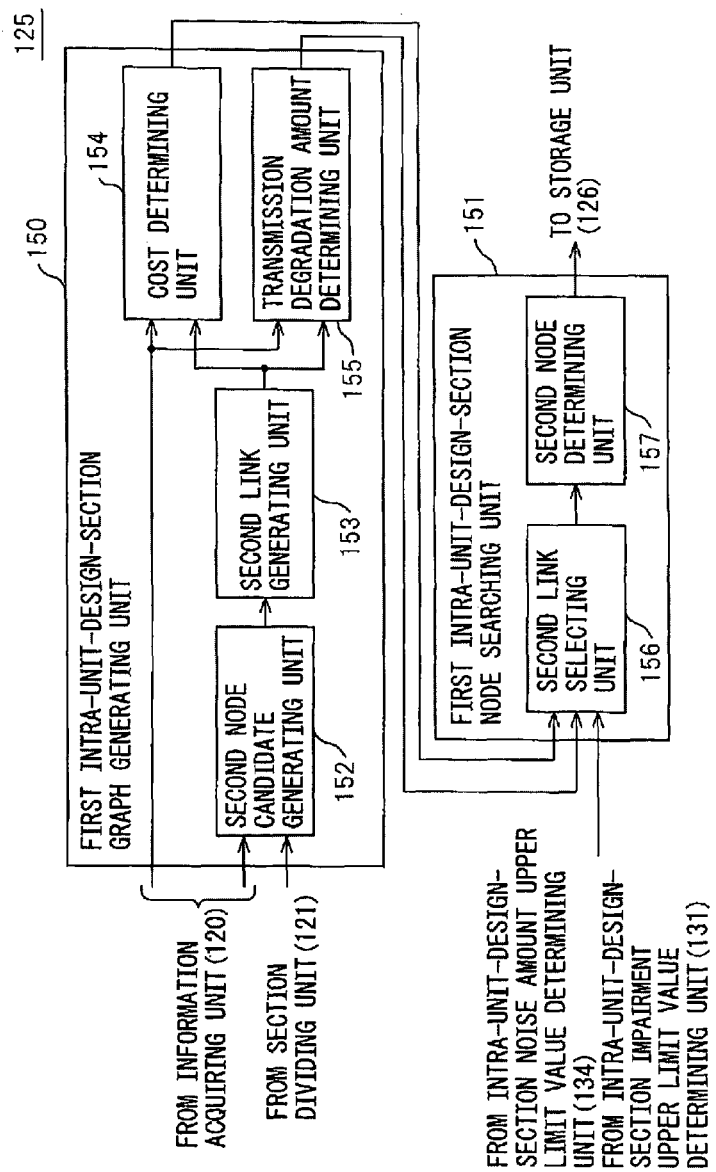
FIG. 9 is a block diagram of an initial candidate generating unit depicted in FIG. 7.

FIG. 9 is a block diagram of the initial candidate generating unit 125 depicted in FIG. 7. The initial candidate generating unit 125 includes a first intra-unit-design-section graph generating unit 150 and a first intra-unit-design-section node searching unit 151.

Based on the information acquired by the information acquiring unit 120 and the information concerning each unit design section $g_h$ that the section dividing unit 121 generated by dividing the optical network 200, the first intra-unit-design-section graph generating unit 150 generates loopless directed graph information including the nodes corresponding to the candidates for the various kinds of optical transmission equipment to be placed along each unit design section $g_h$ and the links, each assigned a impairment value, for interconnecting the respective nodes.

The first intra-unit-design-section graph generating unit 150 includes a second node candidate generating unit 152, a second link generating unit 153, a cost determining unit 154, and a transmission degradation amount determining unit 155. Based on the optical transmission equipment information, the second node candidate generating unit 152 generates, for each station in the unit design section $g_h$, one or more nodes corresponding to the various kinds of optical transmission equipment that can be placed.

For example, suppose that stations 1 and 2 are contained in the unit design section $g_h$. If optical transmission equipment A or B, whichever is appropriate, can be placed at the station 1, the second node candidate generating unit 152 generates a node 1A, which corresponds to the case where the optical transmission equipment A is placed at the station 1, and a node 1B, which corresponds to the case where the optical transmission equipment B is placed at the station 1.

On the other hand, if only the optical transmission equipment A can be placed at the station 2, the second node candidate generating unit 152 generates a node 2A, which corresponds to the case where the optical transmission equipment A is placed at the station 2. The second node candidate generating unit 152 supplies the thus generated nodes to the second link generating unit 153.

For each node supplied from the second node candidate generating unit 152, the second link generating unit 153 generates an input link leading from each node corresponding to a station upstream of the station corresponding to the current node. For example, when there are two nodes 1A and 1B corresponding to the station 1 and one node 2A corresponding to the station 2 downstream of the station 1, the second link generating unit 153 generates an input link leading from the node 1A to the node 2A and an input link leading from the node 1B to the node 2A.

The second link generating unit 153 supplies the thus generated input links to the cost determining unit 154 and the transmission degradation amount determining unit 155 together with the nodes generated by the second node candidate generating unit 152.

Then, based on the cost of the various kinds of optical transmission equipment defined by the optical transmission equipment information, the cost determining unit 154 determines for each input link generated by the second link generating unit 153 the cost that occurs when the input link is selected. The cost calculated here may, for example, be the cost of the optical transmission equipment to be placed at each station.

For example, for the input link leading from the node 1A to the node 2A, the cost determining unit 154 calculates the cost that occurs when this input link is selected. Further, for the input link leading from the node 1B to the node 2A, the cost determining unit 154 calculates the cost that occurs when this input link is selected.

Based on the amount of noise and the amount of impairment occurring between adjacent stations, defined by the span information, and the amount of noise and the amount of impairment occurring in the optical signal passing through the various kinds of optical transmission equipment defined by the optical transmission equipment information, the transmission degradation amount determining unit 155 determines for each input link generated by the second link generating unit 153 the amount of transmission degradation, i.e., the amount of noise and the amount of impairment for each kind of impairment, that occurs when the input link is selected.

For example, for the input link leading from the node 1A to the node 2A, the transmission degradation amount determining unit 155 calculates the amount of noise and the amount of impairment that occur when this input link is selected. Further, for the input link leading from the node 1B to the node 2A, the transmission degradation amount determining unit 155 calculates the amount of noise and the amount of impairment that occur when this input link is selected.

The transmission degradation amount determining unit 155 determines the amount of noise and the amount of impairment for the forward direction and backward direction of the input link. That is, for the input link leading from the station A to the station B, the transmission degradation amount determining unit 155 determines the amount of noise and the amount of impairment that occur on the path directed from the station A to the station B and the amount of noise and the amount of impairment that occur on the path directed from the station B to the station A.

The transmission degradation amount determining unit 155 supplies the thus calculated transmission degradation amounts to the first intra-unit-design-section node searching unit 151 together with the nodes generated by the second node candidate generating unit 152 and the input links generated by the second link generating unit 153.

The cost determining unit 154 supplies the calculated cost to the first intra-unit-design-section node searching unit 151.

The first intra-unit-design-section node searching unit 151 searches through the graph information supplied from the first intra-unit-design-section graph generating unit 150 for the path corresponding to the placement that minimizes the cost and in which the transmission degradation amounts that occur along the path between adjacent stations each provided with equipment capable of accommodating an OEO regenerator are held within their respective upper limits. The first intra-unit-design-section node searching unit 151 includes a second link selecting unit 156 and a second node determining unit 157. The second link selecting unit 156 selects an input link for each node supplied from the first intra-unit-design-section graph generating unit 150.

That is, for each node generated by the second node candidate generating unit 152, the second link selecting unit 156 selects one of the input links that the second link generating unit 153 generated for that node. At this time, the second link selecting unit 156 selects an input link such that, when the input link is selected, the cost that accumulates up to the attention node becomes minimum.

For example, suppose that there are two input links to the attention node 2A, one being the input link (1A, 2A) leading from the node 1A and the other the input link (1B, 2A) leading from the node 1B, and that the costs accumulated up to the nodes 1A and 1B, respectively, are COSTacc(1A) and COSTacc(1B), while the costs that occur when the input links (1A, 2A) and (1B, 2A) are respectively selected are COST(1A, 2A) and COST(1B, 2A), respectively.

In this case, the second link selecting unit 156 compares the cost that accumulates up to the node 2A when the input link (1A, 2A) is selected for the node 2A, i.e., COSTacc(1A)+COST(1A, 2A), with the cost that accumulates up to the node 2A when the input link (1B, 2A) is selected, i.e., COSTacc(1B)+COST(1B, 2A); if the former is smaller, the input link (1A, 2A) is selected, but if the latter is smaller, the input link (1B, 2A) is selected.

From among the input links generated for the attention node by the first intra-unit-design-section graph generating unit 150, the second link selecting unit 156 selects any input link such that, when the input link is selected, the transmission degradation amount that accumulates up to each node corresponding to a station downstream of the attention node and corresponding to the optical transmission equipment capable of accommodating an OEO regenerator (each such node will hereinafter called a "downstream OEO regenerative node") is held within the threshold value, and then selects from among such input links the input link that minimizes the cost.

For example, suppose that there is a station 3 downstream of the station 2 corresponding to the node 2A and, of the nodes 3A and 3B corresponding to the station 3, the node 3A is the optical transmission equipment capable of accommodating an OEO regenerator; in this case, the second link selecting unit 156 selects the node 3A as the downstream OEO regenerative node. Then, the second link selecting unit 156 selects the input link that minimizes the cost from among the input links that, when selected, the transmission degradation amount that accumulates up to the node 3A is held within the threshold value.

On the other hand, if there are a plurality of downstream OEO regenerative nodes downstream of the node 2A, first the node where the transmission degradation amount from the node 2A is the smallest is selected from among the plurality of downstream OEO regenerative nodes, and then the input link that minimizes the cost is selected from among the input links that, when selected, the transmission degradation amount that accumulates up to that selected node is held within the threshold value.

The second link selecting unit 156 takes, as the transmission degradation amount that accumulates up to the OEO regenerative node downstream of the attention node, the sum of the transmission degradation amount accumulated up to the starting point node of the input link, the transmission degradation amount that occurs when that input link is selected, and the minimum value of the transmission degradation amount that occurs along the path from the attention node to the downstream OEO regenerative node.

To describe the processing of the transmission degradation amount by taking as an example the noise amount occurring in the forward direction, the transmission degradation amounts accumulated up to the nodes 1A and 1B are denoted as NOISEacc(1A) and NOISEacc(1B), respectively, the noise amounts determined for the input links (1A, 2A) and (1B, 2A) by the transmission degradation amount determining unit 155 are denoted as NOISE(1A, 2A) and NOISE(1B, 2A), respectively, the minimum value of the transmission degradation amount that occurs along the path from the node 2A to the downstream OEO regenerative node (node 3A) is denoted as NOISEmin, and the intra-unit-design-section noise amount upper limit value in the forward direction determined by the intra-unit-design-section noise amount upper limit value determining unit 134 is taken as the threshold value NOISEth of the noise amount.

In this case, the second link selecting unit 156 calculates NOISEacc(1A)+NOISE(1A, 2A)+NOISEmin for the input link (1A, 2A) to the node 2A and NOISEacc(1B)+NOISE(1B, 2A)+NOISEmin for the input link (1B, 2A), and compares the calculation results with NOISEth. The second link selecting unit 156 eliminates any input link whose calculation result is larger than NOISEth, and selects from among the remaining input links the input link that minimizes the cost.

If the attention node is a node corresponding to the optical transmission equipment capable of accommodating an OEO regenerator, the second link selecting unit 156 sets the minimum value NOISEmin of the transmission degradation amount that occurs along the path from the attention node to the downstream OEO regenerative node, to zero. Further, in this case, if the attention node is a node corresponding to the optical transmission equipment capable of accommodating an OEO regenerator, then after selecting the input link the second link selecting unit 156 resets the transmission degradation amount accumulated up to the attention node to zero.

For example, if the node 2A is a node corresponding to the optical transmission equipment capable of accommodating an OEO regenerator, the second link selecting unit 156 calculates NOISEacc(1A)+NOISE(1A, 2A)+0 and NOISEacc(1B)+NOISE(1B, 2A)+0, respectively, for the node 2A. Further, after selecting the input link, the second link selecting unit 156 resets the transmission degradation amount NOISEacc(2A) accumulated up to the node 2A to zero. The transmission degradation amount accumulated up to the node 2A is used when selecting the input link to each node corresponding to the station 3 that immediately follows the station 2.

When the transmission degradation amount to be considered is the amount of noise occurring in the backward direction, the second link selecting unit 156 similarly determines the accumulated noise amounts and eliminates any input link whose calculation result is larger than the threshold value.

Further, when the transmission degradation amount to be considered is the amount of impairment occurring in each designated direction, the second link selecting unit 156 similarly determines the accumulated impairment amounts and eliminates any input link whose calculation result is larger than the threshold value. When taking any given kind of impairment as the transmission degradation amount, the second link selecting unit 156 uses as the threshold value of the impairment the impairment upper limit value in each designated direction determined by the intra-unit-design-section impairment upper limit value determining unit 131.

The second node determining unit 157 determines the placement of the various kinds of optical transmission equipment for the respective stations contained in the linear section by selecting one optical transmission equipment configuration candidate, based on the starting point nodes of the respective input links supplied from the second link selecting unit 156. For example, when the starting point nodes of the input links supplied from the second link selecting unit 156 are the node 1A, node 2B, node 3A, etc., the second node determining unit 157 takes the placement of the optical transmission equipment corresponding to the node 1A, node 2B, node 3A, etc., to determine the placement of the various kinds of optical transmission equipment for the respective stations. The second node determining unit 157 stores the thus determined optical transmission equipment candidate in the storage unit 126.

In the unit design section for which the optical transmission equipment has been selected by the initial candidate generating unit 125 having the above configuration, the amount of noise that occurs along the path between adjacent stations each provided with the equipment capable of accommodating an OEO regenerator becomes smaller than the minimum value of the noise amount upper limit value determined for each wavelength path that passes through that unit design section.

Further, in the unit design section for which the optical transmission equipment has been selected by the initial candidate generating unit 125 having the above configuration, the impairment that occurs along the path between adjacent stations each provided with the equipment capable of accommodating an OEO regenerator becomes smaller than the minimum value of the impairment upper limit value determined for each wavelength path that passes through that unit design section.

Figure 10:
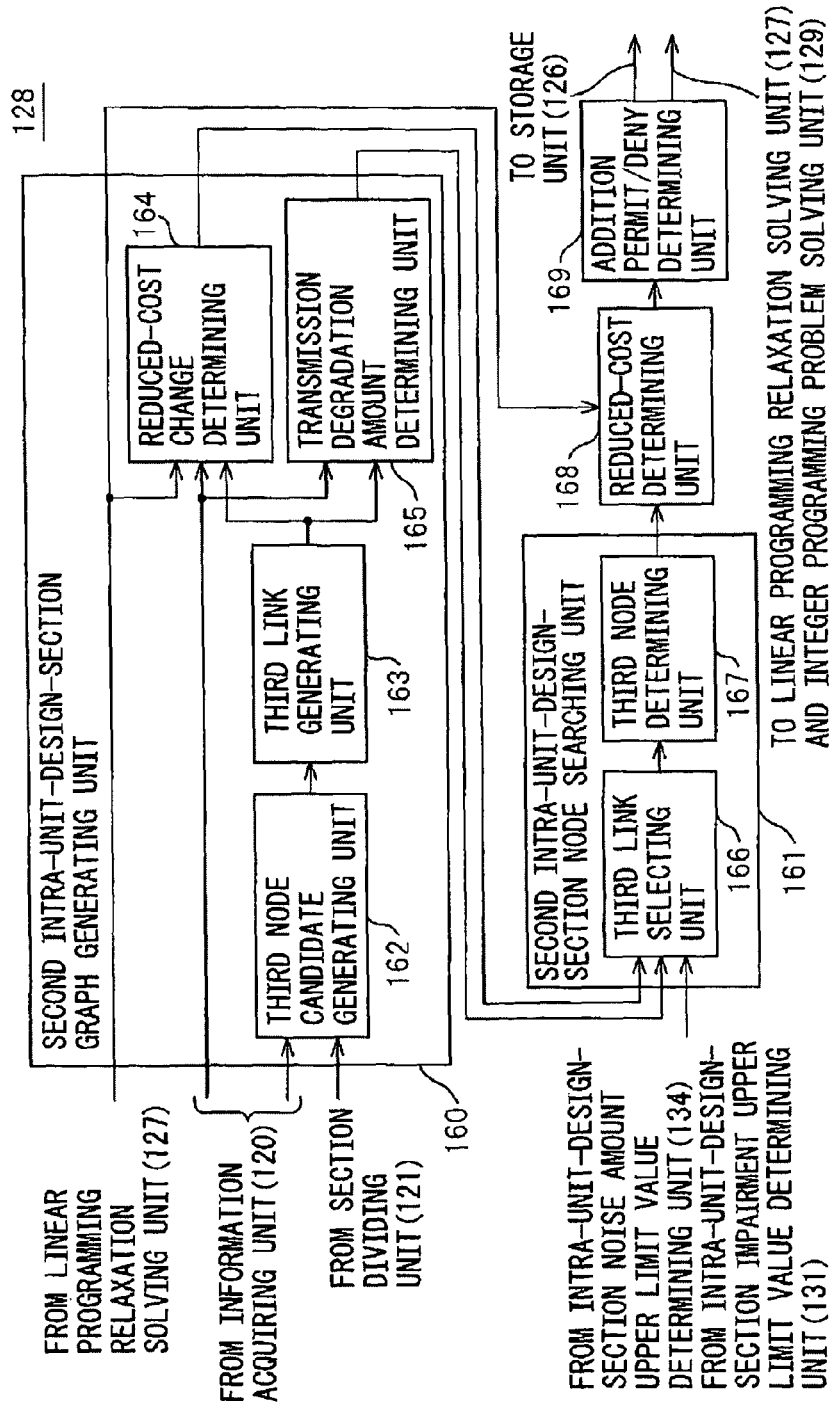
FIG. 10 is a block diagram of an additional candidate searching unit depicted in FIG. 7.

FIG. 10 is a block diagram of the additional candidate searching unit 128 depicted in FIG. 7. In accordance with the reduced-cost calculation equation determined based on the value of the dual price vector determined by the linear programming relaxation solving unit 127 depicted in FIG. 7, the additional candidate searching unit 128 searches for a new optical transmission equipment configuration candidate t' in which the value of the reduced cost is negative for each unit design section.

The additional candidate searching unit 128 includes a second intra-unit-design-section graph generating unit 160, a second intra-unit-design-section node searching unit 161, a reduced-cost determining unit 168, and an addition permit/deny determining unit 169.

The second intra-unit-design-section graph generating unit 160 and the second intra-unit-design-section node searching unit 161 are similar in configuration to the first intra-unit-design-section graph generating unit 150 and the first intra-unit-design-section node searching unit 151, respectively, in the initial candidate generating unit 125 depicted in FIG. 9.

The second intra-unit-design-section graph generating unit 160 includes a third node candidate generating unit 162, a third link generating unit 163, and a transmission degradation amount determining unit 165, which are similar in function to the second node candidate generating unit 152, second link generating unit 153, and transmission degradation amount determining unit 155 included in the first intra-unit-design-section graph generating unit 150.

The second intra-unit-design-section node searching unit 161 includes a third link selecting unit 166 and a third node determining unit 167, which are similar in function to the second link selecting unit 156 and second node determining unit 157 included in the first intra-unit-design-section node searching unit 151.

However, the second intra-unit-design-section graph generating unit 160 differs from the first intra-unit-design-section graph generating unit 150 by the inclusion of a reduced-cost change determining unit 164 in place of the cost determining unit 154.

While the cost determining unit 154 determines the cost that occurs when each particular input link is selected, the reduced-cost change determining unit 164 determines the amount of change, $\Delta RC$, of the reduced cost that occurs in the unit design section when each particular input link is selected.

Further, while the second link selecting unit 156 in the first intra-unit-design-section node searching unit 151 selects an input link such that, when the input link is selected, the cost that accumulates up to the attention node becomes minimum, the third link selecting unit 166 selects an input link such that, when the input link is selected, the amount of change, $\Delta RC$, of the reduced cost that accumulates up to the attention node becomes minimum.

Just as the noise amount and the impairment value that occur along the path between stations each provided with the equipment capable of accommodating an OEO regenerator, and connected by the input link selected by the second link selecting unit 156, become smaller than their respective threshold values as described earlier, the noise amount and the impairment value that occur along the path between stations each provided with the equipment capable of accommodating an OEO regenerator, and connected by the input link selected by the third link selecting unit 166, also become smaller than their respective threshold values.

When the equipment configuration determining unit 124 solves the integer programming problem given by equation (1), the reduced-cost change determining unit 164 determines the equipment cost $\Delta c$ and noise amounts $\Delta nf$ and $\Delta nr$ that increase when each particular input link is selected, based on the optical transmission equipment information defining the cost of the various kinds of optical transmission equipment and the amount of noise occurring in the optical signal passing through the various kinds of optical transmission equipment and on the span information defining the amount of noise occurring along the path between adjacent stations.

Symbol $\Delta nf$ represents the amount of change of the noise amount that occurs on the wavelength path propagating along the unit design section in the same direction as the reference direction when the input link is selected, and $\Delta nr$ represents the amount of change of the noise amount that occurs on the wavelength path propagating along the unit design section in the direction opposite to the reference direction when the input link is selected.

In accordance with the following reduced-cost calculation equation (10) determined based on the value of the dual price vector determined by the linear programming relaxation solving unit 127, the reduced-cost change determining unit 164 determines the amount of change, $\Delta RC$, of the reduced cost that occurs in the unit design section when each particular input link is selected.

[MATHEMATICAL 12]

$$\Delta RC = \Delta c + B \cdot \Delta nf + C \cdot \Delta nr \qquad (10)$$

where $$\begin{cases} B = -\sum_{j=1}^{N} (1 - Re(d_j, t')) \cdot \pi n_j \cdot I(d_j t') \\ C = -\sum_{j=1}^{N} Re(d_j, t') \cdot \pi n_j \cdot I(d_j, t') \end{cases}$$

When the equipment configuration determining unit 124 solves the integer programming problem given by equation (3), the reduced-cost change determining unit 164 determines the equipment cost Δc, noise amounts Δnf and Δnr, and impairment amounts $\Delta pf_{kj}$ and $\Delta pr_{kj}$ that increase when each particular input link is selected, based on the optical transmission equipment information defining the cost of the various kinds of optical transmission equipment and the amount of noise and the amount of impairment occurring in the optical signal passing through the various kinds of optical transmission equipment and on the span information defining the amount of noise and the amount of impairment occurring along the path between adjacent stations.

Symbol $\Delta pf_{kj}$ represents the amount of change of the k-th kind of impairment that occurs on the wavelength path $d_j$ propagating along the unit design section in the same direction as the reference direction when the input link is selected, and $\Delta pr_{kj}$ represents the amount of change of the k-th kind of impairment that occurs on the wavelength path $d_j$ propagating along the unit design section in the direction opposite to the reference direction when the input link is selected.

In accordance with the following reduced-cost calculation equation (11) determined based on the value of the dual price vector determined by the linear programming relaxation solving unit 127, the reduced-cost change determining unit 164 determines the amount of change, ΔRC, of the reduced cost that occurs in the unit design section when each particular input link is selected.

[MATHEMATICAL 13]

$$\Delta RC = \Delta c + B \cdot \Delta nf + C \cdot \Delta nr + \sum_{k=1}^{R} \sum_{j=1}^{N} \left\{ \begin{array}{l} D_k \cdot \Delta pf_{kj} + \\ E_k \cdot \Delta pr_{kj} \end{array} \right\} \quad (11)$$

where $$\begin{cases} B = -\sum_{j=1}^{N} (1 - Re(d_j, t')) \cdot \pi n_j \cdot I(d_j, t') \\ C = -\sum_{j=1}^{N} Re(d_j, t') \cdot \pi n_j \cdot I(d_j, t') \\ D = -(1 - Re(d_j, t_i)) \cdot \pi p_{kj} \cdot I(d_j, t') \\ E = -Re(d_j, t') \cdot \pi p_{kj} \cdot I(d_j, t') \end{cases}$$

The optical transmission equipment configuration selected by the second intra-unit-design-section graph generating unit 160 and second intra-unit-design-section node searching unit 161 having the above configuration is one that produces the minimum reduced cost in the unit design section.

The reduced-cost determining unit 168 determines the reduced cost RC produced by the optical transmission equipment configuration selected by the second intra-unit-design-section graph generating unit 160 and second intra-unit-design-section node searching unit 161. For example, the reduced-cost determining unit 168 determines the reduced cost RC by obtaining the component corresponding to the unit design section from the dual price vector $\pi_g$ determined by the linear programming relaxation solving unit 127, and by subtracting this component from the cumulative value of the amount of change, ΔRC, of the reduced cost that accumulates along the unit design section in the selected optical transmission equipment configuration.

The addition permit/deny determining unit 169 determines whether the reduced cost RC determined by the reduced-cost determining unit 168 is smaller than 0 or not, and reports the result of the determination to the linear programming relaxation solving unit 127 as well as to the integer programming problem solving unit 129. If the reduced cost RC is smaller than 0, the addition permit/deny determining unit 169 stores the determined optical transmission equipment configuration candidate in the storage unit 126.

Based on the result of the determination from the addition permit/deny determining unit 169, the linear programming relaxation solving unit 127 determines whether or not the additional candidate searching unit 128 can find any configuration in which the reduced cost RC is negative. The linear programming relaxation solving unit 127 reads the equipment configuration candidate data 114 as a new candidate is added to it by the additional candidate searching unit 128 until the additional candidate searching unit 128 can no longer find any configuration in which the reduced cost RC is negative, and thus solves the linear programming relaxation of the integer programming problem and updates the dual price vector.

Based on the result of the determination from the addition permit/deny determining unit 169, the integer programming problem solving unit 129 determines whether the additional candidate searching unit 128 can find any configuration in which the reduced cost RC is negative. When the additional candidate searching unit 128 can no longer find any configuration in which the reduced cost RC is negative, the integer programming problem solving unit 129 then reads the equipment configuration candidate data 114, and determines the optical transmission equipment configuration of the optical network 200 by solving the integer programming problem without relaxing the integer programming problem.

Figure 11:
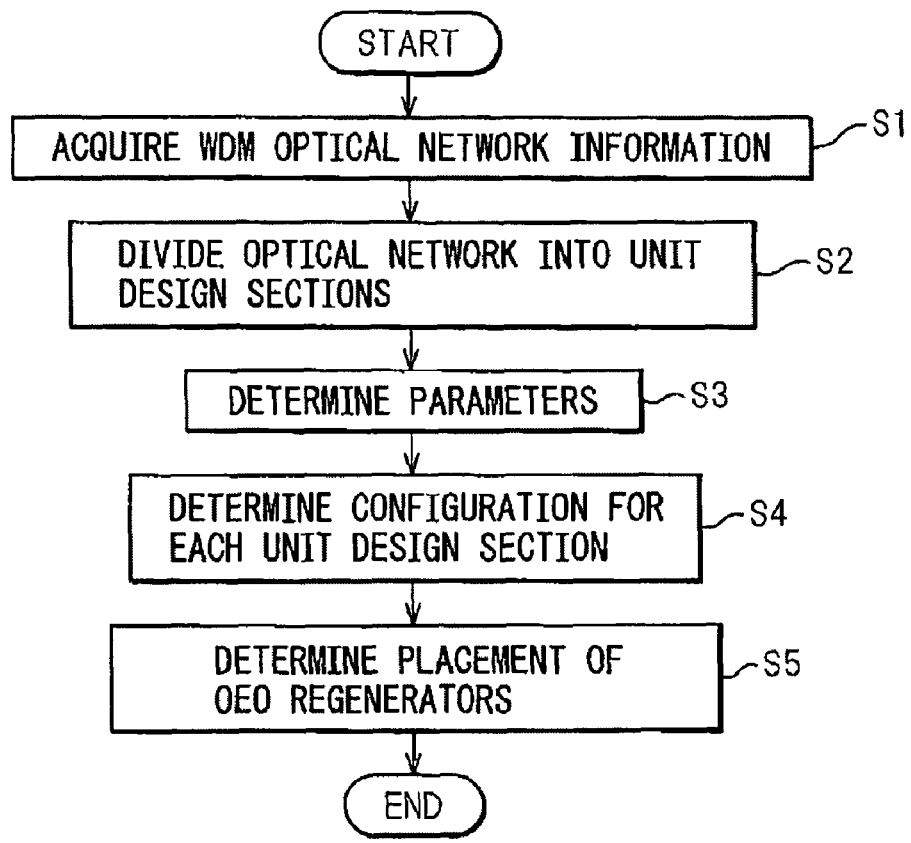
FIG. 11 is a general flowchart of a network design method according to an embodiment.

FIG. 11 is a general flowchart of the network design method according to an embodiment.

In step S1, the information acquiring unit 120 depicted in FIG. 7 acquires the WDM optical network information.

In step S2, the section dividing unit 121 divides the optical network 200, defined by the network topology information contained in the WDM optical network information, into unit design sections each being a linear section.

In step S3, the parameter determining unit 123 depicted in FIG. 8 determines the noise amount upper limit value Nth or Nth' and the impairment upper limit value $Pth_k(d_j)$.

Further, the parameter determining unit 123 determines the intra-unit-design-section noise upper limit values $Nth1(g_h)$ and $Nth2(g_h)$ and the intra-unit-design-section impairment upper limit values $Pth1_k(g_h)$ and $Pth2_k(g_h)$.

As earlier described, when the parameter determining unit 123 determines the noise amount upper limit value Nth' by the second or third example method, the cumulative impairment determining unit 132 depicted in FIG. 8 determines the minimum value $Pmin_k(d_j)$ and/or the maximum value $Pmax_k(d_j)$ that the cumulative impairment value can take on each wavelength path $d_j$. A description will be given below of how the cumulative impairment determining unit 132 determines the minimum value $Pmin_k(d_j)$ and maximum value $Pmax_k(d_j)$ of the cumulative impairment value.

Figure 12:
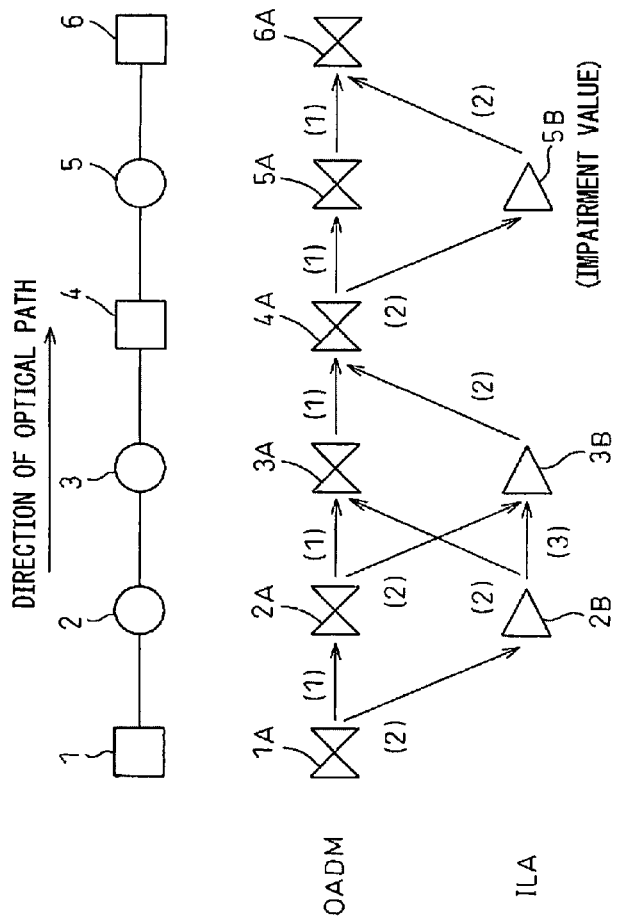
FIG. 12 is a diagram (part 1) illustrating an example of the graph information generated by an intra-path graph generating unit depicted in FIG. 8.

FIG. 12 is a diagram (part 1) illustrating an example of the graph information generated by the intra-path graph generating unit 140 depicted in FIG. 8. Stations 1 to 6 depicted in FIG. 12 correspond to the stations 1 to 6 located along the unit design sections 202 and 203 through which the wavelength path d passes in FIG. 1. Nodes 1A to 6A and nodes 2B, 3B, and 5B are the nodes generated by the first node candidate generating unit 143. Of the various kinds of optical transmission equipment that can be placed at the stations 1 to 6, an OADM (for example, the OADM 400 of FIG. 3) is used as the kind of optical transmission equipment capable of accommodating an OEO regenerator.

Further, of the various kinds of optical transmission equipment that can be placed at the stations 1 to 6, an ILA (for example, the ILA 500 of FIG. 5) is used as the kind of optical transmission equipment not capable of accommodating an OEO regenerator. Only an OADM that can accommodate an OEO regenerator can be placed at the station 1, which is the originating station, and the station 2, which is the terminating station. On the other hand, any kind of optical transmission equipment, i.e., an OADM, an ILA, or a bypass (for example, the bypass 600 of FIG. 5), can be placed at the stations 2, 3, and 5. An ILA cannot be placed at the station 4.

For the stations 1 to 6, the first node candidate generating 143 generates the nodes 1A to 6A each indicating an OADM that can be placed at each of these stations. For the stations 2, 3, and 5, the first node candidate generating 143 further generates the nodes 2B, 3B, and 5B each indicating an ILA that can be placed at each of these stations. In FIG. 12, each arrow indicates an inter-node input link generated by the first link generating unit 144. In the following description, an input link from node Y to node X is designated as the input link (X, Y).

Since the node 1A generated by the first node candidate generating 143 is the node corresponding to the originating station, the first link generating unit 144 does not generate an input link to the node 1A. For the node 2A, the first link generating unit 144 generates an input link (1A, 2A) leading from the node 1A corresponding to the station 1 upstream of the station 2 corresponding to the node 2A. For the node 2B, the first link generating unit 144 generates an input link (1A, 2B) leading from the node 1A corresponding to the station 1 upstream of the station 2 corresponding to the node 2B.

Similarly, for the node 3A, the first link generating unit 144 generates an input link (2A, 3A) leading from the node 2A and an input link (2B, 3A) leading from the node 2B both corresponding to the station 2 upstream of the station 3 corresponding to the node 3A. For the node 3B, the first link generating unit 144 generates an input link (2A, 3B) leading from the node 2A and an input link (2B, 3B) leading from the node 2B both corresponding to the station 2 upstream of the station 3 corresponding to the node 3B.

For the node 4A, the first link generating unit 144 generates an input link (3A, 4A) leading from the node 3A and an input link (3B, 4A) leading from the node 3B both corresponding to the station 3 upstream of the station 4 corresponding to the node 4A.

For the node 5A, the first link generating unit 144 generates an input link (4A, 5A) leading from the node 4A corresponding to the station 4 upstream of the station 5 corresponding to the node 5A. For the node 5B, the first link generating unit 144 generates an input link (4A, 5B) leading from the node 4A corresponding to the station 4 upstream of the station 5 corresponding to the node 5B.

For the node 6A, the first link generating unit 144 generates an input link (5A, 6A) leading from the node 5A and an input link (5B, 6A) leading from the node 5B both corresponding to the station 5 upstream of the station 6 corresponding to the node 6A.

Examples of the impairment amounts determined by the impairment determining unit 145 are illustrated below. In FIG. 12, the numeric value depicted alongside each input link indicates the impairment calculated by the impairment determining unit 145 for that input link. The impairment determining unit 145 determines the impairment as being "1" when the input link (1A, 2A) generated by the first link generating unit 144 is selected. Further, the impairment determining unit 145 determines the impairment as being "2" when the input link (1A, 2B) is selected.

The impairment determining unit 145 determines the impairment as being "1" when the input link (2A, 3A) is selected. Similarly, the impairment determining unit 145 determines the impairment as being "2" when the input link (2B, 3A) is selected. Further, the impairment determining unit 145 determines the impairment as being "2" when the input link (2A, 3B) is selected. Similarly, the impairment determining unit 145 determines the impairment as being "3" when the input link (2B, 3B) is selected.

The impairment determining unit 145 determines the impairment as being "1" when the input link (3A, 4A) is selected. Similarly, the impairment determining unit 145 determines the impairment as being "2" when the input link (3B, 4A) is selected.

The impairment determining unit 145 determines the impairment as being "1" when the input link (4A, 5A) is selected. Further, the impairment determining unit 145 determines the impairment as being "2" when the input link (4A, 5B) is selected.

The impairment determining unit 145 determines the impairment as being "1" when the input link (5A, 6A) is selected. Similarly, the impairment determining unit 145 determines the impairment as being "2" when the input link (5B, 6A) is selected. In this way, the graph information is generated that includes the nodes corresponding to the OADMs and ILAs to be placed at the respective stations 1 to 6 and the links, each assigned a impairment value, for interconnecting the respective nodes.

Figure 13:
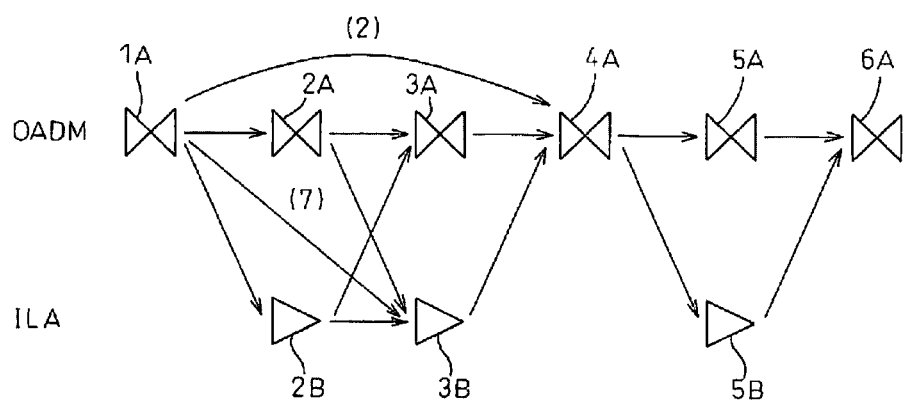
FIG. 13 is a diagram (part 2) illustrating an example of the graph information generated by the intra-path graph generating unit depicted in FIG. 8.

FIG. 13 is a diagram (part 2) illustrating an example of the graph information generated by the intra-path graph generating unit 140 depicted in FIG. 8. The impairment values depicted in FIG. 12 are not depicted in FIG. 13. FIG. 12 is a case where, for each attention node, the first link generating unit 144 generates only the input link leading from the node that immediately precedes the attention node, but in addition to the input link from the immediately preceding node, the first link generating unit 144 may also generate an input link leading from a node located two or more nodes upstream of the attention node.

Here, for the node 3B, the first link generating unit 144 generates, in addition to the input links (2A, 3B) and (2B, 3B), an input link (1A, 3B) leading from the node 1A corresponding to the station 1 located further upstream of the station 3 corresponding to the node 3A. When the input link (1A, 3B) is selected for the node 3B, a bypass is placed at the station 2.

Similarly, for the node 4A, the first link generating unit 144 generates, in addition to the input links (3A, 4A) and (3B, 4A), an input link (1A, 4A) leading from the node 1A corresponding to the station 1 located further upstream of the station 4 corresponding to the node 4A. When the input link (1A, 4A) is selected for the node 4A, a bypass is placed at each of the stations 2 and 3.

In this way, the input links (1A, 3B) and (1A, 4A) are generated as bypass links. The impairment determining unit 145 determines the impairment as being "7" when the input link (1A, 3B) is selected. Further, the impairment determining unit 145 determines the impairment as being "2" when the input link (1A, 4A) is selected.

For simplicity, the following description deals with the case where only the input links depicted in FIG. 12 and their bypass links are generated.

Figure 14:
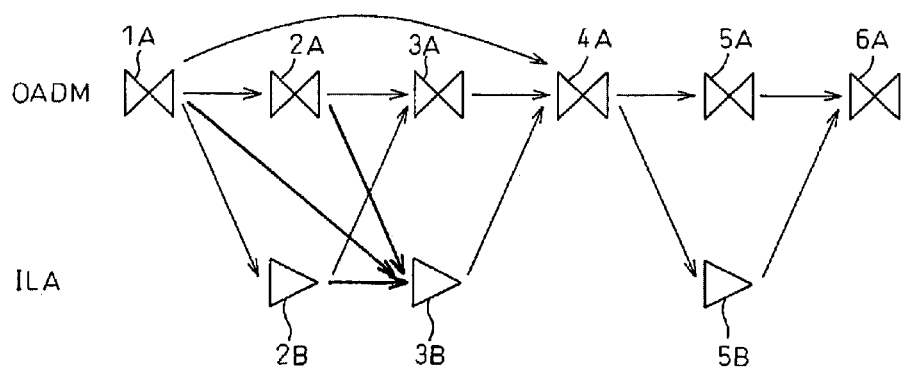
FIG. 14 is a diagram illustrating how a first link selecting unit depicted in FIG. 8 selects an input link.

FIG. 14 is a diagram illustrating how the first link selecting unit 146 depicted in FIG. 8 selects the input link. In FIG. 14, the same parts as those depicted in FIGS. 12 and 13 are designated by the same reference characters, and the description of such parts will not be repeated here. The following describes how the input link is selected for the node 3B. Each input link to the node 3B is indicated by a thick arrow, and other input links are indicated by thin arrows. The first link selecting unit 146 selects one input link from among the three input links (2A, 3B), (2B, 3B), and (1A, 3B) generated as the input links to the node 3B by the first link generating unit 144.

By selecting one input link for the node 3B from among the input links (2A, 3B), (2B, 3B), and (1A, 3B), the equipment placement up to the station where an OADM or an ILA is placed immediately preceding the station 3 is determined by the first node determining unit 147 for the case where an ILA is placed at the station 3. When the input link (2A, 3B) is selected by the first link selecting unit 146, the first node determining unit 147 determines that an OADM is placed at the station 2 when an ILA is placed at the station 3.

On the other hand, when the input link (2B, 3B) is selected by the first link selecting unit 146, the first node determining unit 147 determines that an ILA is placed at the station 2 when an ILA is placed at the station 3. When the input link (1A, 3B) is selected by the first link selecting unit 146, the first node determining unit 147 determines that a bypass is placed at the station 2 and an OADM in the station 1 when an ILA is placed at the station 3.

While the above description has been given by specifically dealing with the case where the first link selecting unit 146 selects one input link from among the input links generated for the node 3B, the first link selecting unit 146 also selects one input link from among a plurality of links for each of the other nodes 2A to 6A, 2B and 5B, and thus searches for the path corresponding to the placement that minimizes or maximizes the cumulative value of the impairment occurring along the wavelength path passing through the stations 1 to 6.

Figure 15:
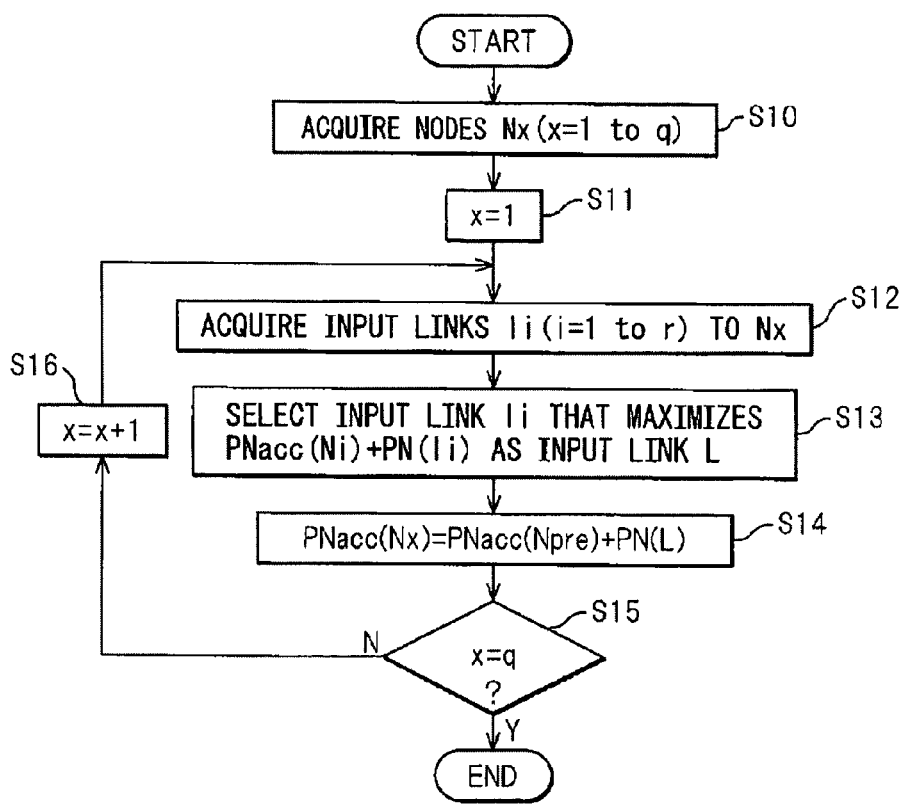
FIG. 15 is a flowchart illustrating one example of the selection process performed by the first link selecting unit depicted in FIG. 8.

FIG. 15 is a flowchart illustrating one example of the selection process performed by the first link selecting unit 146 depicted in FIG. 8. FIG. 15 illustrates the process when the cumulative impairment determining unit 132 determines the maximum value $Pmax_k(d_j)$ that the cumulative impairment value can take on each wavelength path $d_j$.

In step S10, the first link selecting unit 146 acquires the nodes Nx (x=1 to q) generated by the first node candidate generating unit 143.

In step S11, the first link selecting unit 146 sets the node number x referring to one of the thus acquired nodes Nx to 1.

In step S12, the first link selecting unit 146 acquires the input links li (i=1 to r) generated for the node Nx.

In step S13, from among the input links li (i=1 to r) to the node Nx, the first link selecting unit 146 selects as the input link L to the node Nx the input link li that maximizes the sum of the impairment amount PNacc(Ni) accumulated up to the starting point node Ni of the input link li and the impairment amount PN(li) determined for the input link li.

Here, when the cumulative impairment determining unit 132 determines the minimum value $Pmin_k(d_j)$, the first link selecting unit 146 in step S13 selects as the input link L to the node Nx, from among the input links li (i=1 to m) to the node Nx, the input link li that minimizes the sum of the impairment amount PNacc(Ni) accumulated up to the starting point node Ni of the input link li and the impairment amount PN(li) determined for the input link li.

In step S14, the first link selecting unit 146 calculates the impairment amount accumulated up to the node Nx, i.e., PNacc(Nx)=PNacc(Npre)+PN(L). Here, PNacc(Npre) represents the impairment amount accumulated up to the starting point node Npre of the input link L selected in step S13. PN(L) represents the impairment amount when the input link L is selected.

In step S15, the first link selecting unit 146 determines whether the node number x is the last number q or not. If the node number x is not the last number q, the first link selecting unit 146 changes the node number x to x+1 (step S16), and returns to step S12 to repeat the above process. If the node number x is the last number q, the first link selecting unit 146 terminates the input link selection process.

Figure 16:
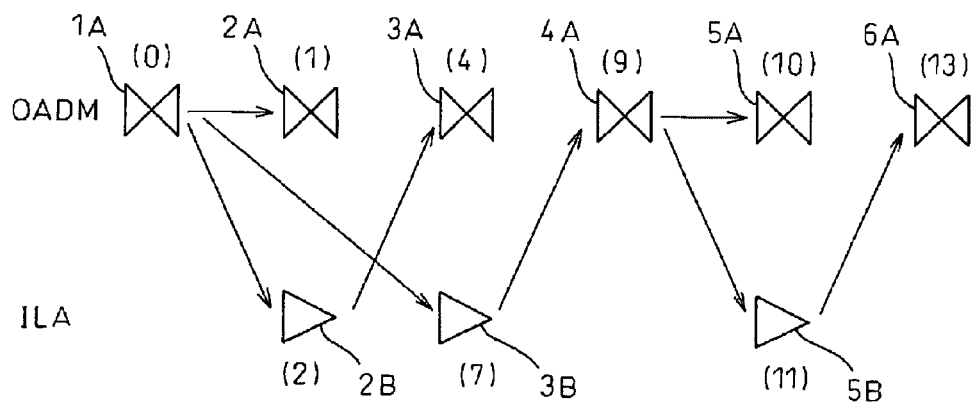
FIG. 16 is a diagram illustrating the results of the input link selection process performed by the first link selecting unit depicted in FIG. 8.

Next, a description will be given of the case where the process depicted in FIG. 15 is applied to the example illustrated in FIGS. 12 to 14. FIG. 16 is a diagram illustrating the results of the input link selection process performed by the first link selecting unit 146 depicted in FIG. 8. In FIG. 16, the same parts as those depicted in FIGS. 12 to 14 are designated by the same reference characters, and the description of such parts will not be repeated here.

In FIG. 16, each arrow indicates the input link L selected by the process depicted in FIG. 15. The numeric value depicted alongside each node indicates the accumulated impairment calculated in steps S12 to S16.

The input link L to the node 2A is determined in the following manner. The total impairment amount when the input link (1A, 2A) is selected is calculated as PNacc(1A)+PN(1A, 2A)=0+1=1. Since the input link (1A, 2A) is the only remaining input link, the input link (1A, 2A) is selected as the input link L to the node 2A.

The input link L to the node 2B is determined in the following manner. The total impairment amount when the input link (1A, 2B) is selected is calculated as PNacc(1A)+PN(1A, 2B)=0+2=2. Since the input link (1A, 2B) is the only remaining input link, the input link (1A, 2B) is selected as the input link L to the node 2B.

The input link L to the node 3A is determined in the following manner. The total impairment amount when the input link (2A, 3A) is selected is calculated as PNacc(2A)+PN(2A, 3A)=1+1=2. The total impairment amount when the input link (2B, 3A) is selected is calculated as PNacc(2B)+PN(2B, 3A)=2+2=4. Accordingly, the input link (2B, 3A) that maximizes the total impairment amount is selected as the input link L to the node 3A.

The input link L to the node 3B is determined in the following manner. The total impairment amount when the input link (2A, 3B) is selected is calculated as PNacc(2A)+PN(2A, 3B)=1+2=3. The total impairment amount when the input link (2B, 3B) is selected is calculated as PNacc(2B)+PN(2B, 3B)=2+3=5. The total impairment amount when the input link (1A, 3B) is selected is calculated as PNacc(1A)+PN(1A, 3B)=0+7=7. Accordingly, the input link (1A, 3B) that maximizes the total impairment amount is selected as the input link L to the node 3B.

The input link L to the node 4A is determined in the following manner. The total impairment amount when the input link (3A, 4A) is selected is calculated as PNacc(3A)+PN(3A, 4A)=4+1=5. The total impairment amount when the input link (3B, 4A) is selected is calculated as PNacc(3B)+PN(3B, 4A)=7+2=9. The total impairment amount when the input link (1A, 4A) is selected is calculated as PNacc(1A)+PN(1A, 4A)=0+2=2. Accordingly, the input link (3B, 4A) that maximizes the total impairment amount is selected as the input link L to the node 4A.

The input link L to the node 5A is determined in the following manner. The total impairment amount when the input link (4A, 5A) is selected is calculated as PNacc(4A)+PN(4A, 5A)=9+1=10. Since the input link (4A, 5A) is the only remaining input link, the input link (4A, 5A) is selected as the input link L to the node 5A.

The input link L to the node 5B is determined in the following manner. The total impairment amount when the input link (4A, 5B) is selected is calculated as PNacc(4A)+PN(4A, 5B)=9+2=11. Since the input link (4A, 5B) is the only remaining input link, the input link (4A, 5B) is selected as the input link L to the node 5B.

The input link L to the node 6A is determined in the following manner. The total impairment amount when the input link (5A, 6A) is selected is calculated as PNacc(5A)+PN(5A, 6A)=10+1=11. The total impairment amount when the input link (5B, 6A) is selected is calculated as PNacc(5B)+PN(5B, 6A)=11+2=13. Accordingly, the input link (5B, 6A) that maximizes the total impairment amount is selected as the input link L to the node 6A. In this way, the input links to the respective nodes are selected.

Figure 17:
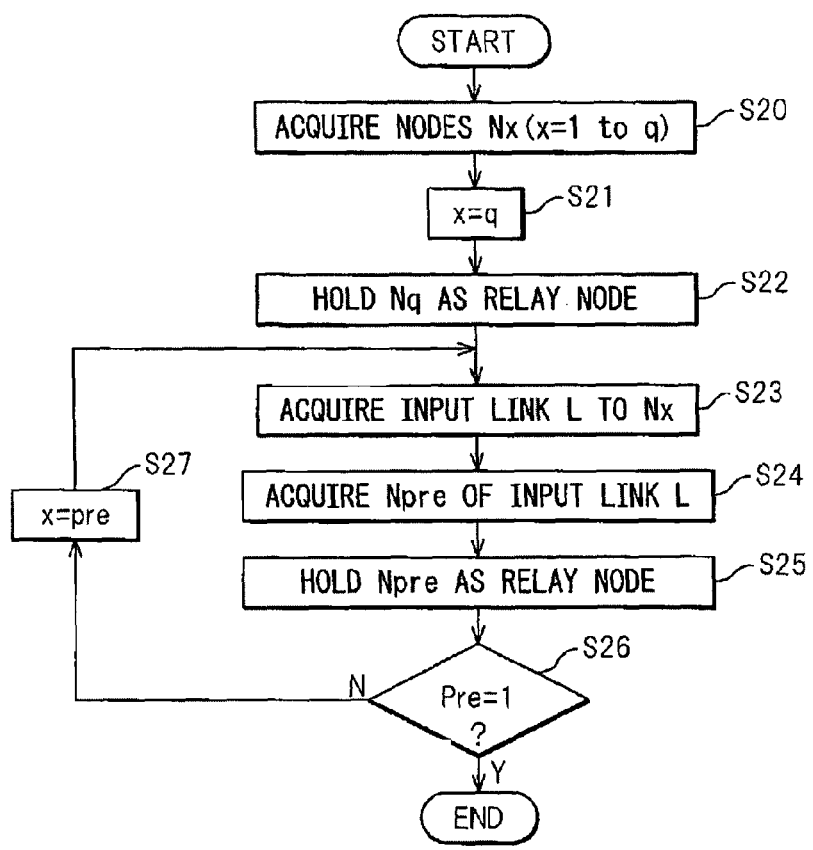
FIG. 17 is a flowchart illustrating one example of a relay node determination process performed by a first node determining unit depicted in FIG. 8.

FIG. 17 is a flowchart illustrating one example of the relay node determination process performed by the first node determining unit 147 depicted in FIG. 8.

In step S20, the first node determining unit 147 acquires the nodes Nx (x=1 to q) generated by the first node candidate generating unit 143.

In step S21, the first node determining unit 147 sets the node number x referring to one of the nodes Nx acquired in step S20 to q. The node q indicates the node corresponding to the optical transmission equipment placed at the terminating station in the unit design section to be designed.

In step S22, the first node determining unit 147 holds the node Nq as a relay node.

In step S23, the first node determining unit 147 acquires the input link L to the node Nx from among the input links L selected in step S13 of FIG. 15.

In step S24, the first node determining unit 147 acquires the starting point node Npre of the input link L acquired in step S23.

In step S25, the first node determining unit 147 holds the starting point node Npre as a relay node.

In step S26, the first node determining unit 147 determines whether the number pre of the starting point node Npre acquired in step S25 is the number 1 or not. Here, the number 1 is the node number of the optical transmission equipment placed at the originating station in the unit design section to be designed.

If the number pre of the starting point node Npre is not the number 1, the first node determining unit 147 in step S27 changes the number x of the node Nx to the number pre of the starting point node Npre, and returns to step S23 to repeat the above process. If the number pre of the starting point node Npre is the number 1, the first node determining unit 147 terminates the series of relay node determination operations.

In the above steps, each relay node held in step S22 or S25 provides information indicating the kind of the optical transmission equipment placed at the corresponding station in the unit design section to be designed. Next, a description will be given in which the process depicted in FIG. 17 is applied to the example illustrated in FIGS. 12 to 14 and 16.

Figure 18:
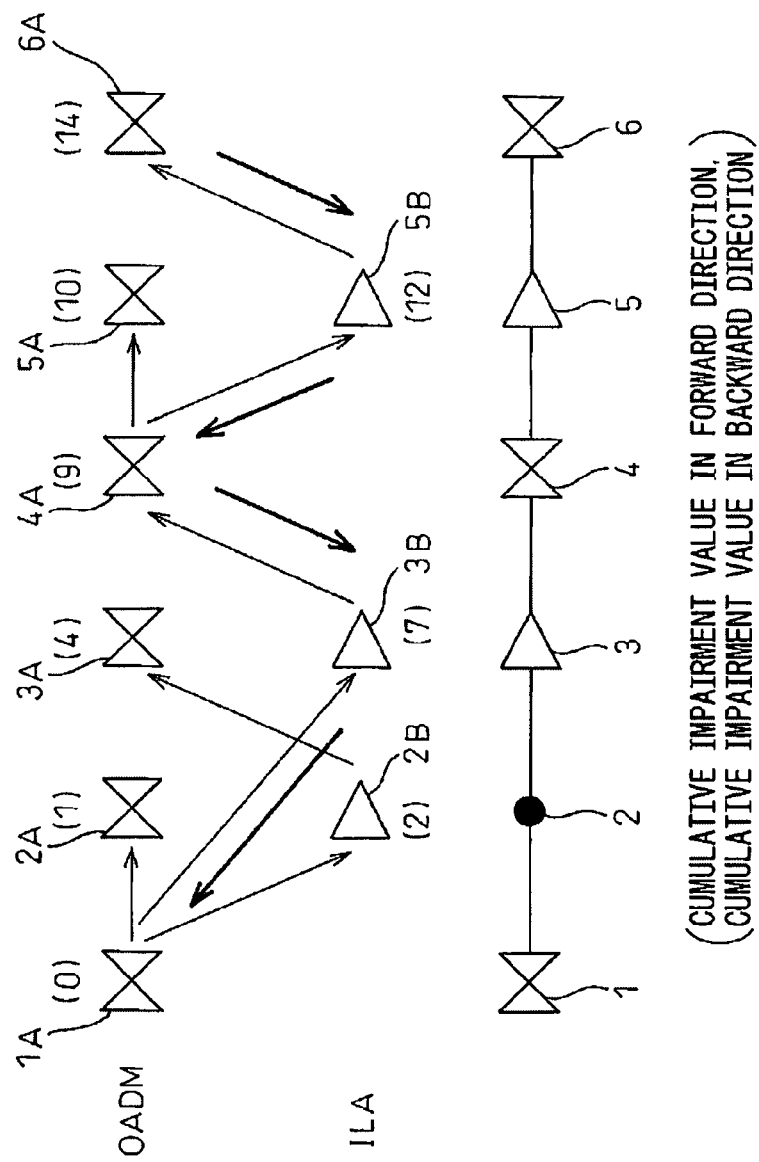
FIG. 18 is a diagram illustrating the results of the relay node determination process performed by the first node determining unit depicted in FIG. 8.

FIG. 18 is a diagram illustrating the results of the relay node determination process performed by the first node determining unit 147 depicted in FIG. 8. In FIG. 18, the same parts as those depicted in FIGS. 12 to 14 and 16 are designated by the same reference characters, and the description of such parts will not be repeated here. In FIG. 18, the thick arrows indicate the path of the nodes as traced by the respective steps depicted FIG. 17. The kinds of optical transmission equipment determined by the respective steps are depicted at the bottom of the graph. The filled circle indicates a bypass. First, the node number is set to indicate the node 6A (step S21), and the node 6A is held as one of the relay nodes (step S22). The input link (5B, 6A) is acquired as the input link L to the node 6A (step S23). Further, the node 5B is acquired as the starting point node Npre of the input link (5B, 6A) (step S24), and the node 5B is held as one of the relay nodes (step S25).

Next, the node number is set to indicate the node 5B (step S27), and the input link (4A, 5B) is acquired as the input link L to the node 5B (step S23). Further, the node 4A is acquired as the starting point node Npre of the input link (4A, 5B) (step S24), and the node 4A is held as one of the relay nodes (step S25).

Next, the node number is set to indicate the node 4A (step S27), and the input link (3B, 4A) is acquired as the input link L to the node 4A (step S23). Further, the node 3B is acquired as the starting point node Npre of the input link (3B, 4A) (step S24), and the node 3B is held as one of the relay nodes (step S25).

Next, the node number is set to indicate the node 3B (step S27), and the input link (1A, 3B) is acquired as the input link L to the node 3B (step S23). Further, the node 1A is acquired as the starting point node Npre of the input link (1A, 3B) (step S24), and the node 1A is held as one of the relay nodes (step S25).

Since the node number of the node 1A is the node number of the optical transmission equipment placed at the originating station 1 in the unit design section 201 to be designed, the relay node determination process is terminated here. By tracing the input links L backward from the node 6A to the node 1A in this way, the first node determining unit 147 holds the nodes 6A, 5B, 4A, 3B, and 1A in this order as the relay nodes.

Based on the impairment values assigned to the input links interconnecting the respective relay nodes held by the first node determining unit 147, the cumulative value calculation unit 142 determines the impairment accumulated along the path passing through the relay nodes, and supplies the result to the noise amount upper limit value determining unit 133.

Figure 19:
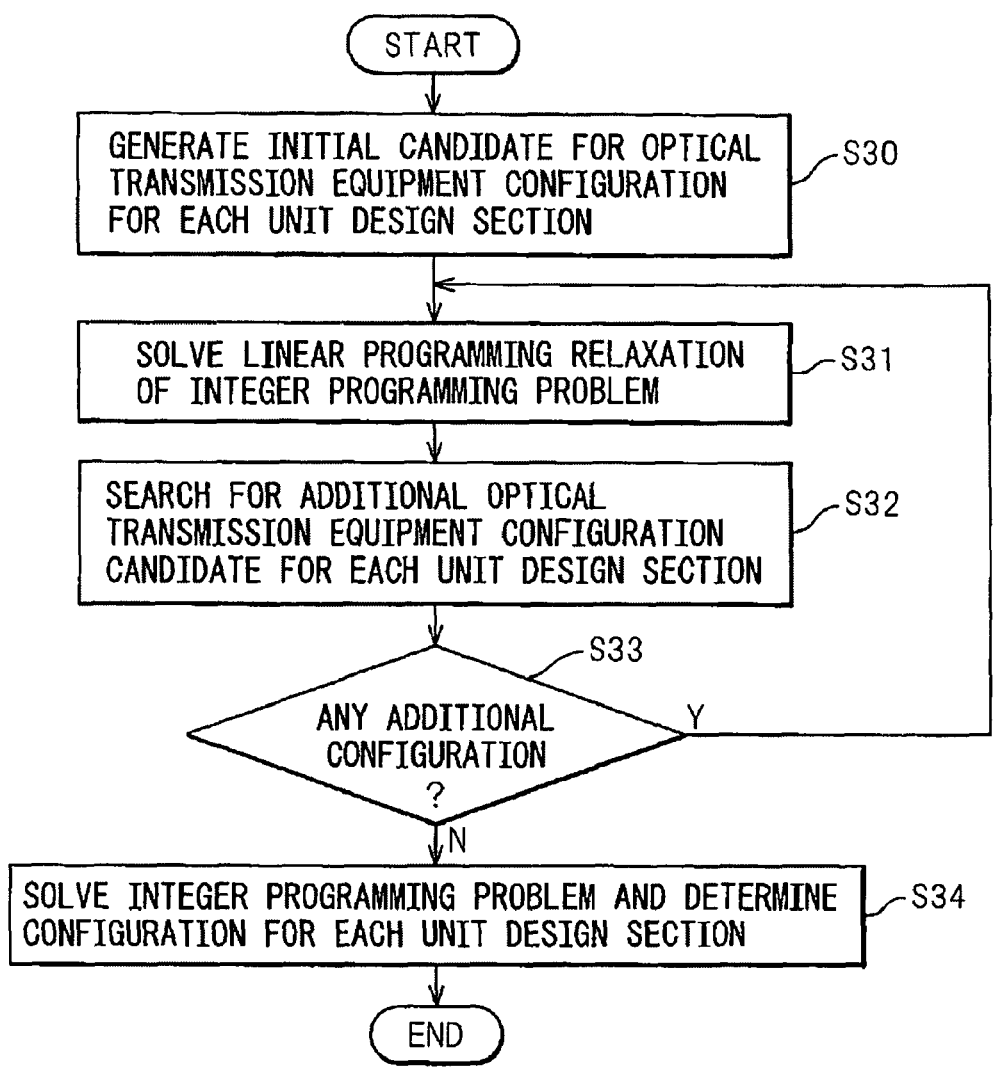
FIG. 19 is a flowchart illustrating one example of a method that determines optical transmission equipment configuration for each unit design section.

In step S4 of FIG. 11, the equipment configuration determining unit 124 depicted in FIG. 7 determines the optical transmission equipment configuration candidate for each of the unit design sections generated by the section dividing unit 121. FIG. 19 is a flowchart illustrating one example of the method by which the equipment configuration determining unit 124 determines the optical transmission equipment configuration for each unit design section.

In step S30, prior to the processing by the linear programming relaxation solving unit 127, the initial candidate generating unit 125 generates, for each unit design section, at least one optical transmission equipment configuration candidate that satisfies the constraint (1-3) or the constraints (3-3) and (3-41) to (3-4R), and stores the candidate in the storage unit 126.

In step S31, the linear programming relaxation solving unit 127 reads the equipment configuration candidate data 114 stored in the storage unit 126, and determines the dual price vector by solving the linear programming relaxation of the integer programming problem given by equation (1) or (3) for the optical transmission equipment configuration candidate indicated by the equipment configuration candidate data 114.

In step S32, in accordance with the reduced-cost calculation equation determined based on the value of the dual price vector determined by the linear programming relaxation solving unit 127, the additional candidate searching unit 128 searches for a new optical transmission equipment configuration candidate t' in which the value of the reduced cost is negative for each unit design section.

In step S33, the additional candidate searching unit 128 determines whether a new optical transmission equipment configuration candidate t' is found or not.

If found, the new optical transmission equipment configuration candidate t' is added to the equipment configuration candidate data 114, and the process returns to step S31.

If a new optical transmission equipment configuration candidate t' is not found, in step S34 the integer programming problem solving unit 129 reads the equipment configuration candidate data 114 stored in the storage unit 126 and containing the candidates determined by the initial candidate generating unit 125 and the additional candidate searching unit 128, and determines the optical transmission equipment configuration of the optical network 200 by solving the integer programming problem given by equation (1) or (3) without relaxing the integer programming problem for the optical transmission equipment configuration candidates indicated by the equipment configuration candidate data 114.

Figure 20:
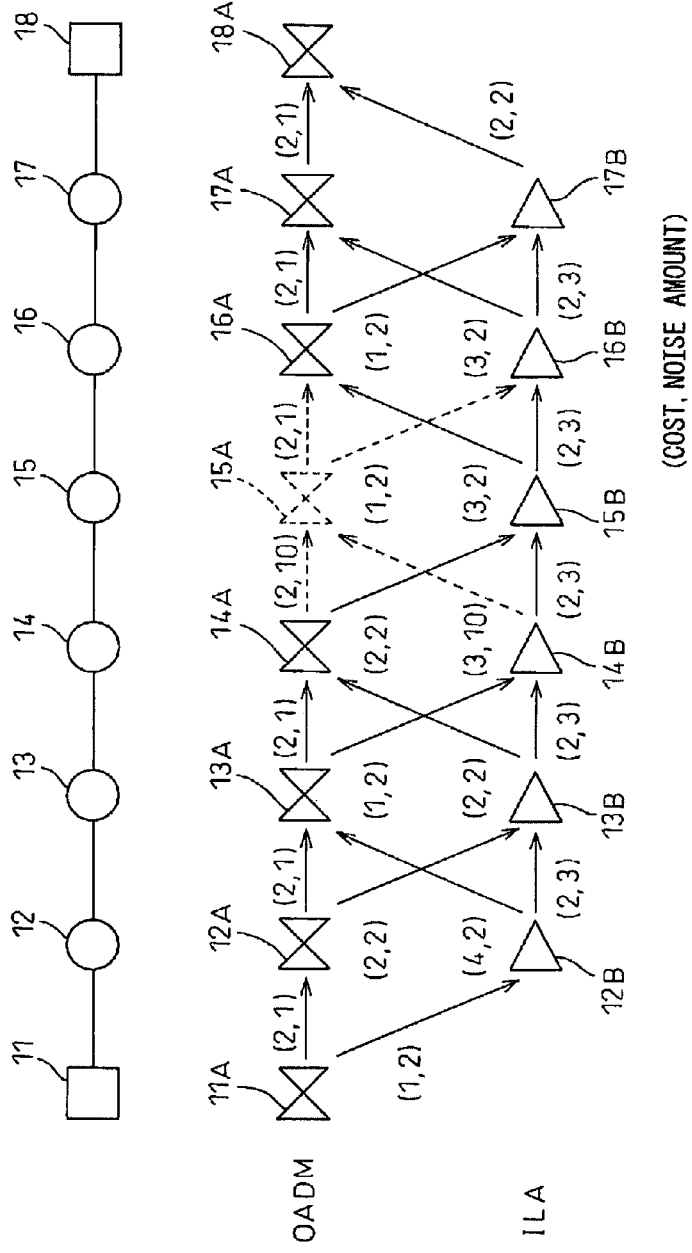
FIG. 20 is a diagram (part 1) illustrating an example of the graph information generated by a first intra-unit-design-section graph generating unit depicted in FIG. 9.

The processing that the initial candidate generating unit 125 performs in step S30 to determine the optical transmission equipment configuration candidate will be described below. FIG. 20 is a diagram (part 1) illustrating an example of the graph information generated by the first intra-unit-design-section graph generating unit 150 in the initial candidate generating unit 125 depicted in FIG. 9.

Stations 11 to 18 depicted in FIG. 20 correspond to the stations 11 to 18 located along the unit linear section 204 depicted in FIG. 1. Nodes 11A to 18A and nodes 12B to 17B are the nodes generated by the second node candidate generating unit 152.

For simplicity, the following description is given by dealing only with the noise amount in the forward direction as an example of the transmission degradation amount, but actually, the noise amount in the backward direction is also considered in the same manner. Further, various kinds of impairments are also considered in the same manner as the noise amount.

The threshold value NOISEth of the noise amount is set to 7. Of the various kinds of optical transmission equipment that can be placed at the stations 11 to 18, an OADM (for example, the OADM 400 of FIG. 3) is used as the kind of optical transmission equipment capable of accommodating an OEO regenerator.

Further, of the various kinds of optical transmission equipment that can be placed at the stations 11 to 18, an ILA (for example, the ILA 500 of FIG. 4) is used as the kind of optical transmission equipment not capable of accommodating an OEO regenerator. Only an OADM that can accommodate an OEO regenerator can be placed at the station 11, which is the originating station, and the station 18, which is the terminating station. On the other hand, any kind of optical transmission equipment, i.e., an OADM, an ILA, or a bypass (for example, the bypass 600 of FIG. 5), can be placed at the stations 12 to 17.

For the stations 11 to 18, the second node candidate generating 152 generates the nodes 11A to 18A each indicating an OADM that can be placed at each of these stations. For the stations 12 to 17, the second node candidate generating 152 generates the nodes 12B to 17B each indicating an ILA that can be placed at each of these stations. In FIG. 20, the arrows indicate the input links generated by the second link generating unit 153 for the nodes 11A to 18A and 12B to 17B. In the following description, an input link from node Y to node X is designated as the input link (X, Y).

Since the node 11A generated by the second node candidate generating 152 is the node corresponding to the originating station, the second link generating unit 153 does not generate an input link to the node 11A. For the node 12A, the second link generating unit 153 generates an input link (11A, 12A) leading from the node 11A corresponding to the station 11 upstream of the station 12 corresponding to the node 12A. For the node 12B, the second link generating unit 153 generates an input link (11A, 12B) leading from the node 11A corresponding to the station 11 upstream of the station 12 corresponding to the node 12B.

Similarly, for the node 13A, the second link generating unit 153 generates an input link (12A, 13A) leading from the node 12A and an input link (12B, 13A) leading from the node 12B both corresponding to the station 12 upstream of the station 13 corresponding to the node 13A. For the node 13B, the second link generating unit 153 generates an input link (12A, 13B) leading from the node 12A and an input link (12B, 13B) leading from the node 12B both corresponding to the station 12 upstream of the station 13 corresponding to the node 13B.

For the node 14A, the second link generating unit 153 generates an input link (13A, 14A) leading from the node 13A and an input link (13B, 14A) leading from the node 13B both corresponding to the station 13 upstream of the station 14 corresponding to the node 14A. For the node 14B, the second link generating unit 153 generates an input link (13A, 14B) leading from the node 13A and an input link (13B, 14B) leading from the node 13B both corresponding to the station 13 upstream of the station 14 corresponding to the node 14B.

For the node 15A, the second link generating unit 153 generates an input link (14A, 15A) leading from the node 14A and an input link (14B, 15A) leading from the node 14B both corresponding to the station 14 upstream of the station 15 corresponding to the node 15A. For the node 15B, the second link generating unit 153 generates an input link (14A, 15B) leading from the node 14A and an input link (14B, 15B) leading from the node 14B both corresponding to the station 14 upstream of the station 15 corresponding to the node 15B.

For the node 16A, the second link generating unit 153 generates an input link (15A, 16A) leading from the node 15A and an input link (15B, 16A) leading from the node 15B both corresponding to the station 15 upstream of the station 16 corresponding to the node 16A. For the node 16B, the second link generating unit 153 generates an input link (15A, 16B) leading from the node 15A and an input link (15B, 16B) leading from the node 15B both corresponding to the station 15 upstream of the station 16 corresponding to the node 16B.

For the node 17A, the second link generating unit 153 generates an input link (16A, 17A) leading from the node 16A and an input link (16B, 17A) leading from the node 16B both corresponding to the station 16 upstream of the station 17 corresponding to the node 17A. For the node 17B, the second link generating unit 153 generates an input link (16A, 17B) leading from the node 16A and an input link (16B, 17B) leading from the node 16B both corresponding to the station 16 upstream of the station 17 corresponding to the node 17B.

For the node 18A, the second link generating unit 153 generates an input link (17A, 18A) leading from the node 17A and an input link (17B, 18A) leading from the node 17B both corresponding to the station 17 upstream of the station 18 corresponding to the node 18A.

Examples of the cost and amount of noise determined by the cost determining unit 154 and transmission degradation amount determining unit 155 depicted in FIG. 9 are illustrated below. In FIG. 20, the cost and noise amount calculated by the cost determining unit 154 and transmission degradation amount determining unit 155 for each input link are depicted as (cost, noise amount) alongside the input link. The cost determining unit 154 and transmission degradation amount determining unit 155 determine the cost and noise amount as being (2, 1) when the input link (11A, 12A) generated by the second link generating unit 153 is selected. Further, the cost determining unit 154 and transmission degradation amount determining unit 155 determine the cost and noise amount as being (1, 2) when the input link (11A, 12B) is selected.

The cost determining unit 154 and transmission degradation amount determining unit 155 determine the cost and noise amount as being (2, 1) when the input link (12A, 13A) is selected. Similarly, the cost determining unit 154 and transmission degradation amount determining unit 155 determine the cost and noise amount as being (4, 2) when the input link (12B, 13A) is selected. Further, the cost determining unit 154 and transmission degradation amount determining unit 155 determine the cost and noise amount as being (2, 2) when the input link (12A, 13B) is selected. Similarly, the cost determining unit 154 and transmission degradation amount determining unit 155 determine the cost and noise amount as being (2, 3) The cost determining unit 154 and transmission degradation amount determining unit 155 determine the cost and noise amount as being (2, 1) when the input link (13A, 14A) is selected. Similarly, the cost determining unit 154 and transmission degradation amount determining unit 155 determine the cost and noise amount as being (2, 2) when the input link (13B, 14A) is selected. Further, the cost determining unit 154 and transmission degradation amount determining unit 155 determine the cost and noise amount as being (1, 2) when the input link (13A, 14B) is selected. Similarly, the cost determining unit 154 and transmission degradation amount determining unit 155 determine the cost and noise amount as being (2, 3) when the input link (13B, 14B) is selected.

The cost determining unit 154 and transmission degradation amount determining unit 155 determine the cost and noise amount as being (2, 10) when the input link (14A, 15A) is selected. Similarly, the cost determining unit 154 and transmission degradation amount determining unit 155 determine the cost and noise amount as being (3, 10) when the input link (14B, 15A) is selected. Since the noise amount when either the input link (14A, 15A) or the input link (14B, 15A) is selected exceeds the threshold value 7 defined by NOISEth, the cost determining unit 154 and transmission degradation amount determining unit 155 delete the input links (14A, 15A), (14B, 15A), (15A, 16A), and (15A, 16B).

The cost determining unit 154 and transmission degradation amount determining unit 155 determine the cost and noise amount as being (2, 2) when the input link (14A, 15B) is selected. Similarly, the cost determining unit 154 and transmission degradation amount determining unit 155 determine the cost and noise amount as being (2, 3) when the input link (14B, 15B) is selected. Further, the cost determining unit 154 and transmission degradation amount determining unit 155 determine the cost and noise amount as being (3, 2) when the input link (15B, 16A) is selected. Similarly, the cost determining unit 154 and transmission degradation amount determining unit 155 determine the cost and noise amount as being (2, 3) when the input link (15B, 16B) is selected.

The cost determining unit 154 and transmission degradation amount determining unit 155 determine the cost and noise amount as being (2, 1) when the input link (16A, 17A) is selected. Similarly, the cost determining unit 154 and transmission degradation amount determining unit 155 determine the cost and noise amount as being (3, 2) when the input link (16B, 17A) is selected. Further, the cost determining unit 154 and transmission degradation amount determining unit 155 determine the cost and noise amount as being (1, 2) when the input link (16A, 17B) is selected. Similarly, the cost determining unit 154 and transmission degradation amount determining unit 155 determine the cost and noise amount as being (2, 3) when the input link (16B, 17B) is selected.

The cost determining unit 154 and transmission degradation amount determining unit 155 determine the cost and noise amount as being (2, 1) when the input link (17A, 18A) is selected. Similarly, the cost determining unit 154 and transmission degradation amount determining unit 155 determine the cost and noise amount as being (2, 2) when the input link (17B, 18A) is selected. In this way, the graph information is generated that includes the nodes corresponding to the OADMs and ILAs placed at the respective stations 11 to 18 and the links interconnecting the respective nodes, each link being assigned a value representing the transmission degradation amount and noise amount.

Figure 21:
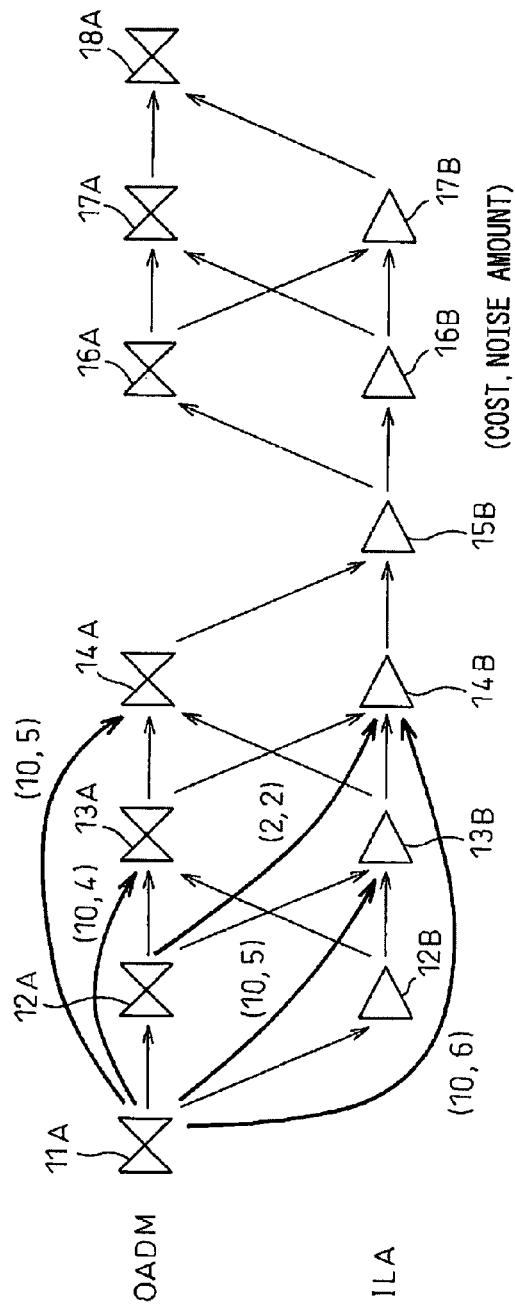
FIG. 21 is a diagram (part 2) illustrating an example of the graph information generated by the first intra-unit-design-section graph generating unit depicted in FIG. 9.

FIG. 21 is a diagram (part 2) illustrating an example of the graph information generated by the first intra-unit-design-section graph generating unit 150 depicted in FIG. 9. The cost and amount of noise calculated by the cost determining unit 154 and transmission degradation amount determining unit 155, depicted in FIG. 20, are not depicted in FIG. 21. FIG. 20 has illustrated the case where, for each attention node, the second link generating unit 153 generates only the input link leading from the node that immediately precedes the attention node, but in addition to the input link from the immediately preceding node, the second link generating unit 153 may also generate an input link leading from a node located two or more nodes upstream of the attention node.

For the node 13A, the second link generating unit 153 generates, in addition to the input links (12A, 13A) and (12B, 13A), an input link (11A, 13A) leading from the node 11A corresponding to the station 11 further upstream of the station 13 corresponding to the node 13A. When the input link (11A, 13A) is selected for the node 13A, a bypass is placed at the station 12.

Similarly, for the node 13B, the second link generating unit 153 generates, in addition to the input links (12A, 13B) and (12B, 13B), an input link (11A, 13B) leading from the node 11A corresponding to the station 11 further upstream of the station 13 corresponding to the node 13B. When the input link (11A, 13B) is selected for the node 13B, a bypass is placed at the station 12.

For the node 14A, the second link generating unit 153 generates, in addition to the input links (13A, 14A) and (13B, 14A), an input link (11A, 14A) leading from the node 11A corresponding to the station 11 further upstream of the station 14 corresponding to the node 14A. When the input link (11A, 14A) is selected for the node 14A, a bypass is placed at each of the stations 12 and 13.

Further, for the node 14B, the second link generating unit 153 generates, in addition to the input links (13A, 14B) and (13B, 14B), an input link (11A, 14B) leading from the node 11A corresponding to the station 11 further upstream of the station 14 corresponding to the node 14B and an input link (12A, 14B) leading from the node 12A corresponding to the station 12 upstream of the station 14.

When the input link (11A, 14B) is selected for the node 14B, a bypass is placed at each of the stations 12 and 13. On the other hand, when the input link (12A, 14B) is selected, a bypass is placed at the station 13. In this way, the input links (11A, 13A), (11A, 13B), (11A, 14A), (11A, 14B), and (12A, 14B) are generated as bypass links.

The cost determining unit 154 and transmission degradation amount determining unit 155 determine the cost and noise amount as being (10, 4) when the input link (11A, 13A) is selected. Further, the cost determining unit 154 and transmission degradation amount determining unit 155 determine the cost and noise amount as being (10, 5) when the input link (11A, 13B) is selected. Similarly, the cost determining unit 154 and transmission degradation amount determining unit 155 determine the cost and noise amount as being (10, 5) when the input link (11A, 14A) is selected.

Figure 22:
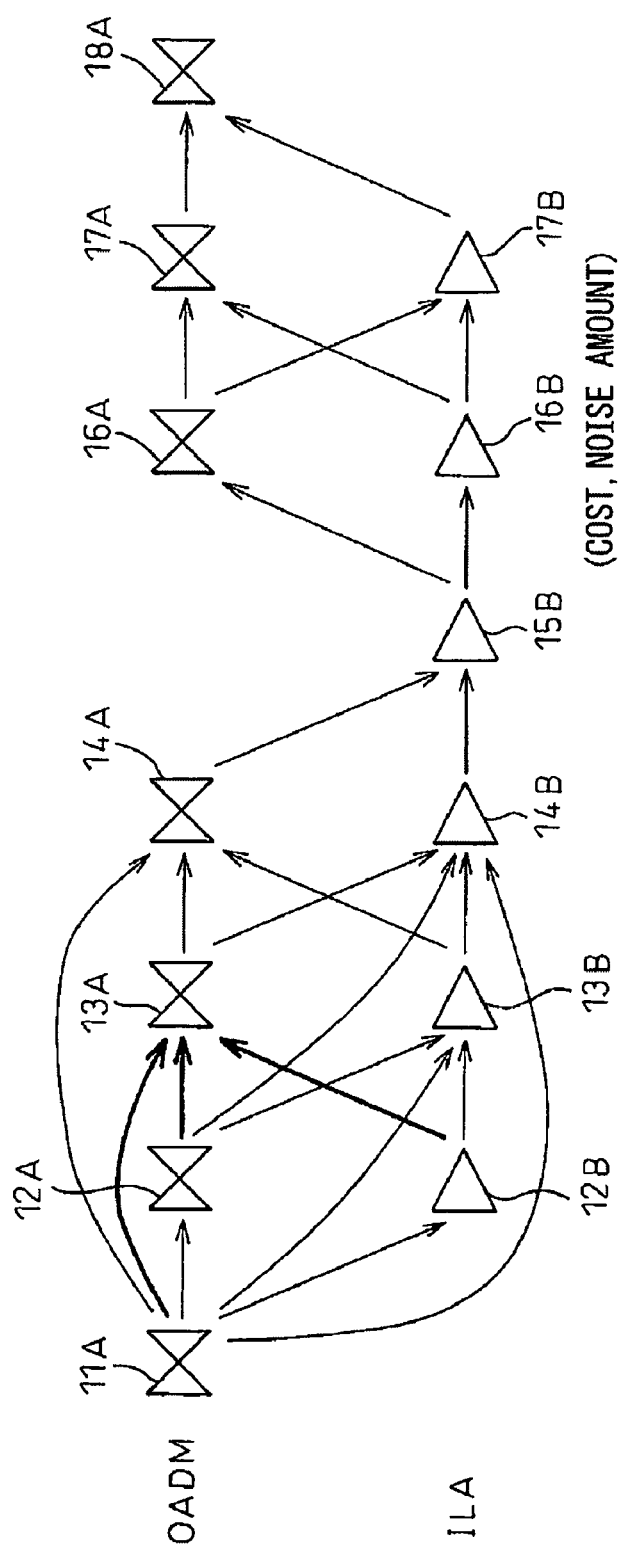
FIG. 22 is a diagram illustrating how a second link selecting unit depicted in FIG. 9 selects an input link.

The cost determining unit 154 and transmission degradation amount determining unit 155 determine the cost and noise amount as being (10, 6) when the input link (11A, 14B) is selected. Similarly, the cost determining unit 154 and transmission degradation amount determining unit 155 determine the cost and noise amount as being (2, 2) when the input link (12A, 14B) is selected. Other bypass links can also be generated, but for simplicity, the following description deals with the case where only the input links depicted in FIG. 20 and their bypass links are generated. Since, in the generated graph, there are no input links associated with the node 15A, the cost determining unit 154 and transmission degradation amount determining unit 155 delete the node 15A FIG. 22 is a diagram illustrating how the second link selecting unit 156 depicted in FIG. 9 selects the input link. In FIG. 22, the same parts as those depicted in FIGS. 20 and 21 are designated by the same reference characters, and the description of such parts will not be repeated here. The following describes how the input link is selected for the node 13A. Each input link to the node 13A is indicated by a thick arrow, and other input links are indicated by thin arrows. The second link selecting unit 156 selects one input link from among the three input links (12A, 13A), (12B, 13A), and (11A, 13A) generated as the input links to the node 13A by the second link generating unit 153.

By selecting one input link for the node 13A from among the input links (12A, 13A), (12B, 13A), and (11A, 13A), the equipment placement up to the station where an OADM or an ILA is placed immediately preceding the station 13 is determined by the second node determining unit 157 for the case where an OADM is placed at the station 13. When the input link (12A, 13A) is selected by the second link selecting unit 156, the second node determining unit 157 determines that an OADM is placed at the station 12 when an OADM is placed at the station 13.

On the other hand, when the input link (12B, 13A) is selected by the second link selecting unit 156, the second node determining unit 157 determines that an ILA is placed at the station 12 when an OADM is placed at the station 13. When the input link (11A, 13A) is selected by the second link selecting unit 156, the second node determining unit 157 determines that a bypass is placed at the station 12 and an OADM in the station 11 when an OADM is placed at the station 13.

While the above description has been given by specifically dealing with the case where the second link selecting unit 156 selects one input link for the node 13A from among the input links generated for that node, the second link selecting unit 156 also selects one input link from among a plurality of links for each of the other nodes 12A to 14A, 16A to 18A, and 12B to 17B, and thus searches for the path corresponding to the placement that holds the transmission degradation amount to within the threshold value and that minimizes the cost.

Figure 23:
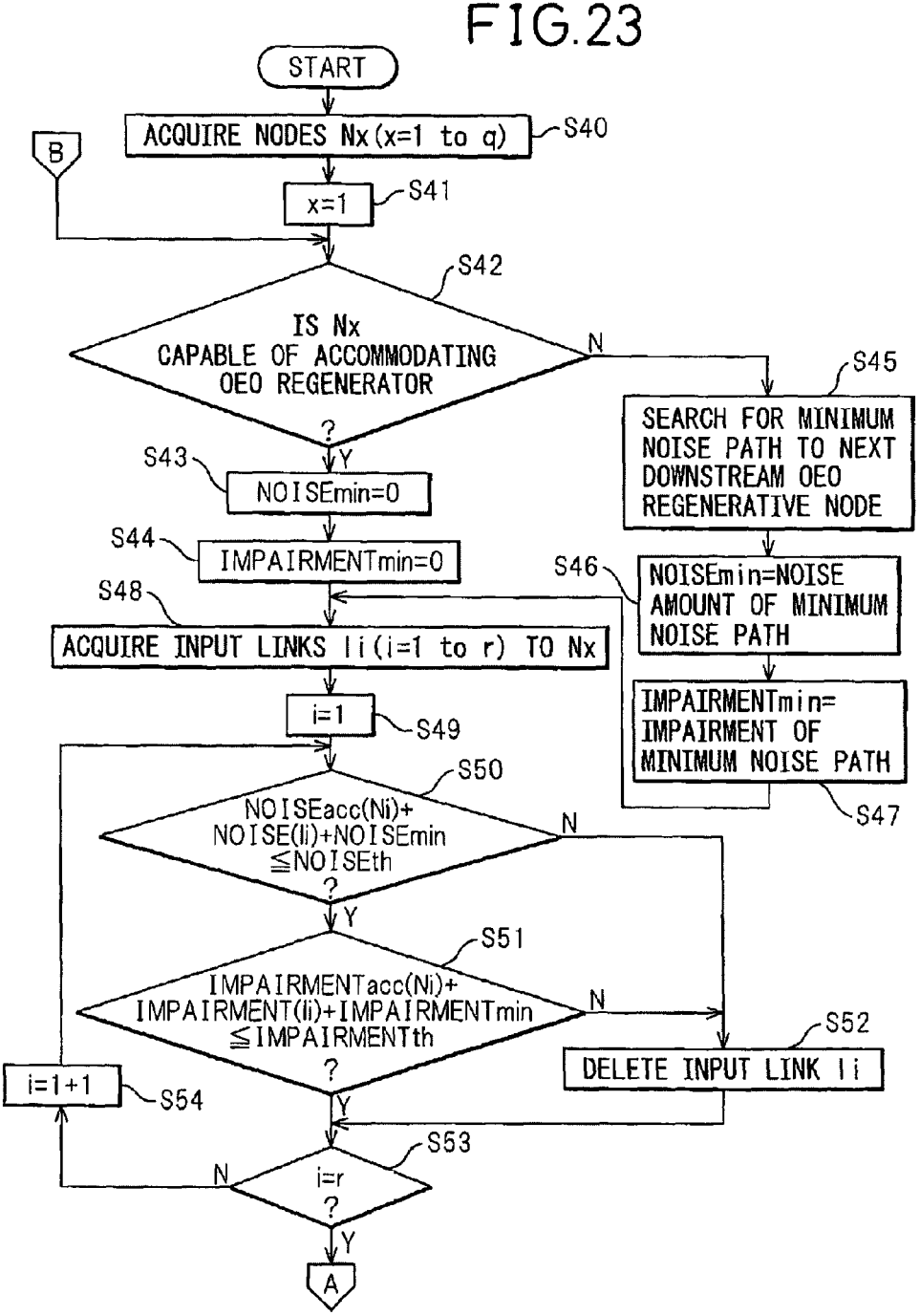
FIG. 23 is a flowchart (part 1) illustrating one example of the selection process performed by the second link selecting unit depicted in FIG. 9.
Figure 24:
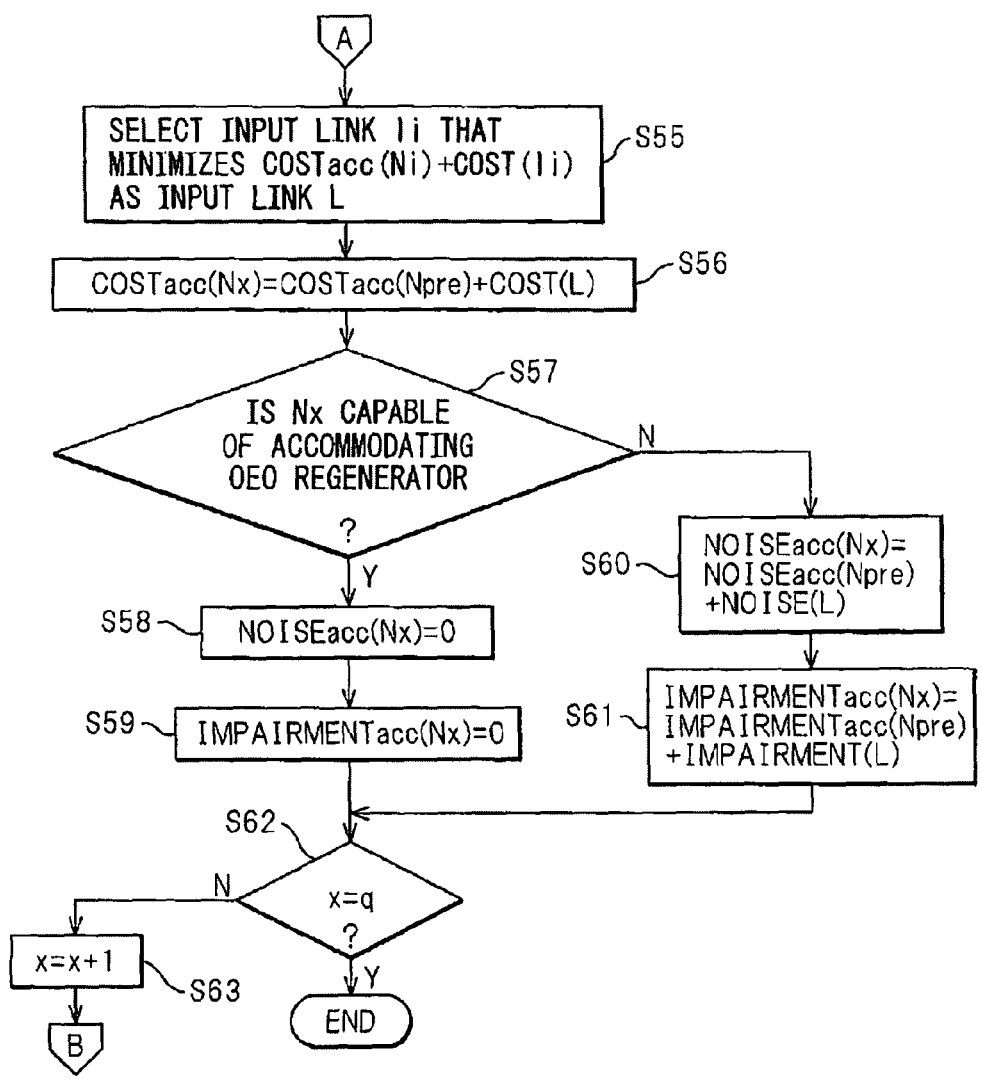
FIG. 24 is a flowchart (part 2) illustrating one example of the selection process performed by the second link selecting unit depicted in FIG. 9.

FIGS. 23 and 24 are a flowchart illustrating one example of the selection process performed by the second link selecting unit 156 depicted in FIG. 9. FIGS. 23 and 24 deal with the case where the noise amount and the various kinds of impairments occurring in the forward and backward directions are taken as the transmission degradation amounts.

In step S40, the second link selecting unit 156 acquires the nodes Nx (x=1 to q) generated by the second node candidate generating unit 152.

In step S41, the second link selecting unit 156 sets the node number x referring to one of the nodes Nx acquired in step S40 to 1.

In step S42, the second link selecting unit 156 determines whether or not the node Nx is a node capable of accommodating an OEO regenerator.

If, in step S42, the node Nx is a node capable of accommodating an OEO regenerator, the second link selecting unit 156 in step S43 sets the minimum value of the noise amount, NOISEmin, to 0. The minimum value NOISEmin defines the minimum value of the noise amount occurring along the path from the node Nx to the downstream OEO regenerative node. In step S44, the second link selecting unit 156 sets the minimum value of the impairment, IMPAIRMENTmin, to 0, and proceeds to step S48. The minimum value IMPAIRMENTmin defines the minimum value of the impairment occurring along the path from the node Nx to the downstream OEO regenerative node.

The minimum value NOISEmin is set for each of the forward and backward direction components of the noise amount.

Likewise, the minimum value IMPAIRMENTmin is set for each kind of impairment and for each of the forward and backward direction components of the impairment.

If, in step S42, the node Nx is not a node capable of accommodating an OEO regenerator, the second link selecting unit 156 in step S45 searches for a minimum noise path to the downstream OEO regenerative node that follows the node Nx. The minimum noise path to the downstream OEO regenerative node that follows the node Nx refers to the path to the downstream OEO regenerative node that minimizes the sum of the noise amounts occurring along the input links to the node Nx from among the OEO regenerative nodes located downstream of the node Nx.

In step S46, for each of the forward and backward direction components, the second link selecting unit 156 sets the minimum value NOISEmin of the noise amount equal to the value of the noise amount of the minimum noise path found in step S45.

In step S47, for each kind of impairment and for each of the forward and backward direction components, the second link selecting unit 156 sets the minimum value IMPAIRMENTmin of the impairment to the value of the impairment of the minimum noise path found in step S45.

In step S48, the second link selecting unit 156 acquires the input links li (i=1 to r) generated for the node Nx. IMPAIRMENTmin is set equal to the value of the minimum noise path, but a separate search may be made to find a minimum impairment path, and the value of such a path may be taken as IMPAIRMENTmin.

In step S49, the second link selecting unit 156 sets the input link number i referring to one of the input links li acquired in step S48 to 1.

In step S50, for each of the forward and backward direction components, the second link selecting unit 156 determines whether the sum of the noise NOISEacc(Ni) accumulated up to the starting point node Ni of the input link li, the noise NOISE(li) that occurs when the input link li is selected, and the noise amount minimum value NOISEmin set in step S43 or S46 is larger than the noise threshold value NOISEth.

The second link selecting unit 156 uses as the noise threshold values NOISEth the intra-unit-design-section noise amount upper limit values Nth1($g_h$) and Nth2($g_h$) determined by the intra-unit-design-section noise amount upper limit value determining unit 134.

If, in step S50, the sum is smaller than or equal to the noise threshold value NOISEth for both of the forward and backward direction components, the process proceeds to step S51.

In step S51, for each kind of impairment and for each of the forward and backward direction components, the second link selecting unit 156 determines whether or not the sum of the impairment IMPAIRMENTacc(Ni) accumulated up to the starting point node Ni of the input link li, the impairment IMPAIRMENT(li) that occurs when the input link li is selected, and the impairment minimum value IMPAIRMENTmin set in step S44 or S47 is larger than the impairment threshold value IMPAIRMENTth.

The second link selecting unit 156 uses as the impairment threshold values IMPAIRMENTth the intra-unit-design-section impairment upper limit values $Pth1_k(g_h)$ and $Pth2_k(g_h)$ determined by the intra-unit-design-section impairment upper limit value determining unit 131.

If, in step S50, the sum is larger than the noise threshold value NOISEth for one or other or both of the forward and backward direction components, the process proceeds to step S52.

Likewise, if, in step S51, it is determined for any one of the various kinds of impairments that the sum is larger than the impairment threshold value IMPAIRMENTth for one or other or both of the forward and backward direction components, the process proceeds to step S52.

In step S52, the second link selecting unit 156 deletes the input link li from the input links acquired in step S48, and proceeds to step S53.

If, in step S51, it is determined for any kind of impairment that the sum is smaller than or equal to the impairment threshold value IMPAIRMENTth for both of the forward and backward direction components, then in step S53 the second link selecting unit 156 determines whether the input link number i is the last number r or not.

If the input link number i is not the last number r, the second link selecting unit 156 changes the input link number i to i+1 in step S54, and returns to step S50 to repeat the above process.

If, in step S53, the input link number i is the last number r, the process proceeds to step S55 of FIG. 24 (as indicated by symbol A).

In step S55, from among the input links li acquired in step S48 but not deleted in step S52, the second link selecting unit 156 selects as the input link L to the node Nx the input link li that minimizes the sum of the cost COSTacc(Ni) accumulated up to the starting point node Ni and the cost COST(li) of the input link li.

In step S56, the second link selecting unit 156 calculates the cost accumulated up to the node Nx as COSTacc(Nx)= COSTacc(Npre)+COST(L). Here, COSTacc(Npre) represents the cost accumulated up to the starting point node Npre of the input link L selected in step S55. COST(L) represents the cost when the input link L is selected.

In step S57, the second link selecting unit 156 determines whether or not the node Nx is a node capable of accommodating an OEO regenerator (step S57). If it is a node capable of accommodating an OEO regenerator, the process proceeds to step S58 where the second link selecting unit 156 resets the noise NOISEacc(Nx) accumulated up to the node Nx to 0 for both of the forward and backward direction components. In the next step S59, the second link selecting unit 156 resets the impairment IMPAIRMENTacc(Nx) accumulated up to the node Nx to 0 for both of the forward and backward direction components. After that, the process proceeds to step S62.

If it is determined in step S57 that the node Nx is not a node capable of accommodating an OEO regenerator, the process proceeds to step S60 where, for both of the forward and backward direction components, the second link selecting unit 156 sets the noise NOISEacc(Nx) accumulated up to the node Nx equal to the sum of the noise NOISEacc(Npre) accumulated up to the node Npre and the noise NOISE(L) that occurs along the input link L.

In the next step S61, for each kind of impairment and for each of the forward and backward direction components, the second link selecting unit 156 sets the impairment IMPAIRMENTacc(Nx) accumulated up to the node Nx equal to IMPAIRMENTacc(Npre)+IMPAIRMENT(L). Here, IMPAIRMENTacc(Npre) represents the impairment accumulated up to the node Npre. In step S62, the second link selecting unit 156 determines whether the node number x is the last number q or not. If, in step S62, the node number x is not the last number q, the node number x is changed to x+1, and the process returns to step S42 of FIG. 23 (as indicated by symbol B) to repeat the above process. If the node number x is the last number q, the input link selection process is terminated.

By repeating the above steps, the input links L to the respective nodes Nx generated by the second node candidate generating unit 152 are sequentially selected. Next, a description will be given of the case where the process depicted in FIGS. 23 and 24 is applied to the example illustrated in FIGS. 20 to 22. For simplicity, the following description is given by using only the forward direction noise amount to represent the transmission degradation amount. Accordingly, steps S44, S47, S51, S59, and S61 depicted in FIGS. 23 and 24 will not be described here.

Figure 25:
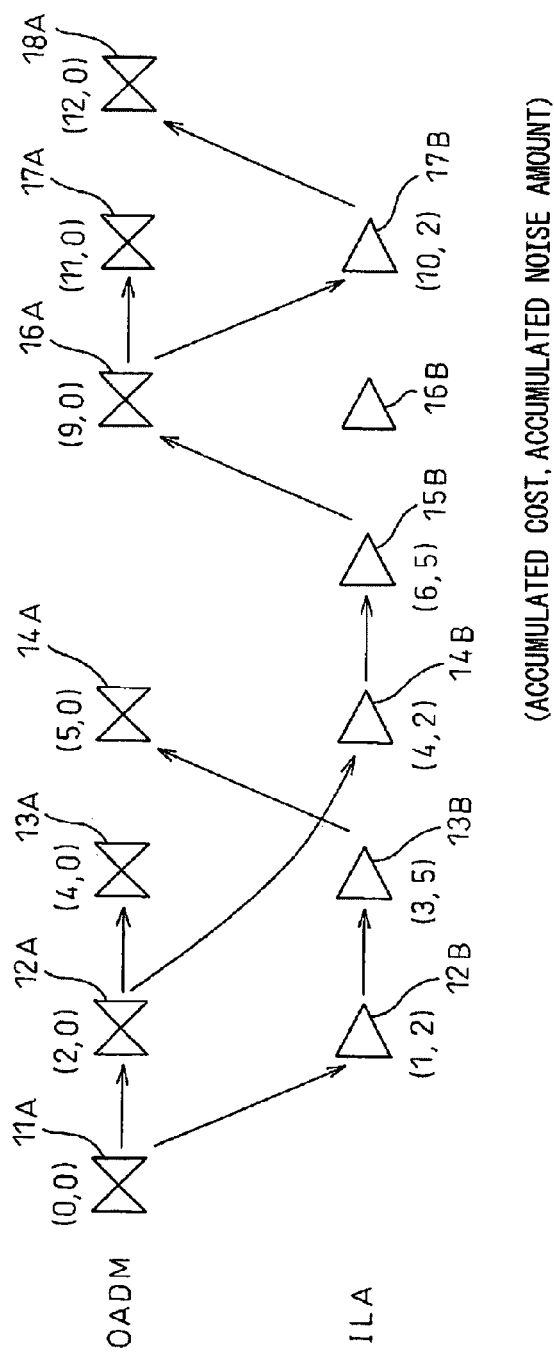
FIG. 25 is a diagram illustrating the results of the input link selection process performed by the second link selecting unit depicted in FIG. 9.

FIG. 25 is a diagram illustrating the results of the input link selection process performed by the second link selecting unit 156 depicted in FIG. 9. In FIG. 25, the same parts as those depicted in FIGS. 20 to 22 are designated by the same reference characters, and the description of such parts will not be repeated here. In FIG. 25, each arrow indicates the input link L selected by the process depicted in FIGS. 23 and 24. Further, the accumulated cost COSTacc and accumulated noise NOISEacc calculated in steps S55 to S61 are depicted as (accumulated cost, accumulated noise amount) alongside each node.

The input link L to the node 12A is determined in the following manner. Since the node 12A is a node corresponding to an OADM, the minimum value NOISEmin of the noise amount is 0 (step S43). Only the input link (11A, 12A) is acquired as the input link to the node 12A (step S48).

The total noise amount when the input link (11A, 12A) is selected is calculated as NOISEacc(11A)+NOISE(11A, 12A)+NOISEmin=0+1+0=1 (step S50). Since this total noise amount is not larger than the threshold value 7 defined by NOISEth, the input link (11A, 12A) is not deleted (step S52).

The total cost when the input link (11A, 12A) is selected is calculated as COSTacc(11A)+COST(11A, 12A)=0+2=2 (step S55). Since the input link (11A, 12A) is the only remaining input link, the input link (11A, 12A) is selected as the input link L to the node 12A (step S55).

The cost accumulated up to the node 12A is calculated as COSTacc(12A)=COSTacc(11A)+COST(11A, 12A)=0+2=2 (step S56). Since the node 12A is a node corresponding to an OADM, the noise NOISEacc(12A) accumulated up to the node 12A is reset to 0 (step S58).

The input link L to the node 12B is determined in the following manner. Since the node 12B is a node corresponding to an ILA, the path from the node 12B to the node 13A is chosen as the minimum noise path to the downstream OEO regenerative node for the node 12B (step S45), and the minimum value NOISEmin of the noise amount is set to 2 (step S46). Here, only the input link (11A, 12B) is acquired as the input link to the node 12B (step S48).

The total noise amount when the input link (11A, 12B) is selected is calculated as NOISEacc(11A)+NOISE(11A, 12B)+NOISEmin=0+2+2=4 (step S50). Since the total noise amount when the input link (11A, 12B) is selected is not larger than the threshold value 7 defined by NOISEth, the input link (11A, 12B) is not deleted (step S52).

The total cost when the input link (11A, 12B) is selected is calculated as COSTacc(11A)+COST(11A, 12B)=0+1=1 (step S55). Since the input link (11A, 12B) is the only remaining input link, the input link (11A, 12B) is selected as the input link L to the node 12B (step S55).

The cost accumulated up to the node 12B is calculated as COSTacc(12B)=COSTacc(11A)+COST(11A, 12B)=0+1=1 (step S56). Since the node 12B is a node corresponding to an ILA, the noise accumulated up to the node 12B is calculated as NOISEacc(12B)=NOISEacc(11A)+NOISE(11A, 12B)=0+2=2 (step S60).

Next, how the input link L to the node 13A is determined will be described. Since the node 13A is a node corresponding to an OADM, the minimum value NOISEmin of the noise amount is 0 (step S43). Here, the input links (12A, 13A), (12B, 13A), and (11A, 13A) are acquired as the input links to the node 13A (step S48).

The total noise amount when the input link (12A, 13A) is selected is calculated as NOISEacc(12A)+NOISE(12A, 13A)+NOISEmin=0+1+0=1 (step S50). Likewise, the total noise amount when the input link (12B, 13A) is selected is calculated as NOISEacc(12B)+NOISE(12B, 13A)+NOISEmin=2+2+0=4 (step S50).

The total noise amount when the input link (11A, 13A) is selected is calculated as NOISEacc(11A)+NOISE(11A, 13A)+NOISEmin=0+4+0=4 (step S50). Since none of these total noise amounts are larger than the threshold value 7 defined by NOISEth, none of the input links (12A, 13A), (12B, 13A), and (11A, 13A) are deleted (step S52).

The total cost when the input link (12A, 13A) is selected is calculated as COSTacc(12A)+COST(12A, 13A)=2+2=4. Likewise, the total cost when the input link (12B, 13A) is selected is calculated as COSTacc(12B)+COST(12B, 13A)=1+4=5. The total cost when the input link (11A, 13A) is selected is calculated as COSTacc(11A)+COST(11A, 13A)=0+10=10. Accordingly, the input link (12A, 13A) that minimizes the total cost is selected as the input link L to the node 13A (step S55).

The cost accumulated up to the node 13A is calculated as COSTacc(13A)=COSTacc(12A)+COST(12A, 13A)=2+2=4 (step S56). Since the node 13A is a node corresponding to an OADM, the noise NOISEacc(13A) accumulated up to the node 13A is reset to 0 (step S58).

The input link L to the node 13B is determined in the following manner. Since the node 13B is a node corresponding to an ILA, the path from the node 13B to the node 14A is chosen as the minimum noise path (step S45), and the minimum value NOISEmin of the noise amount is set to 2 (step S46). The input links (12A, 13B), (12B, 13B), and (11A, 13B) are acquired as the input nodes to the node 13B (step S48).

The total noise amount when the input link (12A, 13B) is selected is calculated as NOISEacc(12A)+NOISE(12A, 13B)+NOISEmin=0+2+2=4 (step S50). Likewise, the total noise amount when the input link (12B, 13B) is selected is calculated as NOISEacc(12B)+NOISE(12B, 13B)+NOISEmin=2+3+2=7 (step S50).

The total noise amount when the input link (11A, 13B) is selected is calculated as NOISEacc(11A)+NOISE(11A, 13B)+NOISEmin=0+5+2=7 (step S50). Since none of these total noise amounts are larger than the threshold value 7 defined by NOISEth, none of the input links (12A, 13B), (12B, 13B), and (11A, 13B) are deleted (step S52).

The total cost when the input link (12A, 13B) is selected is calculated as COSTacc(12A)+COST(12A, 13B)=2+2=4. Likewise, the total cost when the input link (12B, 13B) is selected is calculated as COSTacc(12B)+COST(12B, 13B)=1+2=3. The total cost when the input link (11A, 13B) is selected is calculated as COSTacc(11A)+COST(11A, 13B)=0+10=10. Accordingly, the input link (12B, 13B) that minimizes the total cost is selected as the input link L to the node 13B (step S55).

The cost accumulated up to the node 13B is calculated as COSTacc(13B)=COSTacc(12B)+COST(12B, 13B)=1+2=3 (step S56). Since the node 13B is a node corresponding to an ILA, the noise accumulated up to the node 13B is calculated as NOISEacc(13B)=NOISEacc(12B)+NOISE(12B, 13B)=2+3=5 (step S60).

Next, how the input link L to the node 14A is determined will be described. Since the node 14A is a node corresponding to an OADM, the minimum value NOISEmin of the noise amount is 0 (step S43). The input links (13A, 14A), (13B, 14A), and (11A, 14A) are acquired as the input links to the node 14A (step S48).

The total noise amount when the input link (13A, 14A) is selected is calculated as NOISEacc(13A)+NOISE(13A, 14A)+NOISEmin=0+1+0=1 (step S50). Likewise, the total noise amount when the input link (13B, 14A) is selected is calculated as NOISEacc(13B)+NOISE(13B, 14A)+NOISEmin=5+2+0=7 (step S50).

The total noise amount when the input link (11A, 14A) is selected is calculated as NOISEacc(11A)+NOISE(11A, 14A)+NOISEmin=0+5+0=5 (step S50). Since none of these total noise amounts are larger than the threshold value 7 defined by NOISEth, none of the input links (13A, 14A), (13B, 14A), and (11A, 14A) are deleted (step S52).

The total cost when the input link (13A, 14A) is selected is calculated as COSTacc(13A)+COST(13A, 14A)=4+2=6. Likewise, the total cost when the input link (13B, 14A) is selected is calculated as COSTacc(13B)+COST(13B, 14A)=3+2=5. The total cost when the input link (11A, 14A) is selected is calculated as COSTacc(11A)+COST(11A, 14A)=0+10=10. Accordingly, the input link (13B, 14A) that minimizes the total cost is selected as the input link L to the node 14A (step S55).

The cost accumulated up to the node 14A is calculated as COSTacc(14A)=COSTacc(13B)+COST(13B, 14A)=3+2=5 (step S56). Since the node 14A is a node corresponding to an OADM, the noise NOISEacc(14A) accumulated up to the node 14A is reset to 0 (step S58).

The input link L to the node 14B is determined in the following manner. Since the node 14B is a node corresponding to an ILA, the path from the node 14B to the node 16A is chosen as the minimum noise path to the downstream OEO regenerative node for the node 14B (step S45), and the minimum value NOISEmin of the noise amount is given as 3+2=5 (step S46). The input links (13A, 14B), (13B, 14B), (11A, 14B), and (12A, 14B) are acquired as the input nodes to the node 14B (step S48).

The total noise amount when the input link (13A, 14B) is selected is calculated as NOISEacc(13A)+NOISE(13A, 14B)+NOISEmin=0+2+5=7 (step S50). Likewise, the total noise amount when the input link (13B, 14B) is selected is calculated as NOISEacc(13B)+NOISE(13B, 14B)+NOISEmin=5+3+5=13 (step S50). The total noise amount when the input link (11A, 14B) is selected is calculated as NOISEacc(11A)+NOISE(11A, 14B)+NOISEmin=0+6+5=11 (step S50).

The total noise amount when the input link (12A, 14B) is selected is calculated as NOISEacc(12A)+NOISE(12A, 14B)+NOISEmin=0+2+5=7 (step S50). The input links (13B, 14B) and (11A, 14B) whose total noise amounts are larger than the threshold value 7 defined by NOISEth are deleted (step S52).

The total cost when the input link (13A, 14B) is selected is calculated as COSTacc(13A)+COST(13A, 14B)=4+1=5 (step S55). The total cost when the input link (12A, 14B) is selected is calculated as COSTacc(12A)+COST(12A, 14B)=2+2=4. Accordingly, the input link (12A, 14B) that minimizes the total cost is selected as the input link L to the node 14B (step S55).

The cost accumulated up to the node 14B is calculated as COSTacc(14B)=COSTacc(12A)+COST(12A, 14B)=2+2=4 (step S56). Since the node 14B is a node corresponding to an ILA, the noise accumulated up to the node 14B is calculated as NOISEacc(14B)=NOISEacc(12A)+NOISE(12A, 14B)=0+2=2 (step S60).

The input link L to the node 15B is determined in the following manner. Since the node 15B is a node corresponding to an ILA, the path from the node 15B to the node 16A is chosen as the minimum noise path to the downstream OEO regenerative node for the node 15B (step S45), and the minimum value NOISEmin of the noise amount is set to 2 (step S46). The input links (14A, 15B) and (14B, 15B) are acquired as the input nodes to the node 15B (step S48).

The total noise amount when the input link (14A, 15B) is selected is calculated as NOISEacc(14A)+NOISE(14A, 15B)+NOISEmin=0+2+2=4 (step S50). The total noise amount when the input link (14B, 15B) is selected is calculated as NOISEacc(14B)+NOISE(14B, 15B)+NOISEmin=2+3+2=7. Since neither of these total amounts are larger than the threshold value 7 defined by NOISEth, neither the input link (14A, 15B) nor the input link (14B, 15B) is deleted (step S52).

The total cost when the input link (14A, 15B) is selected is calculated as COSTacc(14A)+COST(14A, 15B)=5+2=7 (step S55). The total cost when the input link (14B, 15B) is selected is calculated as COSTacc(14B)+COST(14B, 15B)=4+2=6. Accordingly, the input link (14B, 15B) that minimizes the total cost is selected as the input link L to the node 15B (step S55).

The cost accumulated up to the node 15B is calculated as COSTacc(15B)=COSTacc(14B)+COST(14B, 15B)=4+2=6 (step S56). Since the node 15B is a node corresponding to an ILA, the noise accumulated up to the node 15B is calculated as NOISEacc(15B)=NOISEacc(14B)+NOISE(14B, 15B)=2+3=5 (step S60).

Next, how the input link L to the node 16A is determined will be described. Since the node 16A is a node corresponding to an OADM, the minimum value NOISEmin of the noise amount is 0 (step S43). Only the input link (15B, 16A) is acquired as the input link to the node 16A (step S48).

The total noise amount when the input link (15B, 16A) is selected is calculated as NOISEacc(15B)+NOISE(15B, 16A)+NOISEmin=5+2+0=7 (step S50). Since the total noise amount when the input link (15B, 16A) is selected is not larger than the threshold value 7 defined by NOISEth, the input link (15B, 16A) is not deleted (step S52).

The total cost when the input link (15B, 16A) is selected is calculated as COSTacc(15B)+COST(15B, 16A)=6+3=9 (step S55). Since the input link (15B, 16A) is the only remaining input link, the input link (15B, 16A) is selected as the input link L to the node 16A (step S55).

The cost accumulated up to the node 16A is calculated as COSTacc(16A)=COSTacc(15B)+COST(15B, 16A)=6+3=9 (step S56). Since the node 16A is a node corresponding to an OADM, the noise NOISEacc(16A) accumulated up to the node 16A is reset to 0 (step S58).

The input link L to the node 16B is determined in the following manner. Since, in step S42, the node 16B is a node corresponding to an ILA, the path to the node 17A is chosen (step S45), and the minimum value NOISEmin of the noise amount is set to 2 (step S46). Only the input link (15B, 16B) is acquired as the input link to the node 16B (step S48).

The total noise amount when the input link (15B, 16B) is selected is calculated as NOISEacc(15B)+NOISE(15B, 16B)+NOISEmin=5+3+2=10 (step S50). Since this total noise amount is larger than the threshold value 7 defined by NOISEth, the input link (15B, 16B) is deleted (step S52).

Since the only input link acquired in step S48 is deleted, the process from step S55 onward is not performed for the node 16B. Further, the input links (16B, 17A) and (16B, 17B) starting from the node 16B are deleted from the input links generated by the second link generating unit 153.

Next, how the input link L to the node 17A is determined will be described. Since the node 17A is a node corresponding to an OADM, the minimum value NOISEmin of the noise amount is 0 (step S43). Only the input link (16A, 17A) is acquired as the input link to the node 17A (step S48).

The total noise amount when the input link (16A, 17A) is selected is calculated as NOISEacc(16A)+NOISE(16A, 17A)+NOISEmin=0+1+0=1 (step S50). Since this total noise amount is not larger than the threshold value 7 defined by NOISEth, the input link (16A, 17A) is not deleted (step S52).

The total cost when the input link (16A, 17A) is selected is calculated as COSTacc(16A)+COST(16A, 17A)=9+2=11 (step S55). Since the input link (16A, 17A) is the only remaining input link, the input link (16A, 17A) is selected as the input link L to the node 17A (step S55).

The cost accumulated up to the node 17A is calculated as COSTacc(17A)=COSTacc(16A)+COST(16A, 17A)=9+2=11 (step S56). Since the node 17A is a node corresponding to an OADM, the noise NOISEacc(17A) accumulated up to the node 17A is reset to 0 (step S58).

The input link L to the node 17B is determined in the following manner. Since the node 17B is a node corresponding to an ILA, the path from the node 17B to the node 18A is chosen as the minimum noise path to the node located downstream of the node 17B and capable of accommodating an OEO regenerator (step S45), and the minimum value NOISEmin of the noise amount is set to 2 (step S46). Only the input link (16A, 17B) is acquired as the input link to the node 17B (step S48).

The total noise amount when the input link (16A, 17B) is selected is calculated as NOISEacc(16A)+NOISE(16A, 17B)+NOISEmin=0+2+2=4 (step S50). Since the total noise amount when the input link (16A, 17B) is selected is not larger than the threshold value 7 defined by NOISEth, the input link (16A, 17B) is not deleted (step S52).

The total cost when the input link (16A, 17B) is selected is calculated as COSTacc(16A)+COST(16A, 17B)=9+1=10 (step S55). Since the input link (16A, 17B) is the only remaining input link, the input link (16A, 17B) is selected as the input link L to the node 17B (step S55).

The cost accumulated up to the node 17B is calculated as COSTacc(17B)=COSTacc(16A)+COST(16A, 17B)=9+1=10 (step S56). Since the node 17B is a node corresponding to an ILA, the noise accumulated up to the node 17B is calculated as NOISEacc(17B)=NOISEacc(16A)+NOISE (16A, 17B)=0+2=2 (step S60).

The input link L to the node 18A is determined in the following manner. Since the node 18A is an OADM capable of accommodating an OEO regenerator, the minimum value NOISEmin of the noise amount is 0 (step S43). The input links (17A, 18A) and (17B, 18A) are acquired as the input links to the node 18A (step S48).

The total noise amount when the input link (17A, 18A) is selected is calculated as NOISEacc(17A)+NOISE(17A, 18A)+NOISEmin=0+1+0=1 (step S50). The total noise amount when the input link (17B, 18A) is selected is calculated as NOISEacc(17B)+NOISE(17B, 18A)+NOISEmin=2+2+0=4 (step S50). Since neither of these total amounts are larger than the threshold value 7 defined by NOISEth, neither the input link (17A, 18A) nor the input link (17B, 18A) is deleted (step S52).

The total cost when the input link (17A, 18A) is selected is calculated as COSTacc(17A)+COST(17A, 18A)=11+2=13 (step S55). The total cost when the input link (17B, 18A) is selected is calculated as COSTacc(17B)+COST(17B, 18A)= 10+2=12 (step S55). Accordingly, the input link (17B, 18A) that minimizes the total cost is selected as the input link L to the node 18A (step S55).

The cost accumulated up to the node 18A is calculated as COSTacc(18A)=COSTacc(17B)+COST(17B, 18A)=10+ 2=12 (step S56). Since the node 18A is a node corresponding to an OADM, the noise NOISEacc(18A) accumulated up to the node 18A is reset to 0 (step S58). In this way, the input links L to the respective nodes are sequentially selected.

Based on the starting point node of each input link supplied from the second link selecting unit 156, the second node determining unit 157 depicted in FIG. 9 selects one of the nodes generated by the second node candidate generating unit 152 and thus determines one candidate for the optical transmission equipment to be placed at the corresponding station contained in the unit design section. The node selection process performed by the second node determining unit 157 is the same as that depicted in the flowchart of FIG. 17.

Figure 26:
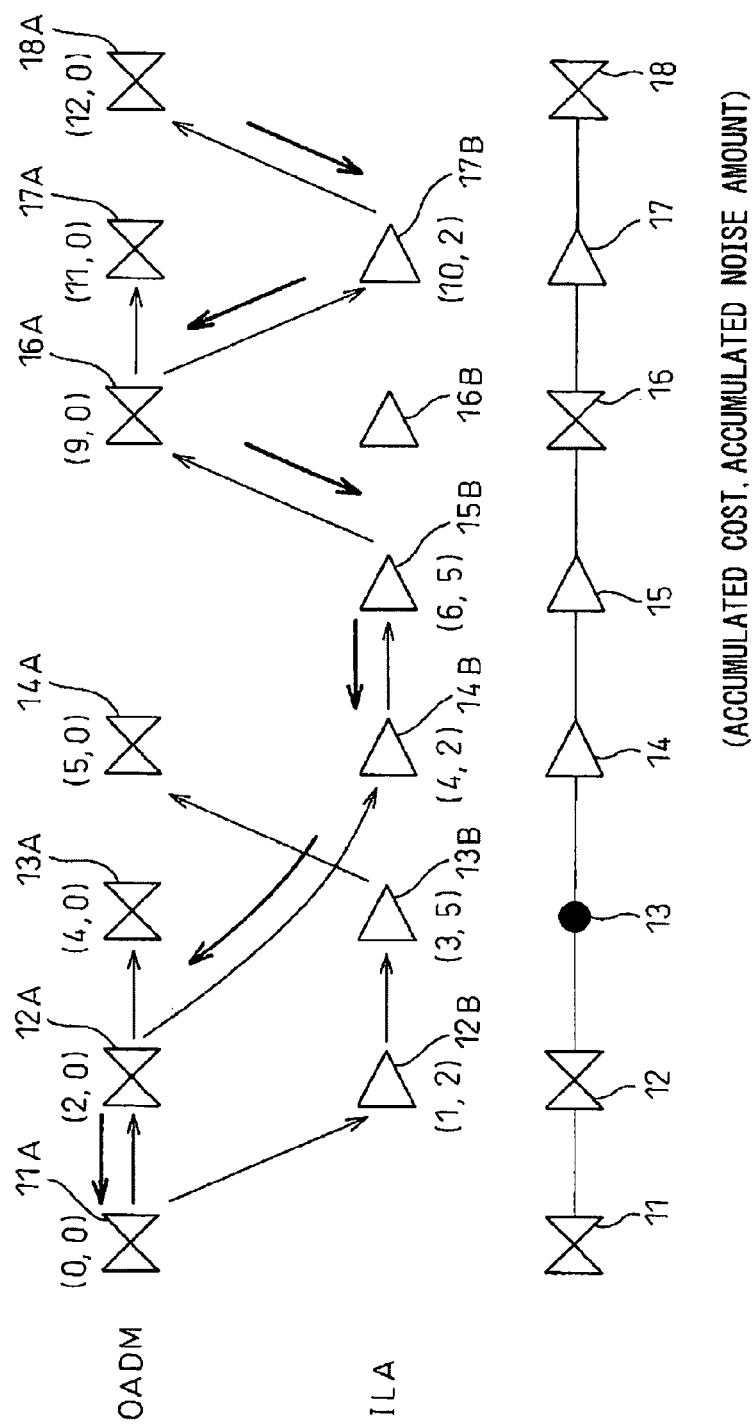
FIG. 26 is a diagram illustrating the results of the relay node determination process performed by a second node determining unit depicted in FIG. 9.

FIG. 26 is a diagram illustrating the results of the relay node determination process performed by the second node determining unit 157 depicted in FIG. 9. In FIG. 26, the same parts as those depicted in FIGS. 20 to 22 and 25 are designated by the same reference characters, and the description of such parts will not be repeated here. In FIG. 26, the thick arrows indicate the path of the nodes as traced by the respective steps depicted FIG. 17. The kinds of optical transmission equipment determined by the respective steps are depicted at the bottom of the graph. The filled circle indicates a bypass.

First, the node number is set to indicate the node 18A corresponding to the terminating station 18 in the unit design section 204 (step S21), and the node 18A is held as one of the relay nodes (step S22). The input link (17B, 18A) is acquired as the input link L to the node 18A (step S23). Further, the node 17B is acquired as the starting point node Npre of the input link (17B, 18A) (step S24), and the node 17B is held as one of the relay nodes (step S25).

Next, the node number is set to indicate the node 17B (step S27), and the input link (16A, 17B) is acquired as the input link L to the node 17B (step S23). Further, the node 16A is acquired as the starting point node Npre of the input link (16A, 17B) (step S24), and the node 16A is held as one of the relay nodes (step S25).

Next, the node number is set to indicate the node 16A (step S27), and the input link (15B, 16A) is acquired as the input link L to the node 16A (step S23). Further, the node 15B is acquired as the starting point node Npre of the input link (15B, 16A) (step S24), and the node 15B is held as one of the relay nodes (step S25).

Next, the node number is set to indicate the node 15B (step S27), and the input link (14B, 15B) is acquired as the input link L to the node 15B (step S23). Further, the node 14B is acquired as the starting point node Npre of the input link (14B, 15B) (step S24), and the node 14B is held as one of the relay nodes (step S25).

Next, the node number is set to indicate the node 14B (step S27), and the input link (12A, 14B) is acquired as the input link L to the node 14B (step S23). Further, the node 12A is acquired as the starting point node Npre of the input link (12A, 14B) (step S24), and the node 12A is held as one of the relay nodes (step S25).

Next, the node number is set to indicate the node 12A (step S27), and the input link (11A, 12A) is acquired as the input link L to the node 12A (step S23). Further, the node 11A is acquired as the starting point node Npre of the input link (11A, 12A) (step S24), and the node 11A is held as one of the relay nodes (step S25).

Since the node number of the node 11A is the node number of the optical transmission equipment placed at the originating station 11 in the unit design section 204, the relay node determination process is terminated here. By tracing the input links backward from the node 18A to the node 11A in this way, the nodes 18A, 17B, 16A, 15B, 14B, 12A, and 11A are held in this order as the relay nodes.

Based on the kinds of the relay nodes determined by the process depicted in FIG. 17, the second node determining unit 157 determines the kinds of optical transmission equipment to be placed at the respective stations 11 to 18. Based on the node 11A, the second node determining unit 157 places an OADM at the station 11. Further, based on the node 12A, the second node determining unit 157 places an OADM at the station 12.

Since there is no node corresponding to the station 13, the second node determining unit 157 places a bypass at the station 13. Based on the node 14B, the second node determining unit 157 places an ILA at the station 14. Based on the node 15B, the second node determining unit 157 places an ILA at the station 15. Based on the node 16A, the second node determining unit 157 places an OADM at the station 16. Based on the node 17B, the second node determining unit 157 places an ILA at the station 17. The second node determining unit 157 stores the thus determined optical transmission equipment configuration in the storage unit 126 as the optical transmission equipment configuration candidate for the unit design section 204.

In step S32 depicted in FIG. 19, the additional candidate searching unit 128 searches for a new optical transmission equipment configuration candidate t'. The process that the additional candidate searching unit 128 performs to search for the optical transmission equipment configuration candidate t' is the same as that described with reference to FIGS. 20 to 26 in which the initial candidate generating unit 125 determines the optical transmission equipment configuration.

However, in step S55, the third link selecting unit 166 in the additional candidate searching unit 128 selects as the input link L to the node Nx the input link that minimizes the sum of the amount of change, ΔRC, of the reduced cost accumulated up to the starting point node Ni and the amount of change, ΔRC, of the reduced cost of the input link.

Further, in step S56, the third link selecting unit 166 calculates the amount of change, ΔRCacc(Nx), of the reduced cost accumulated up to the node Nx as ΔRCacc(Nx)=ΔRCacc (Npre)+ΔRC(L). Symbol ΔRCacc(Npre) represents the amount of change, ΔRC, of the reduced cost accumulated up to the starting point node Npre of the input link L selected in step S55. ΔRC(L) represents the amount of change, ΔRC, of the reduced cost when the input link L is selected.

In step S5 of FIG. 11, the OEO regenerator placement determining unit 115 depicted in FIG. 7 determines the placement of the OEO regenerators in the optical transmission equipment configuration determined by the equipment configuration determining unit 124. The design data output unit 116 outputs the design data that contains information concerning the optical transmission equipment configuration determined by the equipment configuration determining unit 124 and information concerning the placement of the OEO regenerators determined by the OEO regenerator placement determining unit 115.

With the network design apparatus, network design program, and network design method according to the embodiment, it becomes possible to achieve a network design that can reduce the total cost needed for the placement of the optical transmission equipment and OEO regenerators. It also becomes possible to achieve a network design that considers the number of OEO regenerators that become necessary for each wavelength path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A network design apparatus comprising:
   an information acquiring unit which acquires topology information concerning an optical network, equipment information concerning the kind of optical transmission equipment that can be placed at each station in said optical network, span information indicating transmission path conditions occurring between stations adjacent to each other on said topology information, and wavelength path information concerning each wavelength path propagating in said optical network;
   a section dividing unit which divides the optical network, defined by said topology information, into linear sections;
   a combination candidate determining unit which determines candidates for combinations of various kinds of optical transmission equipment to be placed at each station in each of said linear sections;
   a noise amount upper limit value determining unit which determines a noise amount upper limit value in accordance with a prescribed condition specified by said wavelength path information and corresponding to an upper limit to the amount of noise allowed for each said wavelength path; and
   an equipment placement unit which determines the optical transmission equipment to be placed along each of said linear sections, by solving an integer programming problem having an objective function that minimizes the sum of the cost of the optical transmission equipment to be placed in said optical network and the cost needed to place a necessary number of OEO regenerators for each said wavelength path, subject to constraints that combinations of the various kinds of optical transmission equipment are selected, one for each said linear section, from among said combination candidates and that the number of OEO regenerators necessary for each said wavelength path is determined by a cumulative amount of the noise occurring along said wavelength path, determined in accordance with said transmission path conditions specified by the span information, and said noise amount upper limit value determined for said wavelength path.

2. The network design apparatus as claimed in claim 1, wherein said integer programming problem further includes a constraint that the number of OEO regenerators necessary for each said wavelength path is determined by a cumulative value of impairment occurring on said wavelength path, determined in accordance with said transmission path conditions specified by said span information, and a impairment upper limit value determined in accordance with the kind of signal of said wavelength path.

3. The network design apparatus as claimed in claim 1, wherein said noise amount upper limit value determining unit determines said noise amount upper limit value based on an OSNR tolerance of said wavelength path which is determined in accordance with said prescribed condition specified by said wavelength path information.

4. The network design apparatus as claimed in claim 1, wherein said noise amount upper limit value determining unit determines said noise amount upper limit value based on the impairment upper limit value determined in accordance with the kind of signal of said wavelength path and on an OSNR tolerance of said wavelength path which is determined in accordance with said prescribed condition specified by said wavelength path information.

5. The network design apparatus as claimed in claim 1, further comprising:
   a cumulative impairment maximum value determining unit which determines a maximum value that the cumulative value of the impairment can take on said wavelength path, and wherein:
   said noise amount upper limit value determining unit determines said noise amount upper limit value based on said maximum value or the impairment upper limit value determined in accordance with the kind of signal of said wavelength path, whichever is smaller, and on an OSNR tolerance of said wavelength path which is determined in accordance with said prescribed condition specified by said wavelength path information.

6. The network design apparatus as claimed in claim 1, further comprising:
   a cumulative impairment determining unit which determines a maximum value and a minimum value that the cumulative value of the impairment can take on said wavelength path; and
   a minimum-number-of-OEO regenerators determining unit which determines a minimum number of OEO regenerators necessary for regenerating a signal on the wavelength path along which the cumulative value of the impairment is held at said minimum value, and wherein:
   said noise amount upper limit value determining unit determines said noise amount upper limit value based on the maximum value of the impairment that can occur on said wavelength path divided by said minimum number of OEO regenerators or the impairment upper limit value determined in accordance with the kind of signal of said wavelength path, whichever is smaller, and on an OSNR tolerance of said wavelength path which is determined in accordance with said prescribed condition specified by said wavelength path information.

7. A computer-readable storage medium storing instructions which, when executed by a processor, causes said processor to execute a process comprising:
acquiring topology information concerning an optical network, equipment information concerning the kind of optical transmission equipment that can be placed at each station in said optical network, span information indicating transmission path conditions occurring between stations adjacent to each other on said topology information, and wavelength path information concerning each wavelength path propagating in said optical network;
dividing the optical network, defined by said topology information, into linear sections;
determining candidates for combinations of various kinds of optical transmission equipment to be placed at each station in each of said linear sections;
determining a noise amount upper limit value in accordance with a prescribed condition specified by said wavelength path information and corresponding to an upper limit to the amount of noise allowed for each said wavelength path; and
determining the optical transmission equipment to be placed along each of said linear sections, by solving an integer programming problem having an objective function that minimizes the sum of the cost of the optical transmission equipment to be placed in said optical network and the cost needed to place a necessary number of OEO regenerators for each said wavelength path, subject to constraints that combinations of the various kinds of optical transmission equipment are selected, one for each said linear section, from among said combination candidates and that the number of OEO regenerators necessary for each said wavelength path is determined by a cumulative amount of the noise occurring along the said wavelength path, determined in accordance with said transmission path conditions specified by said span information, and said noise amount upper limit value determined for said wavelength path.

8. The computer-readable storage medium as claimed in claim 7, wherein said integer programming problem further includes a constraint that the number of OEO regenerators necessary for each said wavelength path is determined by a cumulative value of impairment occurring on said wavelength path, determined in accordance with said transmission path conditions specified by the span information, and a impairment upper limit value determined in accordance with the kind of signal of said wavelength path.

9. The computer-readable storage medium as claimed in claim 7, wherein said noise amount upper limit value is determined based on an OSNR tolerance of said wavelength path which is determined in accordance with said prescribed condition specified by said wavelength path information.

10. The computer-readable storage medium as claimed in claim 7, wherein said noise amount upper limit value is determined based on the impairment upper limit value determined in accordance with the kind of signal of said wavelength path and on an OSNR tolerance of said wavelength path which is determined in accordance with said prescribed condition specified by said wavelength path information.

11. The computer-readable storage medium as claimed in claim 7, wherein said process comprising determining a maximum value that the cumulative value of the impairment can take on said wavelength path, and wherein:
said noise amount upper limit value is determined based on said maximum value or the impairment upper limit value determined in accordance with the kind of signal of said wavelength path, whichever is smaller, and on an OSNR tolerance of said wavelength path which is determined in accordance with said prescribed condition specified by said wavelength path information.

12. The computer-readable storage medium as claimed in claim 7, wherein said process comprising:
determining a maximum value and a minimum value that the cumulative value of the impairment can take on said wavelength path; and
determining a minimum number of OEO regenerators necessary for regenerating a signal on the wavelength path along which the cumulative value of the impairment is held at said minimum value, and wherein:
said noise amount upper limit value is determined based on the maximum value of the impairment that can occur on said wavelength path divided by said minimum number of OEO regenerators or the impairment upper limit value determined in accordance with the kind of signal of said wavelength path, whichever is smaller, and on an OSNR tolerance of said wavelength path which is determined in accordance with said prescribed condition specified by said wavelength path information.

13. A network design method implemented by a computer, wherein said computer execute a process comprising:
receiving topology information concerning an optical network, equipment information concerning the kind of optical transmission equipment that can be placed at each station in said optical network, span information indicating transmission path conditions occurring between stations adjacent to each other on said topology information, and wavelength path information concerning each wavelength path propagating in said optical network;
dividing the optical network, defined by said topology information, into linear sections,
determining candidates for combinations of various kinds of optical transmission equipment to be placed at each station in each of said linear sections,
determining a noise amount upper limit value in accordance with a prescribed condition specified by said wavelength path information and corresponding to an upper limit to the amount of noise allowed for each said wavelength path, and
determining the optical transmission equipment to be placed along each of said linear sections, by solving an integer programming problem having an objective function that minimizes the sum of the cost of the optical transmission equipment to be placed in said optical network and the cost needed to place a necessary number of OEO regenerators for each said wavelength path, subject to constraints that combinations of the various kinds of optical transmission equipment are selected, one for each said linear section, from among said combination candidates and that the number of OEO regenerators necessary for each said wavelength path is determined by a cumulative amount of the noise occurring along said wavelength path, determined in accordance with said transmission path conditions specified by said span information, and said noise amount upper limit value determined for said wavelength path.

14. The network design method as claimed in claim 13, wherein said integer programming problem further includes a constraint that the number of OEO regenerators necessary for each said wavelength path is determined by a cumulative value of impairment occurring on said wavelength path, determined in accordance with said transmission path conditions specified by said span information, and a impairment upper limit value determined in accordance with the kind of signal of said wavelength path.

15. The network design method as claimed in claim 13, wherein said noise amount upper limit value is determined based on an OSNR tolerance of said wavelength path which is determined in accordance with said prescribed condition specified by said wavelength path information.

16. The network design method as claimed in claim 13, wherein said noise amount upper limit value is determined based on the impairment upper limit value determined in accordance with the kind of signal of said wavelength path and on an OSNR tolerance of said wavelength path which is determined in accordance with said prescribed condition specified by said wavelength path information.

17. The network design method as claimed in claim 13, wherein said process comprising determining a maximum value that the cumulative value of the impairment can take on said wavelength path, and wherein:
said noise amount upper limit value is determined based on said maximum value or the impairment upper limit value determined in accordance with the kind of signal of said wavelength path, whichever is smaller, and on an OSNR tolerance of said wavelength path which is determined in accordance with said prescribed condition specified by said wavelength path information.

18. The network design method as claimed in claim 13, wherein said process comprising:
determining a maximum value and a minimum value that the cumulative value of the impairment can take on said wavelength path; and
determining a minimum number of OEO regenerators necessary for regenerating a signal on the wavelength path along which the cumulative value of the impairment is held at said minimum value, and wherein:
said noise amount upper limit value is determined based on the maximum value of the impairment that can occur on said wavelength path divided by said minimum number of OEO regenerators or the impairment upper limit value determined in accordance with the kind of signal of said wavelength path, whichever is smaller, and on an OSNR tolerance of said wavelength path which is determined in accordance with said prescribed condition specified by said wavelength path information.

* * * * *